US012754662B2

(12) United States Patent
Gov-Ari et al.

(10) Patent No.: US 12,754,662 B2
(45) Date of Patent: Oct. 6, 2026

(54) GENERATING AND UTILIZING WEBPAGE POLICIES

(71) Applicant: Taboola.com Ltd., Ramat Gan (IL)

(72) Inventors: Elad Gov-Ari, Holon (IL); Kurt Gessler, Yorkville, IL (US); Ohad Levy, Meitar (IL); Udaya Manchikatla, La Crescenta, CA (US); Guy Gonen, Beer Sheva (IL); Guy Gilboa, Netanya (IL)

(73) Assignee: TABOOLA.COM LTD., Ramat Gan (IL)

( * ) Notice: Subject to any disclaimer, the term of this patent is extended or adjusted under 35 U.S.C. 154(b) by 0 days.

(21) Appl. No.: 19/222,640

(22) Filed: May 29, 2025

(65) Prior Publication Data

US 2025/0371095 A1 Dec. 4, 2025

Related U.S. Application Data

(60) Provisional application No. 63/653,587, filed on May 30, 2024.

(51) Int. Cl.

| | |
|---|---|
| ***G06F 16/00*** | (2019.01) |
| ***G06F 3/0483*** | (2013.01) |
| ***G06F 3/0484*** | (2022.01) |
| ***G06F 16/215*** | (2019.01) |
| ***G06F 16/957*** | (2019.01) |

(Continued)

(52) U.S. Cl.

CPC .......... *G06F 3/0484* (2013.01); *G06F 3/0483* (2013.01); *G06F 16/215* (2019.01); *G06F 16/9577* (2019.01); *G06F 16/958* (2019.01); *G06F 40/14* (2020.01)

(58) Field of Classification Search

None

See application file for complete search history.

(56) References Cited

U.S. PATENT DOCUMENTS

| | | | | |
|---|---|---|---|---|
| 10,504,048 | B2 * | 12/2019 | Beck | G06Q 10/0633 |
| 10,942,991 | B1 * | 3/2021 | Kidd | G06F 16/954 |

(Continued)

FOREIGN PATENT DOCUMENTS

| | | | | | |
|---|---|---|---|---|---|
| IN | 202311066710 | A * | 10/2023 | G06F 16/248 |
| TW | 201621782 | A * | 6/2016 | H04N 21/4667 |
| WO | WO-2016028809 | A1 * | 2/2016 | H04N 21/4667 |

*Primary Examiner* — Hasanul Mobin

(74) *Attorney, Agent, or Firm* — Myers Wolin, LLC

(57) ABSTRACT

A method, apparatus, and product comprising: loading a webpage at a Content Management System (CMS) platform, the page comprising page elements presenting manually curated content; executing a policy editor displaying management tools configured for defining a webpage policy that assigns to each page element an editorial control level selected from a manually curated control level, a manually curated de-duplication control level, and a personalized control level; incorporating code representing the webpage policy into the webpage; and publishing the webpage for execution on end devices, wherein execution of the code causes replacement of manually curated content with personalized content items from a third-party content discovery server based on assigned control levels and constraints preventing content duplication within the webpage.

20 Claims, 23 Drawing Sheets

(51) Int. Cl.
*G06F 16/958* (2019.01)
*G06F 40/14* (2020.01)

(56) References Cited

U.S. PATENT DOCUMENTS

| | | | | |
|---|---|---|---|---|
| 11,656,838 | B2 * | 5/2023 | Reese | G06F 3/165<br>715/716 |
| 11,757,914 | B1 * | 9/2023 | Jakobsson | H04L 51/18<br>726/25 |
| 12,282,976 | B2 * | 4/2025 | Tatunashvili | G06F 9/44505 |
| 12,505,159 | B1 * | 12/2025 | Gurin | G06F 16/686 |
| 2014/0095456 | A1 * | 4/2014 | Pidduck | G06F 16/93<br>707/695 |
| 2014/0208108 | A1 * | 7/2014 | Lester | H04L 9/14<br>713/168 |
| 2014/0236839 | A1 * | 8/2014 | D'Souza | H04L 9/0833<br>713/160 |
| 2015/0134465 | A1 * | 5/2015 | Mckeon | G06F 16/9577<br>705/14.73 |
| 2015/0234844 | A1 * | 8/2015 | Cardonha | G06F 16/9535<br>707/752 |
| 2016/0285842 | A1 * | 9/2016 | Booth | H04L 63/08 |
| 2020/0142573 | A1 * | 5/2020 | Rathod | G06F 3/0481 |
| 2020/0186375 | A1 * | 6/2020 | Faulkner | G06Q 10/10 |
| 2020/0364276 | A1 * | 11/2020 | Kunz | G06F 40/109 |
| 2021/0374693 | A1 * | 12/2021 | La Salle | G06Q 20/065 |
| 2022/0059062 | A1 * | 2/2022 | Balassanian | G06N 3/006 |

* cited by examiner

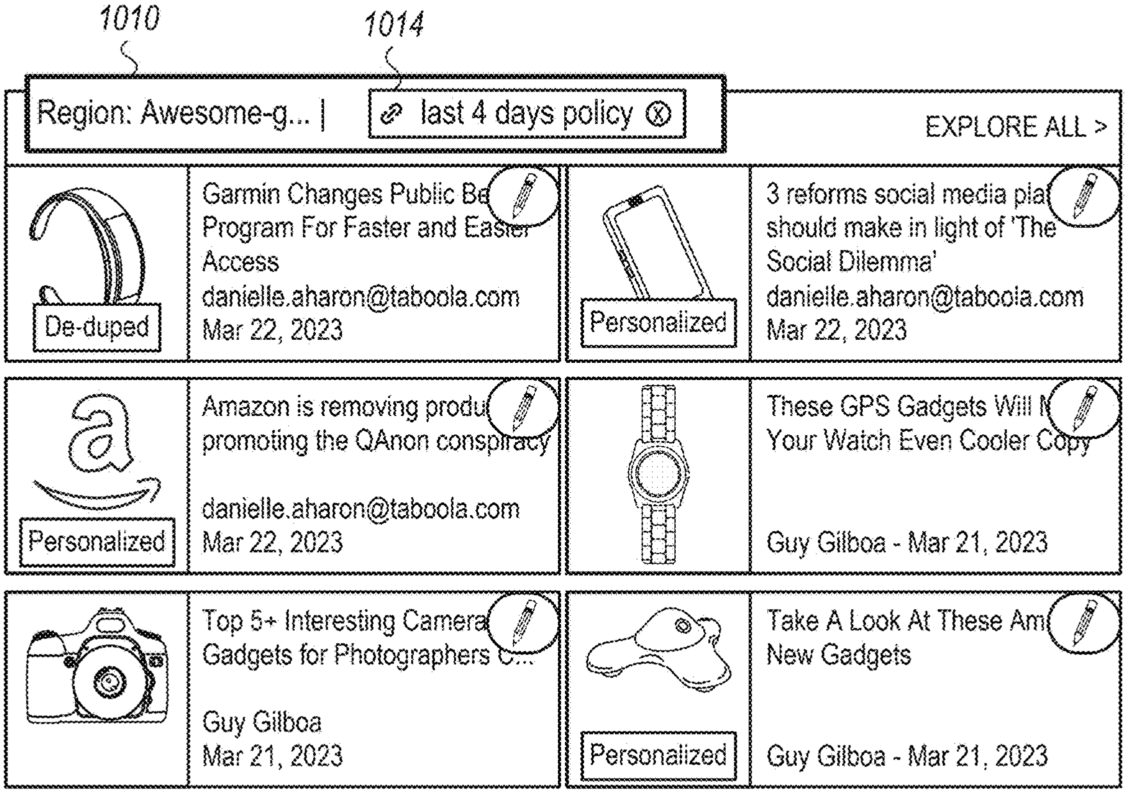
FIG. 10B
FIG. 10C
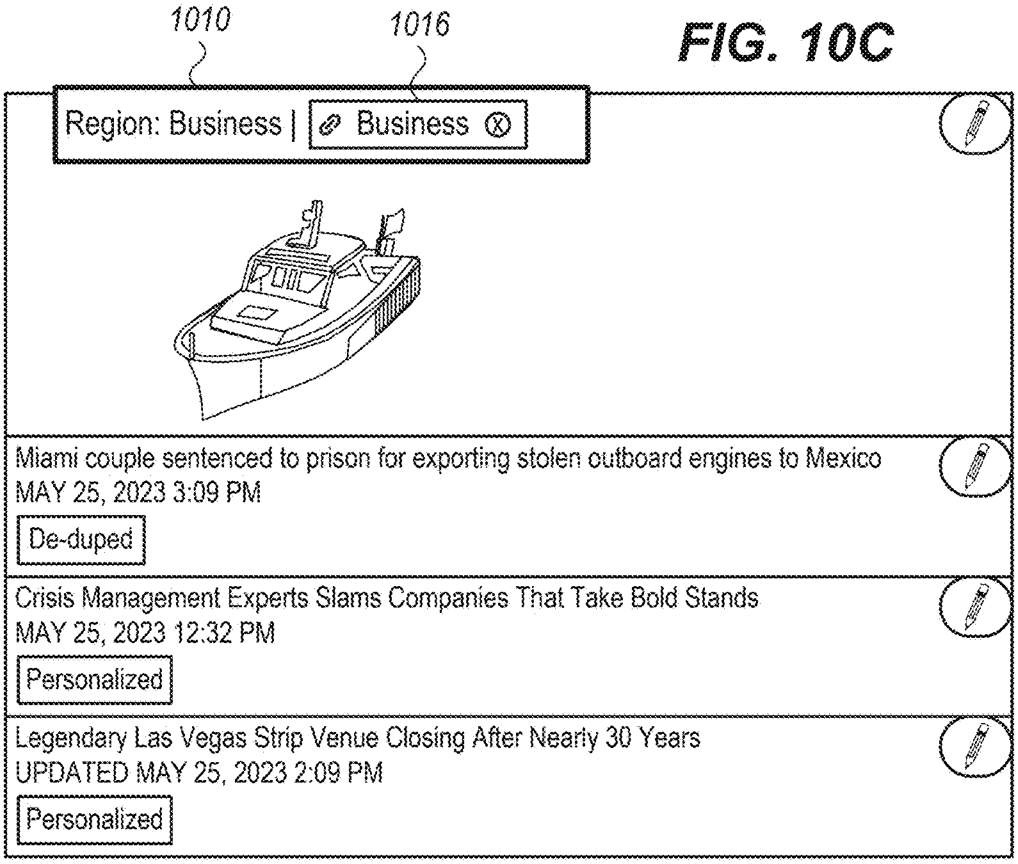

GENERATING AND UTILIZING WEBPAGE POLICIES

CROSS-REFERENCE TO RELATED APPLICATION

This application claims the benefit of Provisional Patent Application No. 63/653,587, entitled "CUSTOMIZED HOMEPAGE" filed May 30, 2024, which is hereby incorporated by reference in its entirety without giving rise to disavowment.

TECHNICAL FIELD

The present disclosure relates to managing webpages in general, and to generating and utilizing webpage policies, in particular.

BACKGROUND

A Content Management System (CMS) is a software platform that helps publishers create, manage, organize, and publish digital content across various platforms. For publishers, a CMS platform acts as the central hub for handling multiple aspects of content production and distribution.

The CMS platform provides editors with tools such as text editors, drag-and-drop modules, or form fields to input and organize content. For example, form fields allow editors to organize text, images, and videos. Curated content and pages are typically stored in a CMS database at the backend, before the content is published or rendered as a live web page.

BRIEF SUMMARY

One exemplary embodiment of the disclosed subject matter is a method comprising: loading a webpage at a Content Management System (CMS) platform, wherein the CMS platform enables one or more editors to edit digital content of the webpage, wherein the webpage comprises a plurality of page elements presenting manually curated content, the plurality of page elements comprising at least a slot for presenting a content item and a region aggregating a plurality of slots; executing a policy editor over the webpage, the policy editor comprises an executable software that has access to the webpage, wherein the policy editor displays management tools configured for defining a webpage policy applicable to the webpage, the webpage policy defining configurations for managing and customizing a presentation of content by the plurality of page elements of the webpage, wherein the management tools enable the one or more editors to assign, for each of the plurality of page elements, an editorial control level selected from at least three editorial control levels, wherein the at least three editorial control levels comprise: a manually curated control level, a manually curated de-duplication control level, and a personalized control level, wherein the manually curated control level is under editorial control but allows for potential duplicated items, the manually curated de-duplication control level is under the editorial control and is configured to enforce a constraint preventing duplication of content, wherein the personalized control level is under control of an automated recommendation engine, wherein a first page element assigned with the manually curated de-duplication control level presents a first manually curated content item, wherein a second page element assigned with the personalized control level is configured to be populated by personalized content items from a third-party content discovery server, and wherein the constraint restricts a presentation of the first manually curated content item by the second page element, whereby preventing repetition of the first manually curated content item within the webpage; incorporating code representing the webpage policy into the webpage, thereby obtaining a modified webpage that incorporates assigned editorial control levels for at least the first and second page elements; and publishing the modified webpage to be available to one or more end devices of end users, whereby enabling the one or more end devices to execute the code of the webpage policy upon rendering the modified webpage, wherein said executing the code of the webpage policy at the one or more end devices causes the one or more end devices to request to replace a second manually curated content item of the second page element with a personalized content item different from the first manually curated content item of the first page element.

Optionally, the constraint restricts the presentation of the first manually curated content item by any page elements of the webpage assigned with the personalized control level.

Optionally, the management tools enable the one or more editors to assign, for any personalized page elements of the webpage assigned with the personalized control level, a content category, wherein the personalized content items from the third-party content discovery server are enabled to be served by the personalized page elements in case they belong to a respective content category.

Optionally, the code of the webpage policy is executed on first and second end devices, resulting in invocations of first and second requests to obtain the personalized content item, respectively, wherein, in response to the first request from the first end device, a first personalized content item from the third-party content discovery server is obtained at the first end device, wherein, in response to the second request from the second end device, a second personalized content item from the third-party content discovery server is obtained at the second end device, wherein the first and second personalized content items are different, the first personalized content item is personalized for a first user of the first end device and the second personalized content item is personalized for a second user of the second end device.

Optionally, the method further comprises replacing, at the first end device, the second manually curated content item of the second page element with the first personalized content item, wherein said replacing at the first end device is performed before the webpage is displayed to the first user of the first end device; and replacing, at the second end device, the second manually curated content item of the second page element with the second personalized content item, wherein said replacing at the second end device is performed before the webpage is displayed to the second user of the first end device.

Optionally, the CMS platform is executed by a web browser, wherein the policy editor comprises one of: a browser extension, a plugin, or an add-on.

Optionally, the management tools are displayed as at least one of: an overlay, a widget, a toolbar, a builder tool, a side panel, or a window.

Optionally, the webpage is a homepage.

Optionally, the code of the webpage policy is configured to be executed by web browsers of the one or more end devices.

Optionally, the code of the webpage policy is executed on an end device of the one or more end devices, resulting in an invocation of a request to obtain the personalized content item for the second page element, wherein, in response to the request failing to obtain the personalized content item from the third-party content discovery server, serving the second manually curated content item by the second page element.

Another exemplary embodiment of the disclosed subject matter is an apparatus comprising a processor and coupled memory, said processor being adapted to perform: loading a webpage at a CMS platform, wherein the CMS platform enables one or more editors to edit digital content of the webpage, wherein the webpage comprises a plurality of page elements presenting manually curated content, the plurality of page elements comprising at least a slot for presenting a content item and a region aggregating a plurality of slots; executing a policy editor over the webpage, the policy editor comprises an executable software that has access to the webpage, wherein the policy editor displays management tools configured for defining a webpage policy applicable to the webpage, the webpage policy defining configurations for managing and customizing a presentation of content by the plurality of page elements of the webpage, wherein the management tools enable the one or more editors to assign, for each of the plurality of page elements, an editorial control level selected from at least three editorial control levels, wherein the at least three editorial control levels comprise: a manually curated control level, a manually curated de-duplication control level, and a personalized control level, wherein the manually curated control level is under editorial control but allows for potential duplicated items, the manually curated de-duplication control level is under the editorial control and is configured to enforce a constraint preventing duplication of content, wherein the personalized control level is under control of an automated recommendation engine, wherein a first page element assigned with the manually curated de-duplication control level presents a first manually curated content item, wherein a second page element assigned with the personalized control level is configured to be populated by personalized content items from a third-party content discovery server, and wherein the constraint restricts a presentation of the first manually curated content item by the second page element, whereby preventing repetition of the first manually curated content item within the webpage; incorporating code representing the webpage policy into the webpage, thereby obtaining a modified webpage that incorporates assigned editorial control levels for at least the first and second page elements; and publishing the modified webpage to be available to one or more end devices of end users, whereby enabling the one or more end devices to execute the code of the webpage policy upon rendering the modified webpage, wherein said executing the code of the webpage policy at the one or more end devices causes the one or more end devices to request to replace a second manually curated content item of the second page element with a personalized content item different from the first manually curated content item of the first page element.

Yet another exemplary embodiment of the disclosed subject matter is a computer program product comprising a non-transitory computer readable medium retaining program instructions, which program instructions when read by a processor, cause the processor to perform: loading a webpage at a CMS platform, wherein the CMS platform enables one or more editors to edit digital content of the webpage, wherein the webpage comprises a plurality of page elements presenting manually curated content, the plurality of page elements comprising at least a slot for presenting a content item and a region aggregating a plurality of slots; executing a policy editor over the webpage, the policy editor comprises an executable software that has access to the webpage, wherein the policy editor displays management tools configured for defining a webpage policy applicable to the webpage, the webpage policy defining configurations for managing and customizing a presentation of content by the plurality of page elements of the webpage, wherein the management tools enable the one or more editors to assign, for each of the plurality of page elements, an editorial control level selected from at least three editorial control levels, wherein the at least three editorial control levels comprise: a manually curated control level, a manually curated de-duplication control level, and a personalized control level, wherein the manually curated control level is under editorial control but allows for potential duplicated items, the manually curated de-duplication control level is under the editorial control and is configured to enforce a constraint preventing duplication of content, wherein the personalized control level is under control of an automated recommendation engine, wherein a first page element assigned with the manually curated de-duplication control level presents a first manually curated content item, wherein a second page element assigned with the personalized control level is configured to be populated by personalized content items from a third-party content discovery server, and wherein the constraint restricts a presentation of the first manually curated content item by the second page element, whereby preventing repetition of the first manually curated content item within the webpage; incorporating code representing the webpage policy into the webpage, thereby obtaining a modified webpage that incorporates assigned editorial control levels for at least the first and second page elements; and publishing the modified webpage to be available to one or more end devices of end users, whereby enabling the one or more end devices to execute the code of the webpage policy upon rendering the modified webpage, wherein said executing the code of the webpage policy at the one or more end devices causes the one or more end devices to request to replace a second manually curated content item of the second page element with a personalized content item different from the first manually curated content item of the first page element.

One exemplary embodiment of the disclosed subject matter is a method comprising: receiving a webpage at an end device, wherein the webpage comprises a plurality of page elements presenting manually curated content, the plurality of page elements comprising at least a slot for presenting a content item and a region aggregating a plurality of slots, the plurality of page elements comprising at least first and second page elements of the plurality of page elements, wherein the first page element presents a first manually curated content item, wherein the second page element presents a second manually curated content item, wherein the webpage incorporates code representing a webpage policy, the webpage policy indicates assigned editorial control levels for at least the first and second page elements, wherein the assigned editorial control levels are selected from at least three editorial control levels, wherein the at least three editorial control levels comprise: a manually curated control level, a manually curated de-duplication control level, and a personalized control level, wherein the manually curated control level is under editorial control but allows for potential duplicated items, the manually curated de-duplication control level is under the editorial control and is configured to enforce a constraint preventing duplication of content, wherein the personalized control level is under control of an automated recommendation engine, wherein the first page element is assigned with the manually curated de-duplication control level, and the second page element is assigned with the personalized control level, wherein the second page element is configured to be populated by personalized content items from a third-party content discovery server, wherein the constraint of the first page element restricts a presentation of the first manually curated content item by the second page element, whereby preventing repetition of the first manually curated content item within personalized page elements of the webpage; executing the code of the webpage policy upon rendering the modified webpage on the end device, wherein said executing the code of the webpage policy causes the end device to request to replace the second manually curated content item with a personalized content item different from the first manually curated content item; fetching the personalized content item from the third-party content discovery server, wherein the personalized content item is selected to be fetched by the end device based on the personalized content item complying with the constraint of the webpage policy and based on recommendations of the automated recommendation engine, wherein the personalized content item complies with the constraint in case the personalized content item is not a duplicate of the first manually curated content item; and serving the personalized content item by the second page element.

Optionally, the webpage is a homepage.

Optionally, the code of the webpage policy is configured to be executed by a web browser of the end device.

Another exemplary embodiment of the disclosed subject matter is an apparatus comprising a processor and coupled memory, said processor being adapted to perform: receiving a webpage at an end device, wherein the webpage comprises a plurality of page elements presenting manually curated content, the plurality of page elements comprising at least a slot for presenting a content item and a region aggregating a plurality of slots, the plurality of page elements comprising at least first and second page elements of the plurality of page elements, wherein the first page element presents a first manually curated content item, wherein the second page element presents a second manually curated content item, wherein the webpage incorporates code representing a webpage policy, the webpage policy indicates assigned editorial control levels for at least the first and second page elements, wherein the assigned editorial control levels are selected from at least three editorial control levels, wherein the at least three editorial control levels comprise: a manually curated control level, a manually curated de-duplication control level, and a personalized control level, wherein the manually curated control level is under editorial control but allows for potential duplicated items, the manually curated de-duplication control level is under the editorial control and is configured to enforce a constraint preventing duplication of content, wherein the personalized control level is under control of an automated recommendation engine, wherein the first page element is assigned with the manually curated de-duplication control level, and the second page element is assigned with the personalized control level, wherein the second page element is configured to be populated by personalized content items from a third-party content discovery server, wherein the constraint of the first page element restricts a presentation of the first manually curated content item by the second page element, whereby preventing repetition of the first manually curated content item within personalized page elements of the webpage; executing the code of the webpage policy upon rendering the modified webpage on the end device, wherein said executing the code of the webpage policy causes the end device to request to replace the second manually curated content item with a personalized content item different from the first manually curated content item; fetching the personalized content item from the third-party content discovery server, wherein the personalized content item is selected to be fetched by the end device based on the personalized content item complying with the constraint of the webpage policy and based on recommendations of the automated recommendation engine, wherein the personalized content item complies with the constraint in case the personalized content item is not a duplicate of the first manually curated content item; and serving the personalized content item by the second page element.

Yet another exemplary embodiment of the disclosed subject matter is a computer program product comprising a non-transitory computer readable medium retaining program instructions, which program instructions when read by a processor, cause the processor to perform: receiving a webpage at an end device, wherein the webpage comprises a plurality of page elements presenting manually curated content, the plurality of page elements comprising at least a slot for presenting a content item and a region aggregating a plurality of slots, the plurality of page elements comprising at least first and second page elements of the plurality of page elements, wherein the first page element presents a first manually curated content item, wherein the second page element presents a second manually curated content item, wherein the webpage incorporates code representing a webpage policy, the webpage policy indicates assigned editorial control levels for at least the first and second page elements, wherein the assigned editorial control levels are selected from at least three editorial control levels, wherein the at least three editorial control levels comprise: a manually curated control level, a manually curated de-duplication control level, and a personalized control level, wherein the manually curated control level is under editorial control but allows for potential duplicated items, the manually curated de-duplication control level is under the editorial control and is configured to enforce a constraint preventing duplication of content, wherein the personalized control level is under control of an automated recommendation engine, wherein the first page element is assigned with the manually curated de-duplication control level, and the second page element is assigned with the personalized control level, wherein the second page element is configured to be populated by personalized content items from a third-party content discovery server, wherein the constraint of the first page element restricts a presentation of the first manually curated content item by the second page element, whereby preventing repetition of the first manually curated content item within personalized page elements of the webpage; executing the code of the webpage policy upon rendering the modified webpage on the end device, wherein said executing the code of the webpage policy causes the end device to request to replace the second manually curated content item with a personalized content item different from the first manually curated content item; fetching the personalized content item from the third-party content discovery server, wherein the personalized content item is selected to be fetched by the end device based on the personalized content item complying with the constraint of the webpage policy and based on recommendations of the automated recommendation engine, wherein the personalized content item complies with the constraint in case the personalized content item is not a duplicate of the first manually curated content item; and serving the personalized content item by the second page element.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 10A-10D show exemplary tools for policy attaching, in accordance with some exemplary embodiments of the disclosed subject matter.

DETAILED DESCRIPTION

Figure 1:
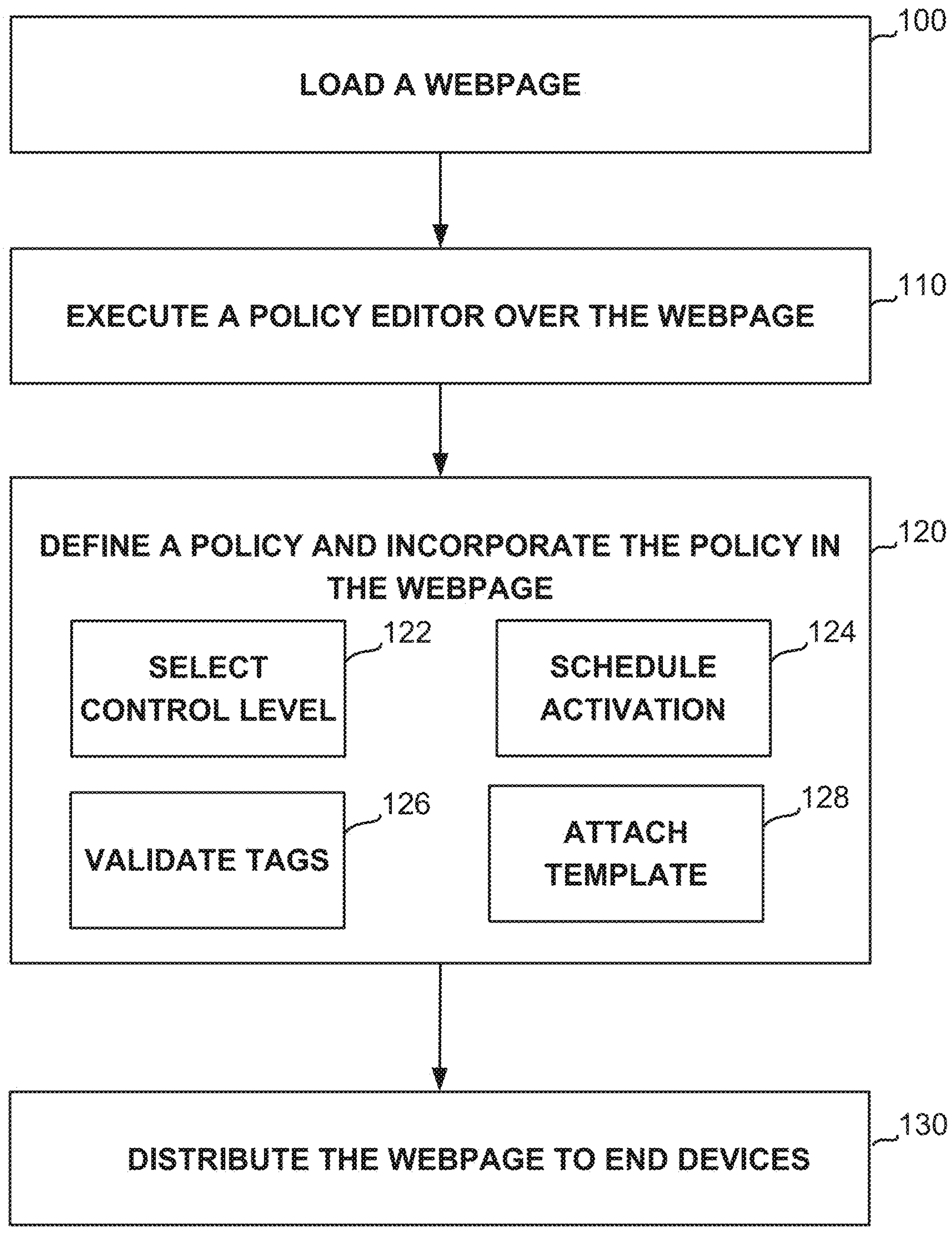
FIG. 1 shows a flowchart diagram of a method, in accordance with some exemplary embodiments of the disclosed subject matter.

One technical problem dealt with by the disclosed subject matter is enhancing a performance of a Content Management System (CMS). In some exemplary embodiments, a CMS platform, such as WordPress™, Joomla™, Drupal™, Webflow™, or the like, may comprise computer software used to manage the creation and modification of digital content. In some exemplary embodiments, a CMS platform may comprise a front-end user interface, such as a Content Management Application (CMA), that allows content creators to add, modify, and remove content from a website, a webpage, or the like. In some exemplary embodiments, a CMS platform may comprise a backend component, such as a Content Delivery Application (CDA), that compiles the content, updates the website, or the like.

In some exemplary embodiments, the performance of a content management system may refer to the performance of the digital content that it manages. For example, the performance of the digital content may be measured according to a Life Time Value (LTV) metric, which may comprise a Key Performance Indicator (KPI) that is determined based on acquisitions, engagement, and monetization. For example, the LTV metric may be used to evaluate how much value an end user generates over their entire engagement with a digital asset (e.g., a website). The number of acquisitions (e.g., the number of visits or instances a user comes to a website or platform) plays a crucial role in affecting the LTV. For example, more acquisitions may generally increase a pool of potential users contributing to the platform. Engagement on the other hand, may measure how actively a user interacts with the website or the platform during each visit. Engagement may often be quantified by metrics such as Pages Viewed per Session (PVS), time spent on the site, or the like. Higher engagement may typically lead to a higher LTV. Users who stay longer, view more pages, and engage with content are more likely to become loyal customers, contributing more value over time. Increased engagement often correlates with stronger brand affinity and repeat visits.

In some exemplary embodiments, the LTV metric may be determined based on monetization of the end user. Monetization may include actions by the user that contribute to revenue generation, such as clicking on advertisements, making purchases, subscribing to premium services, or the like. Monetization may often be quantified by metrics like Revenue Per Mille (RPM) that represents how much income the publisher earned per 1,000 views, Cost per 1,000 impressions (CPM) which represents how much money advertisers are spending in the platform, or the like. Users who consistently take revenue-driving actions contribute significantly to their LTV. If a user consistently clicks on advertisements, makes purchases, or engages in other revenue-generating activities, their overall value to the platform increases.

It may be desired to enhance the performance of content management systems, such that the digital content created and distributed thereby has increased LTV metrics, increased interaction and engagement metrics, or the like.

Another technical problem dealt with by the disclosed subject matter is to enhance a publisher's capability to manage a personalization of digital content for different end users.

In some exemplary embodiments, the CMS platform may allow content creators to implement a personalization of digital content, such as by allowing content creators to combine manually curated content that is under full editorial control, with personalized content that is controlled by one or more recommendation engines. For example, combined pages such as homepages may combine manually curated content with personalized content from a content discovery server.

In some exemplary embodiments, a recommendation engine may be configured to match end users with their personalized content experiences based on their interests, location, time of day, trends, or the like. A publisher may have a small window of opportunity to provide content that end users are interested in, and with which they will engage, incentivizing publishers to personalize content. In some exemplary embodiments, editorial teams may set the rules of engagement for those matches, determining which articles, videos and galleries are available in the recommendable inventory at any given moment. For example, personalization logic and content may be obtained from a third-party system, and integrated in the page via Application Programming Interfaces (APIs), embeds, or scripts. However, editorial teams may have limited control over many aspects of the personalization.

It may be desired to provide enhanced capabilities, enriching the CMS functionalities. For example, it may be desired to provide a publisher with control over details such as a high-resolution management of page slots as personalized or manually curated, strategic placement of content that increases the consumption of diverse content, dynamic customizing of pages per user segments, or the like.

Yet another technical problem dealt with by the disclosed subject matter is improving a publisher's ability to manage a personalization of distributed content provided to end users, without adversely affecting a User Experience (UX) of the end users, such as in case the personalization mechanism fails.

Yet another technical problem dealt with by the disclosed subject matter is to reduce manual editorial effort. For example, in various scenarios, a publisher may require consistent settings across multiple webpages, necessitating repetitive manual configuration by the editorial team. It may be desired to reduce the resources required from the editorial team, making the process more efficient.

Yet another technical problem dealt with by the disclosed subject matter is to enhance the editorial integrity and uniformity of page designs. In some exemplary embodiments, content creators may configure a specific "frame" or "container" of a page to render and present personalized content from a third-party source. Personalized content items from a third-party source may be embedded within the designated containers and their code may be executed. The design of the personalized content may be outdated or unaware of changes made by the publisher, resulting with a layout that is not uniform, with a reduced UX, with an inconsistent brand voice, or the like.

For example, personalization logic and content may be obtained from a third-party system, and integrated into the page. According to this example, when utilizing server-side integration, personalized content may be embedded in the page at the CMS server and subsequently distributed to end users. As another example, when utilizing client-side integration, a "skeleton" page that is absent of any content at designated containers for personalized content may be distributed to an end user, and the personalized content may be obtained and populated in the containers after the page starts to load. For both client-side and server-side integrations, the personalization logic executed within the container could be outdated or unaware of changes made by the publisher. It may be desired to overcome this drawback.

One technical solution provided by the disclosed subject matter is enabling content creators to customize a content presentation of webpages while preserving editorial integrity and brand voice. In some exemplary embodiments, the disclosed subject matter provides a policy editor that is executable over webpages, and enables to configure a personalization policy for each region, slot, page, or other granularity level. In some exemplary embodiments, the policy editor may enable to set a configuration for any structured aspects and properties of the page elements and of content items configured to be served thereby, such as personalization related properties, time related properties, content categories, authors, sources, algorithms, or the like.

In some exemplary embodiments, while the disclosed subject matter is relevant to all forms of webpages, such as homepages, landing pages, dashboard pages, hub pages, portal pages, search results pages, or the like, the disclosure focuses on "combined" pages such as homepages, which are generally pages that aggregate and combine different types of content. For example, combined pages may combine curated content that is under full editorial control, with personalized content that is controlled by one or more recommendation engines. However, the disclosed subject matter is not limited to being applied to combined pages such as homepages, and may be applied to any page that includes content items. It is noted that within a single website, there may be several combined pages such as homepages. For example, a single website may include a main homepage (e.g., cnn.com) as well as a specific subsection homepage (e.g., cnn.com/business).

In some exemplary embodiments, a webpage that is being processed by a CMS platform may be divided by a publisher into zones utilized to display content items. For example, the publisher may utilize a CMS platform to divide the webpage, or page elements thereof, into zones. It is noted that "editors", "users", "writers", "content creators", "marketers", "admins", "contributors", and "publishers" may be used hereinafter interchangeably, and refer to any users that process, design, and/or manage webpages on behalf of the publisher.

In some exemplary embodiments, one type of zone may be a slot for presenting a single item. In some exemplary embodiments, another type of zone may be an aggregated zone, also referred to a "region", which aggregates several slots of content items. For example, a region may aggregate slots of content items that have a common theme or relate to a same concept, e.g., a section in a webpage that relates to economic news as opposed to a section in the same webpage which relates to sports news. In some cases, the webpage may be divided into zones of any other level of granularity, such as into a high-level region that aggregates a plurality of regions of slots.

In some exemplary embodiments, a policy editor may be executed over the webpage. In some exemplary embodiments, the policy editor may be implemented as a browser extension, a plugin, an add-on, or the like, configured to present one or more designated tools, UI elements, widgets, or the like. In some exemplary embodiments, the policy editor may be deployed within a Content Management System (CMS) or webpage, over the CMS or webpage, or the like. For example, the policy editor may be implemented as a browser extension utilized to add graphical presentation on top of a presented webpage in the browser, that is part of the publisher's website. As another example, the policy editor may offer inline editing within a presented webpage. As another example, the policy editor may present an administrator toolbar on top of a presented webpage, adjacent to the webpage, or the like. As another example, the policy editor may offer editing tools by entering an editing mode directly on a presented webpage.

Figure 4A:
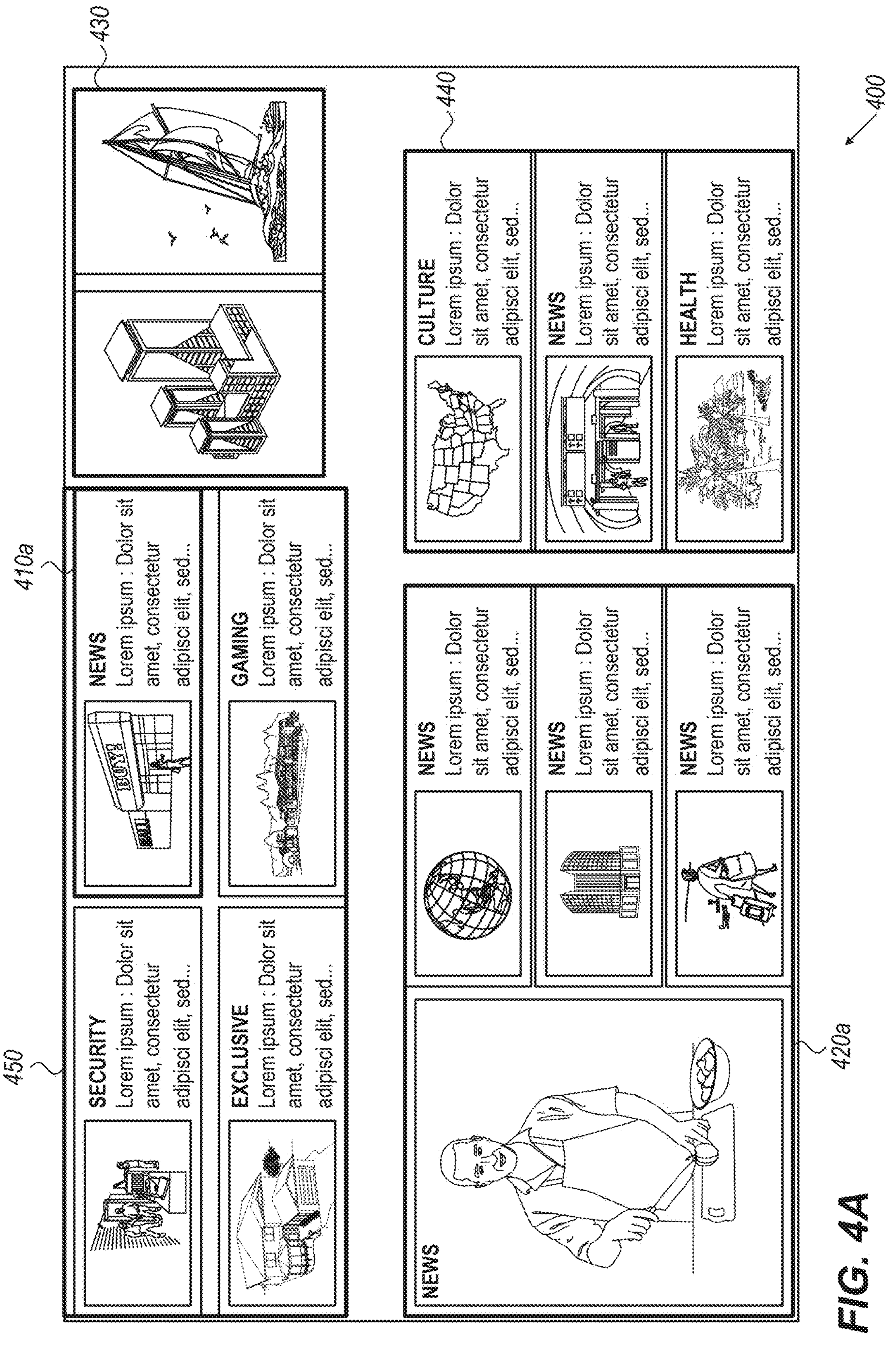
FIGS. 4A-4B show exemplary editorial control levels of a webpage, in accordance with some exemplary embodiments of the disclosed subject matter.
Figure 4B:
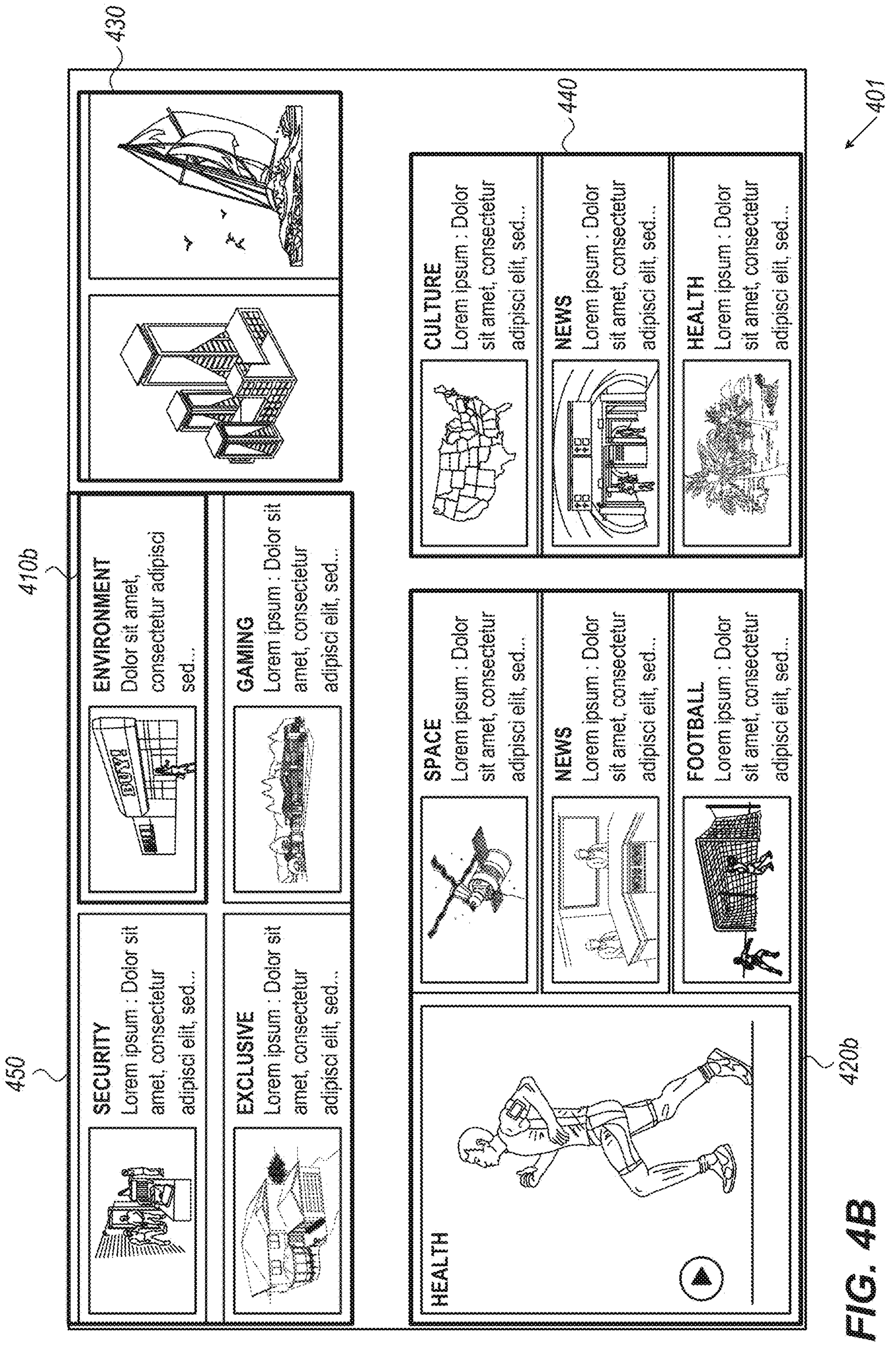

In some exemplary embodiments, the policy editor may provide a plurality of tools for the publisher. For example, the policy editor may provide an editorial control level tool that enables the publisher to assign an editorial control level for each zone, at any level of granularity, e.g., as depicted in FIGS. 4A-4B. In some exemplary embodiments, the editorial control level may indicate whether the zone is configured to present content items that are manually curated by editors. In some exemplary embodiments, the editorial control level may indicate whether the zone is configured to present content items that are automatically populated by algorithm-driven selections. For example, zones that are configured to present content items that are automatically populated by algorithm-driven selections, such as a recommendation engine, may be referred to as "personalized" zones that are curated by editor-enhanced algorithms, and not manually curated by content creators.

In some exemplary embodiments, manually curated zones may comprise zones over which the publisher has complete editorial control, and decides which content items to be displayed therein. For example, the publisher may populate slots of manually curated zones with content items stored in a CMS database. In some exemplary embodiments, the content on manually-curated zones may be selected, organized, and presented at least partially by human curators or editors, rather than relying solely on automated algorithms or machines. In some exemplary embodiments, other zones of the webpage may be fully personalized, such that the content presented therein may be provided automatically.

In some exemplary embodiments, the policy editor may enable to select an editorial control level at any level of granularity, including slot level, regional level, page level, website level, or the like. For example, a region may be composed of several slots, each of which may be assigned with its own editorial level of control, customized independently from other slots or sections within the zone. For example, a first slot of a region may be personalized, a second slot manually curated, and a third slot personalized. As another example, a region may be personalized, and one of the slots within the region may be defined to be hand-curated in order to provide an enhanced user experience.

Figure 6:
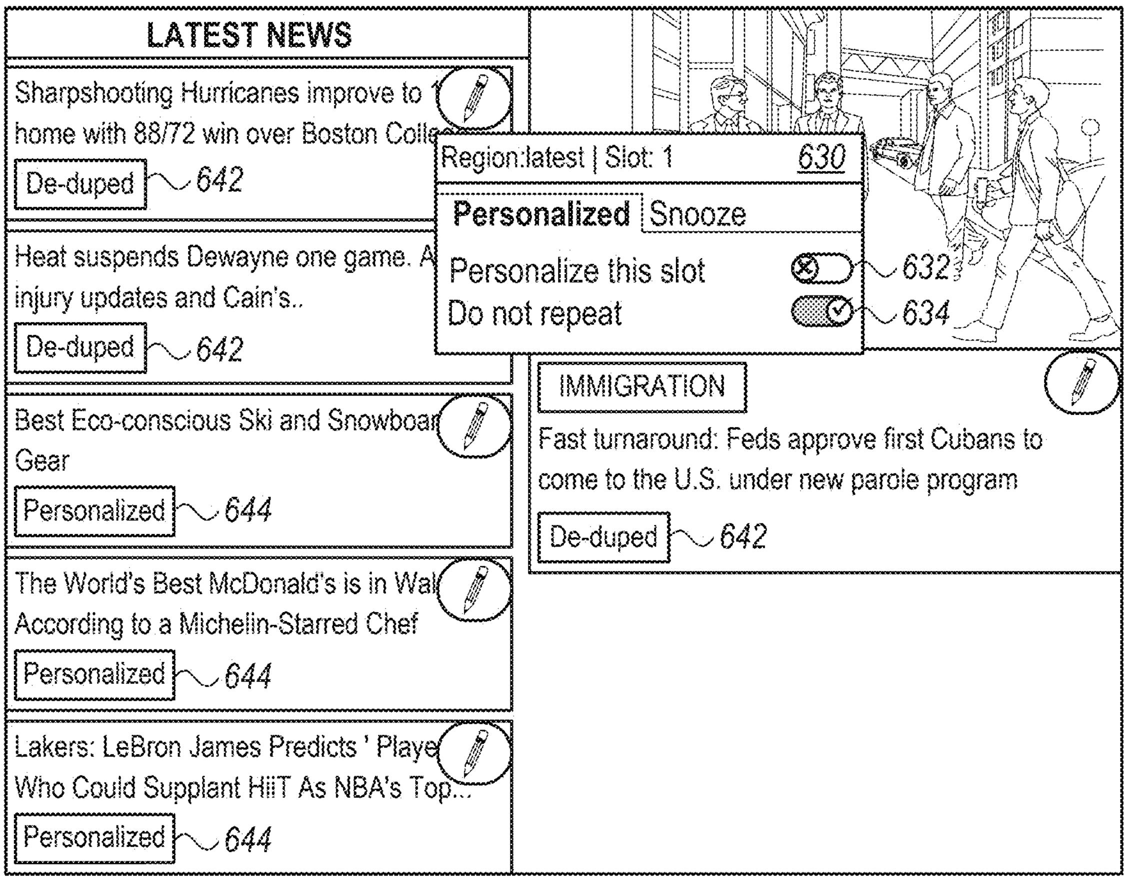
FIG. 6 shows an exemplary de-duplication tool of the policy editor, in accordance with some exemplary embodiments of the disclosed subject matter.

In some exemplary embodiments, the policy editor may provide a de-duplication tool that enables the publisher to select, for each zone that is not selected to be personalized, whether the zone should be de-duplicated (de-duped). For example, the de-duplication tool is depicted in FIG. 6. In some exemplary embodiments, zones selected to be de-duplicated may be designed to display manually curated content that should not be repeated in personalized zones within the webpage. For example, a main article that, based on an editorial decision, may be highlighted or emphasized, and may be selected to be de-duplicated so that the highlighted article will not re-appear in any personalized slot within the same webpage. As another example, one or more slots in a page may be defined as customized non-repeating de-duped slots, while other slots of the page may be defined as manually curated slots, which can be repeated in personalized zones within the page.

In some exemplary embodiments, customized de-duped zones may be managed to prevent repetition of their content items elsewhere on the webpage, in personalized zones, or the like, ensuring that the content is kept unique. For example, after content items are selected for each page slot, code of the policy editor may iterate over all personalized slots in the webpage, and compare their content items (e.g., metadata thereof, a title thereof, an identifier thereof, tags thereof, or the like) with the de-duped content items to make sure they are not duplicated.

Another technical solution provided by the disclosed subject matter is enabling content creators to dynamically customize the content presentation of webpages, by incorporating a dynamic factor into tools of the policy editor. For example, the policy editor may provide a dynamic editorial control tool. In some exemplary embodiments, using the tool, some zones in a page may be assigned with a dynamic editorial control level, scheduling dynamic switches between editorial control levels.

For example, personalized zones may be scheduled to be manually curated for a defined timeframe. As another example, personalized zones may be locked with their current content item (manual or personal) to prevent editing or switching of the content item for specific time windows, e.g., as depicted in FIG. 5B. As another example, an editorial control level of a zone may be locked for one or more time periods. As another example, a personalized zone may be activated for a defined time window, after which the zone may become manually curated. For example, in case fewer content creators are available for manual editing during weekends or during certain times in the day, one or more manually curated zones may be scheduled to become personalized zones during such times.

In some exemplary embodiments, the policy editor may provide a snoozing tool configured to restrict or block access to a zone for a defined time window. In some exemplary embodiments, the snoozing tool may be configured to pause or deactivate the personalization of personalized zones, for a defined time window. For example, the user may be enabled to temporarily pause or deactivate a particular personalized zone, causing the algorithm-driven selections of content items to pause for the defined timeframe, e.g., without the editorial team being required to review or adjust any HTML code. In some exemplary embodiments, during the "snooze" period, the automated personalization features for that zone or combination of zones may be temporarily halted or replaced by alternative content, hand-curated content, content provided by the zone prior to the snooze period, or the like. In some cases, the snoozing tool may allow to temporarily restrict any manual or automatic changes to a content item that is served by a page element.

In some exemplary embodiments, using the policy editor, the publisher may be enabled to select or define a personalization policy (also referred to as "webpage policy" or "management policy") for each zone in the webpage, such as for each slot, region, or the like. In some exemplary embodiments, the publisher may utilize the policy editor to define and edit personalization policies. In some exemplary embodiments, the personalization policy of a zone may relate to different aspects and properties of its designated content, such as personalization related properties, time related properties, categories, authors, sources, algorithms, or the like. For example, the personalization policy of a zone may comprise the configurations for the zone, such as a selection of the editorial control level of the zone as curated, personalized, or de-duped. As another example, the personalization policy of a zone may comprise a selection of a dynamic editorial control level, a scheduling of dynamic switching between editorial control levels, a selected snoozing period for the zone, or the like.

In some exemplary embodiments, personalization policies of a zone may be defined and edited in a hierarchical granularity of page, region, slot, or the like. For example, a first level of policy editing may be defined for the entire page, and a more granular policy editing may be defined for each region in the page. Within each region, the publisher may be enabled to define a personalization policy for each slot.

Yet another technical solution provided by the disclosed subject matter is utilizing dedicated tags for populating content items within a page. In some exemplary embodiments, the publisher may be configured to incorporate dedicated tags within the Hypertext Markup Language (HTML) code of the page, e.g., via the CMS platform or any other content management platform. In some exemplary embodiments, the tags may be configured to define the designated location or placement of each section of a content item such as titles thereof, thumbnails thereof, or the like. In some exemplary embodiments, the dedicated tags may be used to indicate a type of content (e.g., a content category) that is allowed to be displayed within a tagged area, or properties of the content, in a platform-agnostic manner. In some exemplary embodiments, using dedicated tags may enable an automatic and dynamic update of content items within each page zone, according to the tags.

For example, instead of autonomously rendering personalized content items by executing associated code that may be outdated or unaware of changes made by the publisher, the tags may add flexibility and coherence to content presentation. The tags may allow content items to be fetched and displayed without requiring independent code execution for each item, e.g., by a web browser requesting the page. For example, if a publisher modifies a webpage design, such as adjusting slot sizes in response to events, autonomous rendering may result in content items that do not match the updated layout. The dedicated tags may solve this issue, and provide uniformity of the layout of content items of multiple sources and types.

In some exemplary embodiments, using the dedicated tags, the structure and dimensions of the webpage may remain consistent while content items are fetched and populated to replace previous items. In some exemplary embodiments, the dedicated tags may further enhance the replacement process of replacing old content items with new content items of the same type, by enabling to place each section of a content item in the respective tagged location of the page. In some exemplary embodiments, the tags may be used for identifying page slots, and for populating sections of content items therein according to the indications of the tags.

For example, the title of a newly fetched content item may be placed within "title" tags, a publishing date of the item may be placed within "date" tags, a thumbnail of the item may be placed within "thumbnail" tags, or the like, e.g., automatically. As another example, when a new article is provided instead of a presented article, the title may be automatically replaced with the new title, the image may be automatically replaced with the new image, and so on. In some exemplary embodiments, using the tags, the HTML structure of the webpage may be preserved, while only the content inside each section of the page may be swapped or updated to display different content.

In some exemplary embodiments, the dedicated tags may enhance the capabilities of the policy editor to control and manage webpages. For example, the dedicated tags may be used to implement the snoozing tool, such as by removing tags of the snoozed slots during the snoozing period (thereby preventing content replacement). As another example, using dedicated tags, other tags, keywords, or the like, of content items, the policy editor may enable the publisher to define a content category for a slot, thereby automatically restricting the presentation of non-compliant content categories by the slot.

In some exemplary embodiments, the dedicated tags may enable the policy editor to perform a visual validation of a webpage customization process, e.g., of the populating of content items into page elements. In some exemplary embodiments, in order to ensure the accuracy of the customization process, a visual validation may be utilized. For example, the policy editor may provide a visual validation tool for validating the process.

In some exemplary embodiments, the visual validation may serve as a quality assurance step that allows editors or other users to confirm that the HTML elements of content items served by the webpage have been correctly tagged according to the predefined criteria. For example, in case the policy editor is implemented as a browser extension, the extension may process the presented webpage, identify tagged elements of content items therein, and provide a presentation indicating all presented elements in the page that are tagged with a same tag.

In some exemplary embodiments, the visual validation tool may allow users to ensure that tagging of content items is performed correctly. For example, the visual validation tool may allow to validate whether tagging of content items added to the CMS, and utilized for populating personalized content items for the personalized slots, are correctly applied. For example, tagging may be added to identify a "title", a "sub-title", an "image", a "date", or other displayed elements that are part of a presented content item. The validation tool may be utilized to allow a user to visually determine whether the tagging is correct, such as by providing a different color or other visual property to each different tag.

Yet another technical solution provided by the disclosed subject matter is generating re-usable templates of webpage policies. In some exemplary embodiments, the policy editor may enable the publisher to define a plurality of abstract policies, referred to as "templates", that can be stored separately and applied or executed over any desired webpage, a plurality of webpages, or the like. For example, templates may be defined, selected, and attached to pages according to FIGS. 8A-10D.

In some exemplary embodiments, the publishers may be enabled to perform template-based customization of webpages. For example, different templates of a webpage may define different editorial control levels for the same page elements. In some exemplary embodiments, the template-based customization of webpages may be refined based on different factors, such as traffic segmentation of end users, type of audience (e.g., paid subscriber vs. non-subscriber), different times, availability of editors, a combination thereof, or the like. As an example, one template of a homepage may be designed to be used on weekends and holidays, while other templates of the same homepage may be used on regular days. As another example, templates with different amounts of personalized content may be utilized for paid subscribers vs. non-registered users.

In some exemplary embodiments, a customized template may be selected for a webpage based on A/B testing of multiple templates. In some exemplary embodiments, the publisher may be enabled to perform an A/B testing in real time, to compare between different policies, different features defined by different policies, or the like.

One technical effect of the disclosed subject matter is enriching capabilities of CMS platform with a high-resolution policy editor that enables to control, for page elements in any level of granularity, an editorial control level, a dynamic locking or switching of an editorial control level, a content category restriction, a de-duplication restriction, a media type restriction, a content provider restriction, an allowed age for content items, or the like. In some cases, the enriched capabilities may increase the management and control capabilities of publishers, to control the content that is presented to end devices.

Another technical effect of the disclosed subject matter is enhancing engagement and revenue opportunities on the open web, resulting in improved metrics such as click-through rates, page views, and reduced bounce rates. From initial tests, a notable increase was measured of about 30% to 50% in Click-Through Rate (CTR) for webpage personalized sections. Testing items in personalized sections versus manually curated sections also provided about 8-13% uplift in PVS per session and about 5% average change to bounce rate. These improvements demonstrate the tangible impact of dynamic webpage customization on user interaction and overall user satisfaction. They also show that more accurate content delivery is implemented with a reduced bandwidth, as users reach desired destinations and experience less occasions where they reach an undesired page that is delivered over the network, which they do not wish to consume.

In some exemplary embodiments, by enabling editors to implement dynamic webpage customizations, editors can personalize the webpage based on user preferences and behaviors, while preserving editorial integrity and brand voice. The personalization may ensure that end users are presented with content that is more likely to be relevant and interesting to them, enhancing the overall user experience. For example, dynamic webpage customization may contribute to increasing user engagement, by showcasing content that aligns with individual interests, thereby capturing and maintaining user attention. By leveraging advanced content aggregation and personalization algorithms, CMS platforms used by publishers can curate and tailor content experiences based on user preferences, behavior, and contextual data. This increased relevance may lead to longer session durations, more page views, higher engagement metrics, or the like. In some cases, dynamic webpage customization may optimize CTRs by improving relevance of the content provided to users. Personalized webpages may lead to higher click-through rates as users are more likely to interact with content that aligns with their interests. This effect may be crucial for publishers aiming to drive traffic to specific articles, features, advertisements, or the like.

For example, a dynamically customization of webpages such as homepages may assist in saving valuable editorial time, expose more content of the publisher to the audience, generate incremental revenue, reduce bandwidth utilization, reduce a browsing time for the end users, provide an improvement in screen real-estate utilization, or the like.

Yet another technical effect of the disclosed subject matter is reducing manual editorial effort. The dynamic webpage customization process streamlines the editorial workflow by automating certain aspects of content curation and personalization, such as using the dedicated tags. This efficiency translates to time savings for editors, allowing them to focus on more strategic and high-impact editorial tasks. As an example, the usage of templates allows for quick attachment and editing of existing policies, without requiring the editorial team to redefine similar webpage policies from scratch.

Yet another technical effect of the disclosed subject matter is enhancing the human-machine interface by enabling intuitive management of digital content that does not require users to have programming knowledge or coding expertise. Unlike traditional systems that depend on script-based configurations or developer intervention, the disclosed subject matter offers a user-friendly interface that allows novice users to manage and customize digital content easily. For example, the verification tool allows publishers to easily perceive mistakes of automated tagging, allowing quick correction thereof. As another example, the presentation of the management tools of the editor policy as an overlay over a managed webpage, in any level or granularity, may be user friendly and easy to use to apply rules or restrictions on page elements. For example, the management tools may enable to temporarily pause or deactivate a particular personalized zone, without the editorial team being required to adjust any HTML code. This reduces the complexity of managing digital content, making advanced CMS functionalities accessible to a wider range of users, including those without technical backgrounds, while preserving flexibility and control over content presentation and organization.

Yet another technical effect of the disclosed subject matter is enhancing the integration of content items from various sources within a same page. By leveraging dedicated tags, content items may be populated seamlessly within the page, enabling the creation of highly adaptive and engaging digital experiences, where content from diverse origins is seamlessly unified and presented in a cohesive manner. Such functionality not only enhances user engagement but also allows organizations to deliver more relevant and targeted content across various channels, including web, mobile, and social media platforms. For example, editors may be enabled to combine and dynamically deliver content from multiple sources, such as from content discovery servers, databases, third-party APIs, user-generated content, and real-time data feeds.

Yet another technical effect of the disclosed subject matter is enabling to verify an automated tagging of content items and page elements, thereby increasing the quality of rendered digital content at end devices and reducing mistakes. In some cases, by providing verification tools, publishers can easily identify any tagging mistakes and control the population of different content items at a plurality of end devices.

Yet another technical effect of the disclosed subject matter is the exposure of more of the publisher's content to readers in appropriate locations. By dynamically customizing webpages, content is strategically placed to match user interests and behaviors. This ensures that a broader range of the publisher's content is showcased to the audience, increasing visibility and potentially leading to higher consumption of diverse content, and a reduced amount of wasted content consumption, and wasted bandwidth utilization.

The disclosed subject matter may provide for one or more technical improvements over any pre-existing technique and any technique that has previously become routine or conventional in the art. Additional technical problems, solutions and effects may be apparent to a person of ordinary skill in the art in view of the present disclosure.

Referring now to FIG. 1 showing a flowchart diagram of a method, in accordance with some exemplary embodiments of the disclosed subject matter.

On Step 100, a webpage may be loaded for editing at a CMS platform. In some exemplary embodiments, the webpage may comprise a plurality of page elements presenting manually curated content, e.g., a slot for presenting a content item, a region aggregating a plurality of slots, or the like. For example, the webpage may be a homepage.

In some exemplary embodiments, the CMS platform may enable one or more editors to edit digital content of the webpage.

On Step 110, a policy editor may be executed over the webpage, e.g., at the CMS platform. In some exemplary embodiments, the policy editor may comprise an executable software that has access to the webpage. For example, the CMS platform may be executed by a web browser, and the policy editor may comprise a browser extension, a plugin, an add-on, or the like.

In some exemplary embodiments, the policy editor may display management tools to the editors, for defining a webpage policy applicable to a plurality of webpages or portions thereof. In some exemplary embodiments, the webpage policy may define configurations for managing and customizing a presentation of content by page elements of each webpage. In some exemplary embodiments, the management tools may be displayed as an overlay, a widget, a toolbar, a builder tool, a side panel, a window, or the like.

In some exemplary embodiments, the management tools may enable the editors to assign, for any personalized page elements of the webpage assigned with the personalized control level, a desired content category. In some exemplary embodiments, the personalized content items from the third-party content discovery server may be served by the personalized page elements in case they belong to a respective content category.

On Step 120, a policy may be generated and incorporated in the webpage, e.g., according to Sub-Steps 122-128. In some exemplary embodiments, code representing the webpage policy may be incorporated into the webpage, thereby obtaining a modified webpage.

On Sub-Step 122, an editorial control level may be selected. For example, the modified webpage may incorporate assigned editorial control levels for page elements such as the first and second page elements.

In some exemplary embodiments, the management tools may enable the editors to assign, for each of the page elements, an editorial control level selected from: a manually curated control level, a manually curated de-duplication control level, a personalized control level, or the like. In some exemplary embodiments, the manually curated control level may be under editorial control while allowing for potential duplicated items. In some exemplary embodiments, the manually curated de-duplication control level may be under the editorial control and may be configured to enforce a constraint preventing duplication of content. In some exemplary embodiments, the personalized control level may be under control of an automated recommendation engine.

In some exemplary embodiments, a first page element may be assigned with the manually curated de-duplication control level, and may present a first manually curated content item. In some exemplary embodiments, a second page element may be assigned with the personalized control level and may be configured to be populated by personalized content items from a third-party content discovery server. In some exemplary embodiments, the constraint may restrict the presentation of the first manually curated content item of the first page element by any page elements of the webpage assigned with the personalized control level. For example, the constraint of the manually curated de-duplication control level may restrict a presentation of the first manually curated content item of the first page element, by the second page element or by any other personalized page elements, e.g., thereby preventing repetition of the first manually curated content item within the webpage.

In some exemplary embodiments, code representing the webpage policy may be incorporated into the webpage, thereby obtaining a modified webpage that incorporates the selected control levels per page element.

On Sub-Step 124, an activation associated with a page element may be scheduled. In some exemplary embodiments, the management tools may enable the editors to set a "snoozing" time window for a page element. In some exemplary embodiments, during the snoozing time window, one or more operations associated with the page element may be restricted. In some exemplary embodiments, the snoozing time window may be daily, weekly, hourly, or the like.

In some cases, during the snoozing time window, manual and/or automatic editing of the page element may be restricted, blocked, or the like. In some cases, during the snoozing time window, an assignment of a personalized control level to a page element may be deactivated. In some cases, during the snoozing time window, the page element may be configured to temporarily present the manually curated content item that was served prior to the snoozing time window, revert to an original manually curated content item of the page (e.g., before replacements of content items), serve a selected content item, or the like. In some cases, during the snoozing time window, the page element may be locked for editorial editing.

In some exemplary embodiments, code representing the webpage policy may be incorporated into the webpage, thereby obtaining a modified webpage that incorporates the snoozing time window for the page element.

On Sub-Step 126, tags of page elements may be validated, e.g., in order to verify the generated webpage policy before it is distributed to end devices.

In some exemplary embodiments, the CMS platform may be configured or adjusted to utilize dedicated tags to indicate where to place different sections of content items. For example, the dedicated tags may comprise HTML tags, or any other type of tags. In some exemplary embodiments, the different sections and/or properties of the content items may comprise a "title" property, a "sub-title" property, an "thumbnail" property, a "date" property, or the like.

In some exemplary embodiments, the page elements may be configured to serve multiple content items according to the dedicated tags. For example, the dedicated tags may be obtained from a third party. As another example, the dedicated tags may be automatically generated at a CDA of the CMS platform.

In some exemplary embodiments, the management tools may comprise a verification tool that enables the editors to verify that the page elements serve the respective content items according to the dedicated tags. In some exemplary embodiments, a selection of a section such as "title" via the verification tool may cause visual markings of the section to be displayed over all of the page elements in the page. In some exemplary embodiments, the visual markings may mark the section to ensure that the content items are placed and served according to the dedicated tags.

In some exemplary embodiments, code representing the webpage policy may be incorporated into the webpage, thereby obtaining a modified webpage that is verified by the verification tool.

On Sub-Step 128, a template may be attached to one or more webpages. In some exemplary embodiments, a webpage policy may be used as a template, and may be attached to one or more webpages, e.g., a first webpage, a second webpage, or the like. For example, the webpage policy may be generated according to Sub-Steps 122-126, Step 120, obtained from a third party, or the like.

In some exemplary embodiments, attaching the webpage policy to a webpage may enforce the configurations of the webpage policy on the webpage. In some exemplary embodiments, attaching the webpage policy to the webpage may comprise incorporating code representing the webpage policy into the webpage, to obtain the modified webpage. In some exemplary embodiments, the webpage policy may constitute a first policy template that is applicable to a plurality of webpages.

In some exemplary embodiments, the policy editor may enable the editors to define the first policy template. For example, the management tools may enable the editors to select a maximal age for content items that are allowed to be served by an attached webpage, a name of the first policy template, allowed content categories for the content items, restricted content categories for the content items, or a boosting setting for the allowed content categories, or the like.

In some exemplary embodiments, the policy editor may enable the editors to define a second, different, policy template that is applicable to the plurality of webpages, e.g., similarly to defining the first policy template. In some cases, the second webpage policy may be attached to the webpage, thereby replacing the first policy template with the second policy template. For example, the second webpage policy may be generated according to Sub-Steps 122-126, Step 120, obtained from a third party, selected from a list of predefined policies, or the like.

In some exemplary embodiments, the policy editor may enable the editors to embed multiple templates, e.g., the first and second policy templates, within a single webpage. For example, the management tools may enable the editors to define that the first policy template should be applied to the webpage according to a first rule and that the second policy template should be applied to the webpage according to a second rule. According to this example, the first and second rules may define a schedule for applying each of the policy templates to the webpage. For example, the schedule may be defined based on a traffic segment to which an end device obtaining the webpage belongs, a subscription status of the end device, a time of month, a time of day, a calendar-defined holiday, or the like.

In some cases, the policy editor may enable the editors to configure the webpage policy to automatically inherit one or more settings from the second webpage policy. For example, the second webpage policy may be defined for a lower granularity level than the webpage policy, causing settings of the second webpage policy to be inherited to higher granularity level policies, except for in cases of explicit overrides.

On Step 130, the modified webpage may be published to be available to one or more end devices of end users, and distributed thereto.

In some exemplary embodiments, publishing the modified webpage may enable the end devices to execute the embedded code of the webpage policy upon rendering the modified webpage on the end devices. In some exemplary embodiments, the code of the webpage policy may be configured to be executed by web browsers of the end devices.

In some exemplary embodiments, the code execution of the webpage policy on end devices, may cause the end devices to request to replace the second manually curated content item with a personalized content item. For example, the code execution of the webpage policy on first and second end devices may result in invocations of first and second respective requests to obtain personalized content items for the personalized page elements of the webpage.

In some exemplary embodiments, in response to the requests, personalized content items may be fetched from the third-party content discovery server. For example, a personalized content item may be selected to be fetched based on recommendations of the automated recommendation engine, e.g., personal recommendations for a user of the respective end device. In some exemplary embodiments, in response to the first request from the first end device, a first personalized content item from the third-party content discovery server may be obtained at the first end device. In some exemplary embodiments, in response to the second request from the second end device, a second personalized content item from the third-party content discovery server may be obtained at the second end device. In some exemplary embodiments, the first and second personalized content items may be different, since the first personalized content item may be personalized for a first user of the first end device and the second personalized content item may be personalized for a second user of the second end device.

In some exemplary embodiments, the second manually curated content item of the second page element may be replaced, at the first end device, with the first personalized content item, e.g., before the webpage is displayed to the first user of the first end device. In some exemplary embodiments, the second manually curated content item of the second page element may be replaced, at the second end device, with the second personalized content item, e.g., before the webpage is displayed to the second user of the first end device. For example, the personalized content item may be served by the second page element, by the first and second end devices. In some cases, automated replacements of the manually curated content with alternative personalized content items may be performed according to the dedicated tags of the verification tool.

In some cases, in response to a request for a personalized content item failing to obtain the personalized content item from the third-party content discovery server, the second manually curated content item may be served by the second page element instead of the personalized content item. In some exemplary embodiments, this may enable the user experience of the end users not to be damaged by failures to obtain server content.

In some exemplary embodiments, the code execution of the webpage policy at the end devices may cause the end devices to request to replace at least the second manually curated content item of the second page element with a personalized content item that is different from the first manually curated content item of the first page element, e.g., due to the de-duplication constraint of the first page element as set on Sub-Step 122. For example, the end devices may invoke a request to obtain the personalized content item for the second page element, that complies with the de-duplication constraint. In some exemplary embodiments, the personalized content item may be selected to be fetched, by the automated recommendation engine, based on the personalized content item complying with the constraints of the webpage policy, such as the de-duplication constraint.

In some exemplary embodiments, the code execution of the webpage policy at the end devices may cause the end devices to request to replace a manually curated content item displayed by the page element with a personalized content item outside of a snoozing time window, e.g., as set on Sub-Step 124.

Figure 2:
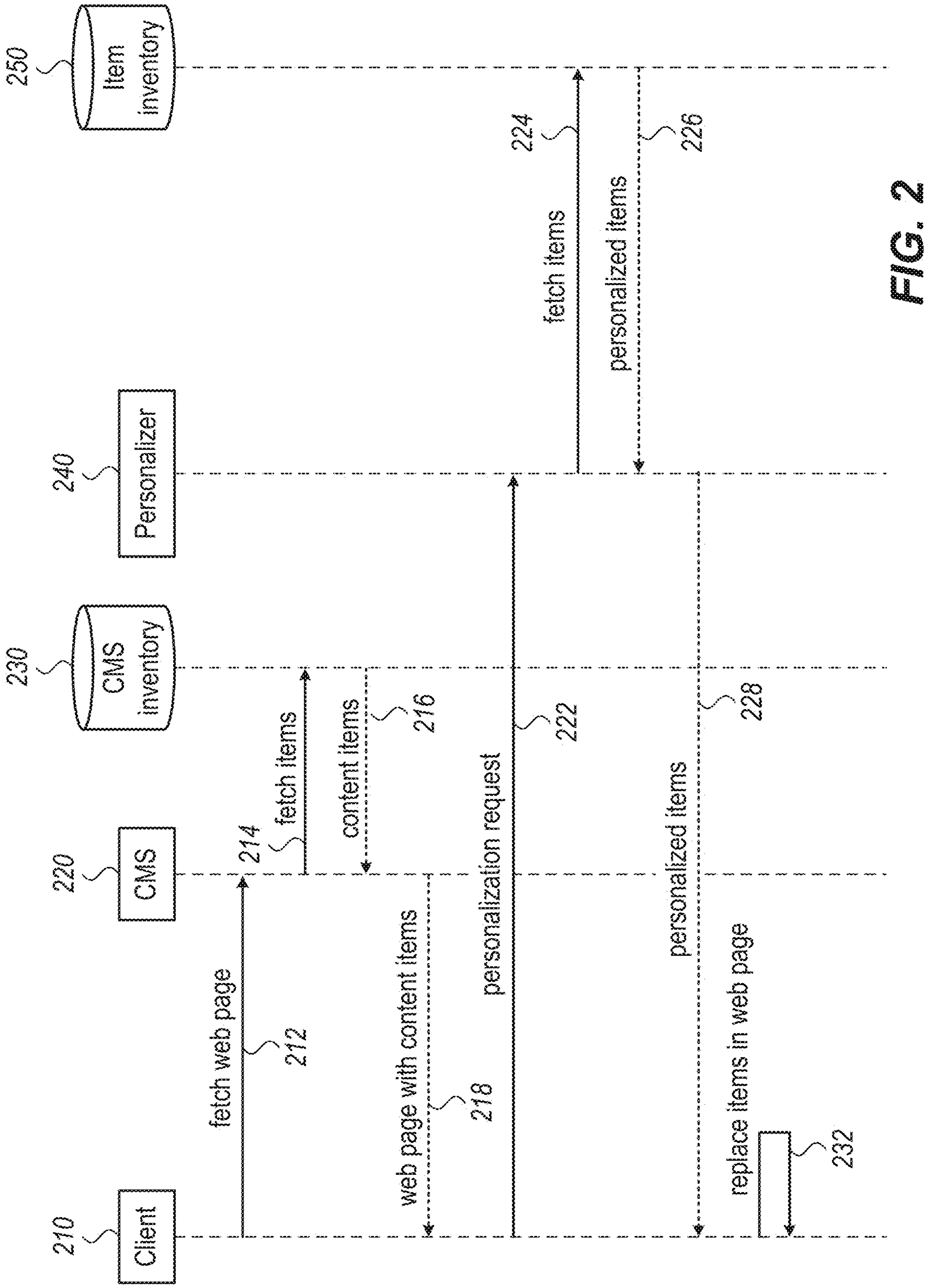
FIG. 2 shows an exemplary sequence diagram, in accordance with some exemplary embodiments of the disclosed subject matter.

Referring now to FIG. 2 showing an exemplary sequence diagram, in accordance with some exemplary embodiments of the disclosed subject matter.

In some exemplary embodiments, an end device such as Client 210 may invoke a request (212) to fetch a webpage. For example, a user of Client 210 may execute a web browser and navigate between webpages through the web browser, e.g., by clicking Uniform Resource Locator (URL) links, selecting content items, or in any other way.

In some exemplary embodiments, a webpage requested by Client 210 may be retained by an inventory of a publisher system, e.g., CMS Inventory 230. In some exemplary embodiments, the publisher system such as a CMS 220 may obtain the webpage request from Client 210 and access CMS Inventory 230 to retrieve or fetch (214) the requested webpage therefrom. In some exemplary embodiments, retrieving the requested webpage may comprise retrieving an initial webpage in which all page elements of the webpage serve manually curated content items that are manually curated by a publisher, an editor, or the like.

In some exemplary embodiments, after CMS 220 retrieves the requested manually curated content items of the initial webpage (216), CMS 220 may serve (218) Client 210 with the initial webpage and its content items. In some exemplary embodiments, the webpage may be embedded with code, such as a JavaScript™ snippet, including a management policy for the webpage. In some exemplary embodiments, upon obtaining the initial webpage, Client 210 may execute the embedded code at the client side, in order to execute the management policy defined for the webpage. In some cases, the management policy may define an editorial control level of page slots, defining which slots of the webpage should be used for serving personalized content items for a user of Client 210 (as opposed to manually curated items).

In some exemplary embodiments, the execution of the management policy may trigger one or more personalization requests to be invoked (222) from Client 210, a web browser thereof, or the like. In some exemplary embodiments, the personalization requests may be provided to a content discovery server, such as Personalizer 240, directly or via CMS 220. In some exemplary embodiments, Personalizer 240 may retain an inventory of content items of various content categories, with various properties, or the like. For example, Personalizer 240 may retain Item Inventory 250.

In some exemplary embodiments, the personalization requests may request one or more content items for defined sections of the initial section, along with one or more constraints or rules for selecting the content items. For example, only content items of a specific content category may be requested. In some exemplary embodiments, Personalizer 240 may obtain the personalization requests, and fetch (224) content items that comply with the associated constraints or rules from Item Inventory 250. In some cases, Personalizer 240 may utilize one or more recommendation engines, heuristic engines, Artificial Intelligence (AI) engines, machine learning engines, or the like, to select from Item Inventory 250 content items that are tailored to a user of Client 210, while complying with the personalization requests.

In some exemplary embodiments, Personalizer 240 may obtain (226) the requested personalized content items from Item Inventory 250, and provide (228) them to the requesting software of Client 210. For example, the personalized content items may be provided to Client 210 directly or via CMS 220.

In some exemplary embodiments, the requesting software of Client 210, such as the web browser thereof, may obtain the personalized content items and incorporate them in the webpage. For example, Client 210 may replace (232) items that are classified as personalized by the management policy, with the personalized content items. In some cases, Client 210 may place each section of the personalized content items within an area of the respective page element that is tagged accordingly. For example, a title of a personalized content item that is designated to be served by a page element, may be presented in an area of the page element indicated as "title", e.g., replacing a title of a previous content item. In some exemplary embodiments, after replacing manually curated content items of the initial webpage with the personalized content items, the revised webpage may be rendered and presented to the user.

Figure 3:
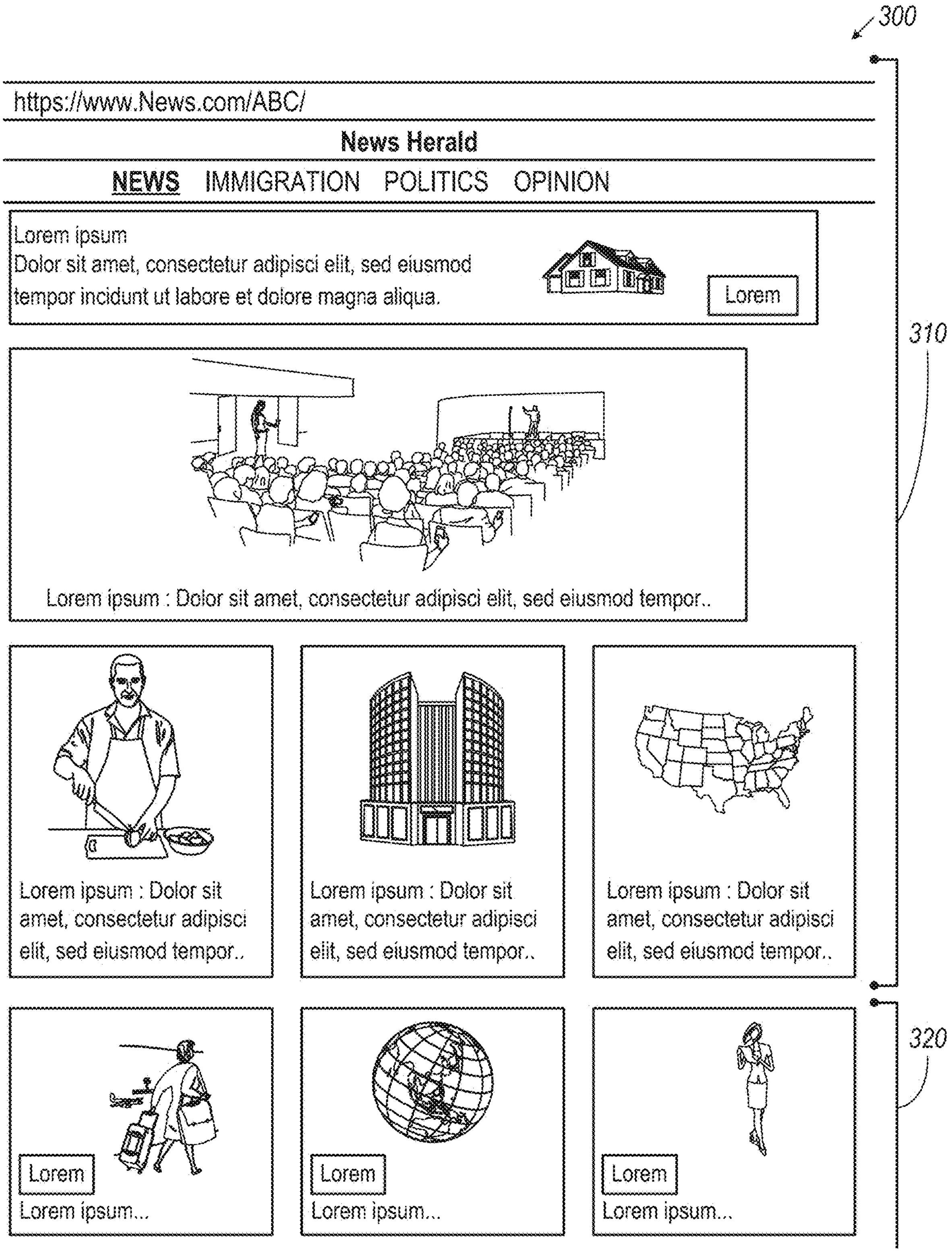
FIG. 3 shows an exemplary webpage, in accordance with some exemplary embodiments of the disclosed subject matter.

Referring now to FIG. 3 showing an exemplary webpage, in accordance with some exemplary embodiments of the disclosed subject matter.

In some exemplary embodiments, a webpage such as Webpage 300 may comprise a webpage that is retained in an inventory of a CMS platform, and may be published and distributed to one or more end devices. In some cases, Webpage 300 may comprise a homepage or any other webpage that is configured to display content from at least two sources, of at least two types, or the like. In some exemplary embodiments, a webpage such as Webpage 300 may be composed of distinct zones, which may be set or defined by the publisher in an initial implementation phase. Each zone may comprise a different or identical number of slots for displaying respective content items. For example, an editorial team may utilize the CMS platform to designate Section 310 of Webpage 300 as a manually curated zone that was manually curated by editors via the CMS platform, while Section 320 may be designated as a personalized zone that is curated automatically by a recommendation engine. For example, Section 320 may be configured to display content personalized for an end user rendering Webpage 300, such as tailored suggestions, personalized articles, videos, product recommendations, advertisement, or the like.

In some exemplary embodiments, Section 310 may be designated to serve staff-created content that the editors consider to be mandatory, broad, or important. For example, editors of the CMS may consider content to be mandatory in case it is universally relevant, in case of "must-know" information, or the like, such as main articles, important news updates, current events, essential announcements, breaking news, top headlines, critical information that is of broad interest to the entire audience visiting the webpage, or the like. In some exemplary embodiments, the content of Section 310 may be designed to appeal to a broad audience, encouraging increased user visits and engagement.

In some exemplary embodiments, Section 320 may be configured to provide different content to different end users, such as content that is personalized for each end user that renders Webpage 300. In some exemplary embodiments, Section 320 may be designed to create, for each end user, a user experience that is more individualized and engaging than Section 310. For example, Section 320 may comprise content that is tailored to match the interests, behaviors, and preferences of individual users, e.g., as predicted by a recommendation engine. In some exemplary embodiments, personalization of content, as provided by Section 320, may lead to higher user satisfaction, longer session durations, an increased likelihood of return visits, a reduced number of bounce-back operations, and accordingly, to a reduced bandwidth utilization. In some exemplary embodiments, Section 320 may be powered by one or more editor-enhanced algorithms that provide personalized content tailored to individual preferences.

In some exemplary embodiments, a dynamic customization of Webpage 300, such as the personalization of Section 320, may be configured to significantly improve different metrics, such as user engagement, content relevance, overall reader experience, or the like. In some exemplary embodiments, combining both manually curated and personalized types of sections in a single page may offer a comprehensive and appealing webpage that caters to both the broad interests of the audience and the specific preferences of individual users.

Referring now to FIGS. 4A and 4B showing exemplary editorial control levels of a webpage, in accordance with some exemplary embodiments of the disclosed subject matter.

In some exemplary embodiments, in order to enrich the customization capabilities provided by the CMS platform, a policy editor may be executed (e.g., as a browser extension such as Google™ Chrome™) to enable an editorial team to generate and apply policies for page elements such as regions or slots. In some exemplary embodiments, a policy editor may be executed over a website or webpage, e.g., Webpage 400, in order to facilitate the process of customization of the webpage. In some exemplary embodiments, the policy editor may be executed by the publisher, e.g., on the server side, by the CMS platform, in a user device associated with the publisher's editorial team, or the like. For example, the policy editor may be executed as a browser-extension such as Chrome™ extension interface, an add-on, a plugin, a website that adds an overlay on top of a target webpage, a website interface, a co-pilot, or the like.

In some exemplary embodiments, the policy editor may be used by one or more users that are associated with a publisher, a CMS system, or the like. For example, the users may comprise editors, editorial teams, or administrators, tasked with tailoring the content of the webpage using the policy editor. In some exemplary embodiments, the users may utilize one or more management tools of the policy editor in order to generate or apply a policy on a webpage, such as assigning an editorial control level for zones within the webpage layout as manually curated zones or automatically personalized zones. In some exemplary embodiments, the management tools may allow to restrict personalized content delivery to specific content categories or subcategories, to adjust personalized algorithms used by the recommendation engine per zone, or the like.

In some exemplary embodiments, the policy editor may enable editors to manage or control Webpage 400 in one or more levels of granularity. For example, Webpage 400 may have a website level of granularity, a page level of granularity, a regional level of granularity (aggregating multiple slots), a slot level of granularity, or the like. According to this example, the page level of granularity may refer to the entire page, the regional level of granularity may refer to a section of the page that aggregates one or more slots, and the slot level of granularity may refer to a slot in the page that can display a respective content item, a content object, or the like. It is noted that the terms "region", "segment" and "section" are used interchangeably throughout this disclosure, referring to aggregated slots. As an example, Region 440 may comprise multiple slots, each of which configured to display different content items. Zones may refer to any level of granularity.

In some exemplary embodiments, the policy editor may provide users with enhanced control over the rendering of the webpage on end devices, allowing the webpages to implement dynamic customization and personalization at each end device, e.g., according to the corresponding end users. In some exemplary embodiments, customizing webpages dynamically may involve implementing an executable policy over distributed webpages, to enable editors to maintain control over their webpage experiences while they are rendered on end devices. In some exemplary embodiments, personalizing webpages dynamically may involve integrating one or more heuristic engines, Artificial Intelligence (AI) engines, or the like, to surface content tailored to individual reader interests at each end device. For example, editors may utilize an AI engine to integrate one or more AI layers to serve personalized content to end users. In some exemplary embodiments, personalizing webpages dynamically may involve scheduling application of policy rules.

In some exemplary embodiments, personalizing content items served by webpages may rely on one or more software platforms, services, or servers, such as a content discovery server, a content discovery platform, an advertising platform, or the like. In some exemplary embodiments, in order to perform dynamic personalization of webpages, a content discovery platform, an AI layer, a recommendation engine, or the like, may be configured to provide recommendations of content to be displayed by the publisher. In some cases, the content recommendations may be configured to direct end users to consume content more relevant to their interests, more engaging, or the like, compared with curated content. In some exemplary embodiments, a content discovery server may be utilized to provide personalized recommendations of content for different end users in digital assets of the publisher such as their sites, platforms, webpages, or the like.

For example, a content discovery platform such as TABOOLA™ may be used to provide personalized recommendations of content to Webpage 400. In some cases, a content discovery platform may be used by publishers and advertisers to promote their content, products, or services to a wider audience. The content discovery platform may be configured to analyze user behavior, preferences, and context to deliver relevant content recommendations in the form of sponsored articles, videos, or other types of content. For example, the content discovery platform may be configured to provide content recommendations in a manner engaging end users with additional content that matches their interests, keeping them on the site longer. The content discovery platform may be configured to operate through a widget or software module that publishers can integrate into their websites.

In some exemplary embodiments, the policy editor may provide a user interface such as an overlay, a builder tool, a widget, a window, a panel, or the like, that presents management tools that enable to generate a policy (e.g., a webpage policy) for a presented page. In some exemplary embodiments, the "policy" may comprise a series of filters, rules, parameters, settings, processes, or the like, defined based on structured page properties like Uniform Resource Locator (URL), tags of the CMS system such as meta tags, fields, or the like. In some exemplary embodiments, the policy may define, for a page element, settings such as content category for each page element (e.g., using keywords or tags), an allowed age of content items, an allowed or restricted content type, an allowed or restricted content provider or source, a paywall status, a type of media of each page element, or the like. In some cases, the parameters may be available as both inclusions and exclusions.

In some exemplary embodiments, Webpage 400 may be customized statically or dynamically, e.g., by editors of the CMS. In some exemplary embodiments, the user interface of the policy editor may enable editors to define, at any desired level of granularity, whether the respective zone of the page should be personalized or manually curated. For example, as depicted in FIG. 4A, the policy editor may enable editors to assign Regions 410*a* and 420*a* as personalized zones, for which the content discovery platform may be configured to automatically recommend and provide content. As another example, the policy editor may enable editors to configure Regions 430, 440 and 450 as manually curated zones that are under the publisher's control. As an example, an initial homepage shown in FIG. 4A may be updated to present personalized content in relevant zones, as is exemplified in FIG. 4B.

In some exemplary embodiments, the selections, rules, and/or configurations for Webpage 400, e.g., as selected by editors via the policy editor, may be referred to as a "management policy" or "webpage policy" of the page. In some exemplary embodiments, after the management policy is set by the editors, a software representation of the management policy, such as a widget, snippet, or software module, may be integrated or embedded into Webpage 400. In some exemplary embodiments, after integrating the management policy in the page, Webpage 400 may be published, made available, and/or distributed by a web server of the publisher to a plurality of client devices.

In some exemplary embodiments, Webpage 400 may be published, served, and/or distributed in an initial version, in which all slots serve manually curated content items. For example, a web server of the publisher may serve content defined by the CMS platform, such as an initial version of Webpage 400 that is composed of manually curated content of the publisher. In some exemplary embodiments, the initial version of Webpage 400 may be distributed to a plurality of client devices, which may be enabled to render or load Webpage 400, e.g., by local web browsers of the end devices. For example, within the initial version of Webpage 400, Regions 430, 440, 450, 410*a* and 420*a* may all be set to serve manually curated content items, e.g., the content items displayed in FIG. 4A.

In some exemplary embodiments, after an end device fetches the initial version of Webpage 400, code representing the embedded policy may be executed locally, causing update requests to be generated by the end device, e.g., as described with respect to FIG. 2. In some exemplary embodiments, the management policy may comprise client-side code embedded within Webpage 400, and the client-side code may trigger the content update. For example, the client-side code may be executed on the client device and the code may invoke one or more requests, Application Programming Interface (API) calls, or the like, to obtain additional content. As another example, the client-side code may trigger a Server-To-Server (S2S) integration to implement the management policy and update the content of Webpage 400. Webpage 400 may be updated in any other way, using API-based techniques, processes triggered by the client device, processes triggered by a web browser of the client device, or the like.

In some exemplary embodiments, the client-side code may invoke a request to obtain replacement personalized items to replace at least a portion of the original manually curated content served by the page elements. For example, the client-side code may request replacement personalized items to replace manually curated items of zones of Webpage 400 that are indicated by the management policy as personalized, e.g., zones 410*a* and 420*a*. In some exemplary embodiments, the request may be provided to a content discovery platform, e.g., directly, indirectly via a CMS platform, or the like. In some exemplary embodiments, in response to the request, the client devices may obtain the requested replacement personalized items, and update Webpage 400 accordingly. For example, once the obtained content is served to the client device, the new personalized content may be displayed by Webpage 400 instead of one or more zones of the original manually curated content.

In some cases, a content object being served may have various sections such as a title, a sub-title, an image or thumbnail, an author name, a category name, a date of publication, a date of a last edit, or the like. For example, multiple User Interface (UI) elements may be utilized to display a content object, such as titles, sub-titles, textual teaser texts, images, links, or the like.

In some exemplary embodiments, in order to enable an accurate and automatic replacement of content items at various client devices, the publisher and/or any other entity or software associated with the CMS platform may add dedicated HTML tags to page elements of a distributable page, e.g., to each level of granularity, to a subset of levels of granularity, or the like. For example, dedicated HTML tags may be added to each slot, to each section, or the like. In some exemplary embodiments, the HTML tags may be indicative of one or more rules applicable to the respective page elements, characterizations of the respective page elements, or the like, such as defining a placement for each section of content items, defining a content category to which the content item must belong, defining an allowed or restricted source for the content items, defining an allowed or restricted type of media of the content items, or the like. In some cases, a section of a content item may refer to UI elements utilized to display the content, such as "image", "title", "URL", "thumbnail", or any other property of content items configured to be displayed by a slot.

For example, a page element may be tagged with a restriction associated with content-based category groups such as "More News", "Security", "Environment", "Culture", "News", "Health", "Business Advice", "Religion", "Science", "Space", "Education", or the like. In some exemplary embodiments, a selected category for content of a personalized page element may configure the page element to display content for the user in accordance with the tag or categorization. As an example, Region 420*a* may be tagged as a "More News" category, thereby configuring Region 420*a* to display one main article section tagged as "News" in a prominent slot, and to display three secondary content items that are also tagged as "News" in secondary slots (e.g., smaller slots).

In some exemplary embodiments, the dedicated HTML tags may be added by the publisher and/or any other entity or software associated with the CMS platform. For example, a Content Delivery Application (CDA) of the CMS that is configured to compile and update digital content, may be responsible for adding the tags at the correct locations. In some exemplary embodiments, the dedicated HTML tags may be added automatically based on one or more rules, by execution of a manually drafted computer program code, using language models, trained classifiers, or the like.

In some exemplary embodiments, the dedicated HTML tags may be used by the client-side code of a client device to replace content items. In some exemplary embodiments, the client-side code, when executed on end devices, may request to replace manually curated content of Webpage 400 with replacement personalized items, for zones designated as personalized zones such as Regions 410*a* and 420*a*. In some exemplary embodiments, after the client-side code requests replacement personalized items, the content discovery platform may be configured to provide recommendations for content to be displayed Regions 410*a* and 420*a*.

In some exemplary embodiments, the recommendations may be automatically determined based on characteristics of a user of the client device that made the request (e.g., a user visiting or browsing Webpage 400). For example, the characteristics of the user may comprise a user profile, a traffic segment of the user, their browsing history, or the like. As another example, the characteristics of the user may comprise categories such as age, gender, browsing history, identified hobbies, or the like. In some exemplary embodiments, the recommendations may be automatically determined based on contextual factors, such as the platform from which the client device visited Webpage 400, a day of the week in which the request was invoked, a time of day, a referrer (e.g., search engine, social media), or the like. In some exemplary embodiments, the recommendations may be automatically determined based on trends, such as content items that are currently trending among other users. For example, real-time analytics and popularity metrics may be leveraged to identify trends and suggest trending content that is timely and relevant. In some exemplary embodiments, content items that are recommended for a user may be considered to be "personalized" with respect to the user, and may be referred to as personalized content items.

In some exemplary embodiments, based on the recommendations made by the content discovery platform, personalized zones such as Regions 410*a* and 420*a* may be populated with corresponding personalized content items. For example, the content items may be obtained from a remote server, such as from an item inventory of a personalizing server such as a content discovery platform, a CMS inventory of a CMS platform, or the like. As another example, the content items may be obtained from a local repository of content items stored in the client device.

In some exemplary embodiments, an obtained personalized content item may be populated into a slot of Webpage 400 designated as personalized, replacing a pre-existing manually curated content item. For example, as depicted in FIG. 4B, the manually curated content of Regions 410*a* and 420*a*, in the initial webpage of FIG. 4A, may be replaced with personalized content items of Regions 410*b* and 420*b*. In some exemplary embodiments, the remaining regions and slots of FIG. 4A, that were not selected to be personalized, or that were selected to be manually curated, may remain without change, as depicted in FIG. 4B.

In some exemplary embodiments, the dedicated HTML tags may be used for automatically populating the personalized content items into personalized regions such as Regions 410*b* and 420*b*. In some exemplary embodiments, once a personalized content item is obtained, the HTML tags may indicate where to populate each section or element of the content item. For example, the title of the selected element may be placed within "title" HTML tags, the Uniform Resource Locator (URL) of an article associated with a content item may be placed within "URL" HTML tags, the image or thumbnail may be placed within "image" HTML tags, or the like. In some exemplary embodiments, the client-side code may be configured to populate the personalized regions periodically, according to the dedicated tags.

In some exemplary embodiments, after the personalized regions are populated, the corresponding user of the client device may be presented with Webpage 401. For example, Webpage 401 may be rendered by a web browser to be displayed.

Figure 5A:
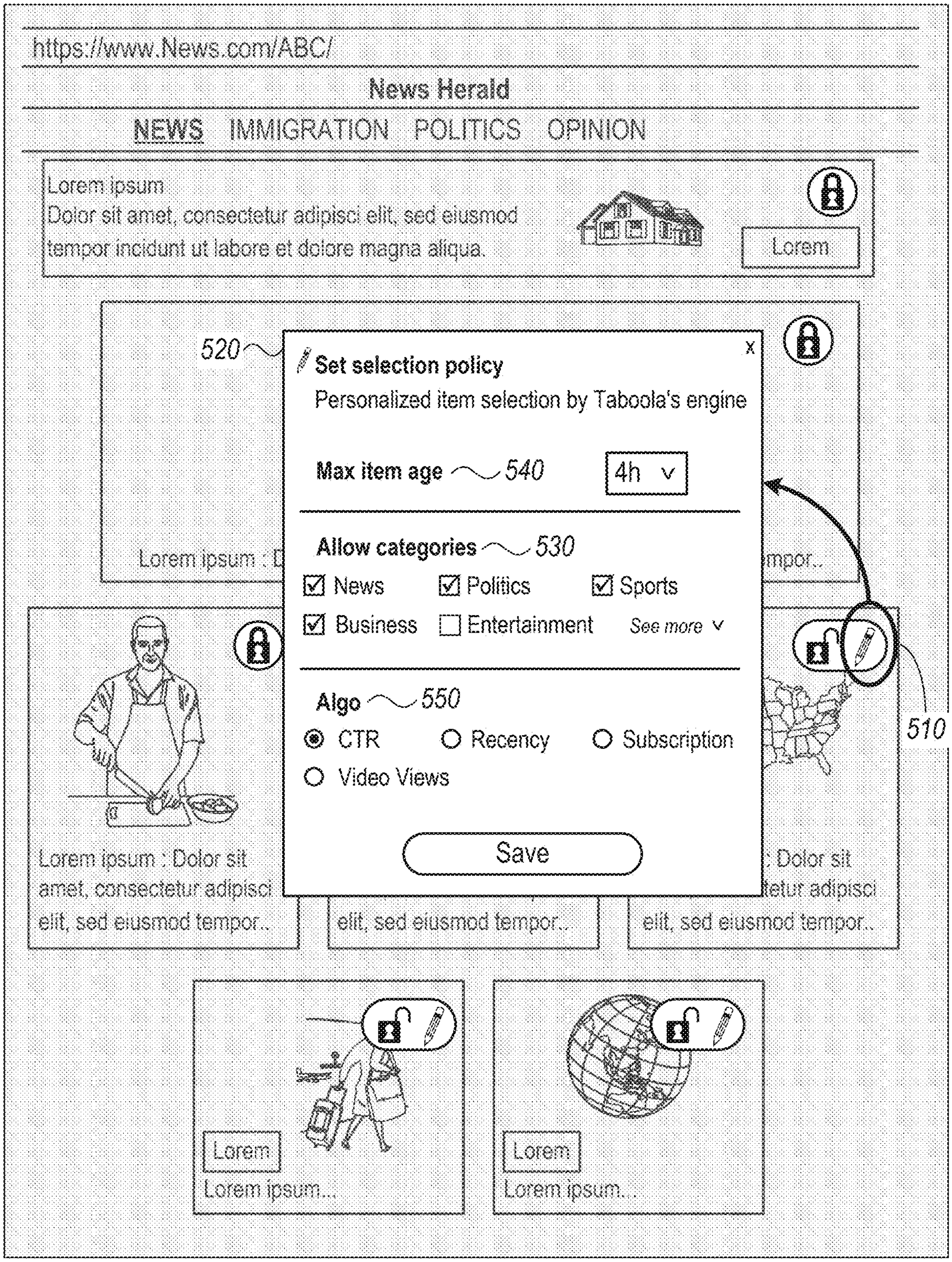
FIG. 5A shows an exemplary content and algorithm customization tool of a policy editor, in accordance with some exemplary embodiments of the disclosed subject matter.
Figure 5B:
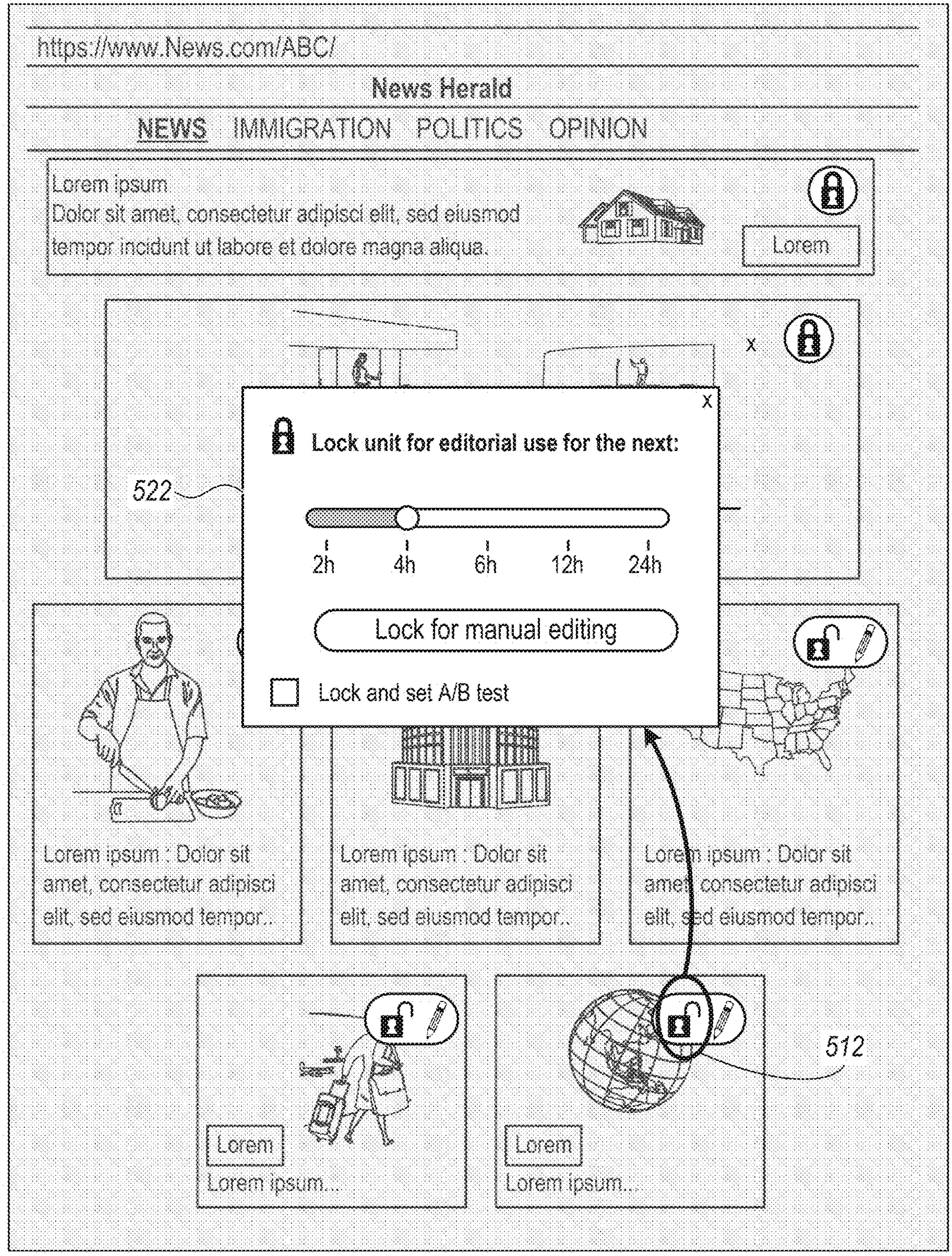
FIG. 5B shows an exemplary snoozing tool of a policy editor, in accordance with some exemplary embodiments of the disclosed subject matter.

Referring now to FIG. 5A showing an exemplary content and algorithm customization tool of a policy editor, in accordance with some exemplary embodiments of the disclosed subject matter.

In some exemplary embodiments, the policy editor may enable editors to control, via a software layer such as Layer 520, one or more content categories of personalized page elements at any level of granularity (regions, slots, or the like). In some exemplary embodiments, Layer 520 of the policy editor may empower the publisher with a range of management tools to tailor the personalized zones on the webpage. The publisher may be enabled to set parameters, to govern the personalization process, or the like. As an example, as depicted in FIG. 5A, the publisher may be enabled to set a selection criteria for selecting content items to be served by a personalized zone. These management tools empower publishers with a high degree of flexibility and customization, allowing them to strategically manage the dynamic editorial control and personalization of the webpage based on their content strategy and audience engagement goals.

In some exemplary embodiments, Layer 520, management tools thereof, or the like, may be implemented as one or more windows, as an overlay over the webpage, as an overlay over a slot or region, as a side panel adjacent to the webpage, as a side panel separate from the webpage, or the like. In some cases, placing the management tools of Layer 520 as an overlay over page elements may enable to enhance the user's experience by making the control process more intuitive and user-friendly.

In some exemplary embodiments, the policy editor may enable editors to define, via a software augmented layer such as Layer 520, which content categories of content items are allowed to be populated into each personalized page element. For example, in the scenario of FIG. 5A, Layer 520 may display an Allowed Categories Section 530, for configuring allowed categories of content to be served by a page element such as Personalized Slot 510. As depicted in FIG. 5A, a selection of allowed content for a slot such as Personalized Slot 510 may be performed via Allowed Categories Section 530. In some cases, the selection may enable or allow to populate Personalized Slot 510 with content items belonging to content categories such as "News", "Politics", "Sports", and "Business", and content items of the selected categories may be recommended by the content discovery platform to be served within Personalized Slot 510. In other cases, any other categories of content may be selected via Allowed Categories Section 530. For example, the policy editor may enable the publisher to select categories of content such as "Entertainment", "Security", "Environment", "Culture", "Health", "Gossip", or the like. As an example, a publisher focusing on health and wellness may restrict a zone such as Personalized Slot 510 to display only content related to health and fitness.

In some cases, instead of including a section for allowed or whitelisted categories, such as Allowed Categories Section 530, the policy editor may display a section for restricted or excluded categories (not depicted). The policy editor may enable the publisher to select categories of content to be excluded, blacklisted, not displayed, or the like, within a selected page element or zone. For example, the publisher may select via Layer 520 to exclude content items categorized as "Sports" from Personalized Slot 510. According to this example, the content discovery platform may be enabled to recommend content items from any category except of "Sports", for being served by Personalized Slot 510.

In some exemplary embodiments, the policy editor may enable a publisher to select content to be displayed or forbidden within each zone according to any other rules, properties, regular expression, or the like, e.g., regardless of the category of the content. In some cases, content items may be allowed to be presented, or restricted, based on a property of the article, such as its author, source, access-level, media type, or the like. For example, a regular expression may be used as a rule. For example, the rule may define that only articles authored by "John Smith" may be allowed to be presented by a page element such as Personalized Slot 510, regardless of their category. In some cases, the rule may comprise two or more nested rules that apply only within a selected category of content. For example, within the "Sports" category, only articles authored by "John Smith" may be allowed to be presented by a page element, while within the "Business" category, the page element may be allowed to serve content items by any author.

In some exemplary embodiments, the policy editor may enable editors to control, via the management policy, a maximal "age", or serving time, of a respective page element. In some exemplary embodiments, the publisher may be enabled to set a maximal age or time limit for displaying a personalized content item within a specific zone, in time units such as hours, minutes, or the like. In some exemplary embodiments, the time limit functionality may be used to ensure that the content stays fresh and relevant to the users.

As an example, Layer 520 may display a Maximum (Max) Item Age Section 540, for configuring the maximal age or time limit for displaying a content item in Personalized Slot 510. As depicted in FIG. 5A, a publisher's selection for Personalized Slot 510 performed via Max Item Age Section 540, may set a rule that content that is shown in Personalized Slot 510 (or any other page element such as region) must not be older than 4 hours. In other cases, any other time limit may be set.

In some exemplary embodiments, the policy editor may enable editors to control, via the management policy, metrics upon which the personalization of a respective page element should be performed. In some exemplary embodiments, potential metrics may comprise a Click-Through Rate (CTR) metric, prioritizing content based on their CTR. For example, CTR may measure the percentage of users who clicked on a link of a content item after seeing it, indicating the effectiveness of the content item. In some exemplary embodiments, potential metrics that can be selected to be used by the recommendation engine may comprise a Recency metric, configured to rank content items based on how recently they were published or updated. For example, the ranking may favor fresh content, making it useful for time-sensitive or trending topics. In some exemplary embodiments, potential metrics that can be selected to be used by the recommendation engine may comprise a Subscriptions metric, configured to prioritize content based on a subscription status of the end devices. In some exemplary embodiments, potential metrics that can be selected to be used by the recommendation engine may comprise a Video Views metric, configured to rank content items based on the number of views a video or other media has received. In some exemplary embodiments, potential metrics that can be selected to be used by the recommendation engine may comprise any other engagement-related metrics, conversion-related metrics, performance indicators, or the like.

As an example, Layer 520 may display an Algorithm (Algo) Section 550, for selecting the metrics that should be used by the recommendation engine when recommending and/or selecting content items for Personalized Slot 510. For example, in case a CTR metric is selected for Personalized Slot 510, the recommendation engine may recommend content items for Personalized Slot 510 based on previously measured CTRs of the content items. In some exemplary embodiments, the ability to customize the personalization of content items based on specific performance indicators allows publishers to optimize content recommendations according to their strategic goals. In some exemplary embodiments, the selection of a metric from Algo Section 550 may change or adjust a target goal of an algorithm employed by the recommendation engine and/or the content discovery platform to perform the selection of the personalized content items.

Referring back to FIGS. 4A and 4B, after a user selects content categories of personalized page elements, such as via the editor of FIG. 5A, the content discovery platform may be configured to select personalized content items according to the selected content categories. For example, the content discovery platform may obtain a request for content items along with the respective management policy, e.g., the configurations, constraints, and/or categories of the content items. According to this example, the content discovery platform may determine recommendations that comply with the requirements of the management policy.

In some exemplary embodiments, the content inside personalized sections such as Regions 410*a* and 420*a*, may be dynamically swapped with content that complies with a selected category, an equivalent tagging, categorization of tags, or the like. In some exemplary embodiments, the swapping may not affect the layout and design of the Webpage 400, maintaining it unchanged.

For example, in case the management policy was selected, via the editor of FIG. 5A, to incorporate content categories such as "Environment" into Region 410*a* of FIG. 4A, the content discovery platform may recommend a content item that is tagged as "Environment" content, and such item may be presented by corresponding Region 410*b*, e.g., as depicted in FIG. 4B.

Referring now to FIG. 5B showing an exemplary snoozing tool of a policy editor, in accordance with some exemplary embodiments of the disclosed subject matter.

In some exemplary embodiments, the policy editor may enable editors to control, via the management policy, a locking or snoozing feature of personalized page elements such as Element 512 at any level of granularity (regions, slots, or the like). In some exemplary embodiments, the policy editor may enable the publisher to define, via a software layer such as Layer 522, a selected time frame, referred to as the "snoozing timeframe", for locking one or more functionalities of the page element. For example, during the snoozing timeframe, an editorial control level of a page element may be swapped, deactivated, or the like. As another example, during the snoozing timeframe, any editing or replacement of content served by the page element may be blocked, restricted, or the like.

In some exemplary embodiments, the snoozing feature may offer flexibility in scheduling the snoozing timeframe. For example, the snoozing timeframe may comprise a future timeframe, such as between 2 PM and 3 PM tomorrow, a currently starting timeframe such as from now on for another four hours (as depicted in FIG. 5B), or the like. In some exemplary embodiments, the snoozing timeframe may be set to be aligned to specific events, times of the day, editorial schedules, or the like. As an example, a zone may be scheduled to be assigned as personalized during weekends when editorial staff availability is limited, and to be assigned as manually curated at other times.

In some exemplary embodiments, the publisher may be enabled to lock, via Layer 522, editorial access to the page element for the snoozing timeframe, thereby locking the manual and/or automatic editing of the element and preventing editors from making changes to presented content.

In some exemplary embodiments, the publisher may be enabled to lock, via Layer 522, the page element for personalization, thereby preventing the replacement of manually curated content items of the page element with replacement personalized items for the snoozing timeframe. In some exemplary embodiments, during the snoozing timeframe, automated personalization features for the page element may be temporarily halted and instead current content, e.g., manually curated content, will be shown to all users. For example, this may prevent automated changes of content items for a predetermined time period, allowing publishers to maintain editorial control over specific sections of the webpage. As another example, personalization locking may allow publishers to ensure that specific sections of the page undergo manual curation when necessary, emphasizing the importance of editorial control at strategic times. Publishers can schedule when personalization is activated or deactivated for a particular zone.

In some exemplary embodiments, through intuitive interactions with the policy editor, the publisher may efficiently manage slot customization, defining for each slot its editorial control level, whether it should be snoozed and when, or the like.

Referring now to FIG. 6 showing an exemplary deduplication tool of a policy editor, in accordance with some exemplary embodiments of the disclosed subject matter.

In some exemplary embodiments, a personalized content item may be selected, by a recommendation engine, for an end user from the entire inventory of the content discovery platform, even if the content item is already served by a manually curated slot. In such cases, the manually curated item may be repeated in the personalized slots. In some cases, the policy editor may allow publishers to prevent such repetitions using a "Do Not Repeat" tool, also referred to as a de-duplication tool.

In some exemplary embodiments, as depicted in FIG. 6, the policy editor may enable editors to control, via the management policy, whether content items served by a manually curated page element are allowed to be duplicated by other page elements in the webpage. In some exemplary embodiments, the policy editor may enable the publisher to assign, via a software layer such as Layer 630, a selected editorial control level for a page element, e.g., as a manually curated element, a personalized page element and/or a de-duplicated manually curated page element.

In some exemplary embodiments, the policy editor may enable the publisher to select, via Control 634, to set a page element such as a manually curated slot to be de-duplicated (de-duped). In some exemplary embodiments, Control 634 may comprise a sliding widget as appearing in FIG. 6, or any other visual tool or control. For example, Control 634 may comprise a "Do Not Repeat" tool that enables the publisher to mark or flag a page element as de-duped, so that the content item associated with the page element does not reappear in personalized content items of the page.

In some exemplary embodiments, Control 634 of the policy editor may ensure a diverse and unique content experience for end users, preventing redundancy across different sections of the page and contributing to a more dynamic and engaging browsing environment for users. For example, Page Elements 642 may be assigned, on a region or slot level, as de-duplicated, and Page Elements 644 may be assigned as personalized. For example, a designated widget such as Control 632 may enable publishers to assign a page element as personalized, and a designated widget such as Control 634 may enable publishers to assign a page element as de-duplicated. In some exemplary embodiments, Page Elements 642, at any level of granularity (regions, slots, or the like), may be designated by publishers to be de-duped, indicating that any content items displayed in Page Elements 642 should not be repeated in other areas of the page, e.g., in personalized areas. For example, a manually curated content item presented by a page element that is assigned to be de-duped, may not be served in any slot that is marked as personalized in the webpage.

In some exemplary embodiments, when the content discovery platform attempts to display content in the personalized slots of the page, it may be configured to avoid publishing the content appearing in the page element that was set to be de-duped. In some cases, the de-dupe assignment may be useful for content that is shown in a top part of the page, such as to prevent a repetition of the main article in the same page. In some cases, in case a content item associated with an article appears in a low-ranking slot of the webpage (e.g., a position requiring a long scroll until reaching it), the same content item may be "bumped up" for relevant users by the content discovery platform, such as by serving a repetition of the content item in personalized slots.

Referring now to FIGS. 7A-7D showing an exemplary validation tool of a policy editor, in accordance with some exemplary embodiments of the disclosed subject matter.

In some exemplary embodiments, the policy editor may enable publishers to visually validate HTML tags of content items provided and/or generated by the CMS server or platform. In some exemplary embodiments, an automatic tagging of content items and/or page elements may be performed by one or more components of the CMS platform, such as by a Content Delivery Application (CDA) of the CMS platform. In some exemplary embodiments, content items may be matched to page elements according to their tags, such as by placing a title of a content item (an article) within an area of a slot that is tagged as "title". In some exemplary embodiments, in order to ensure that content items are placed correctly and accurately served by page elements, a visual validation step may be incorporated by the policy editor.

Figure 7A:
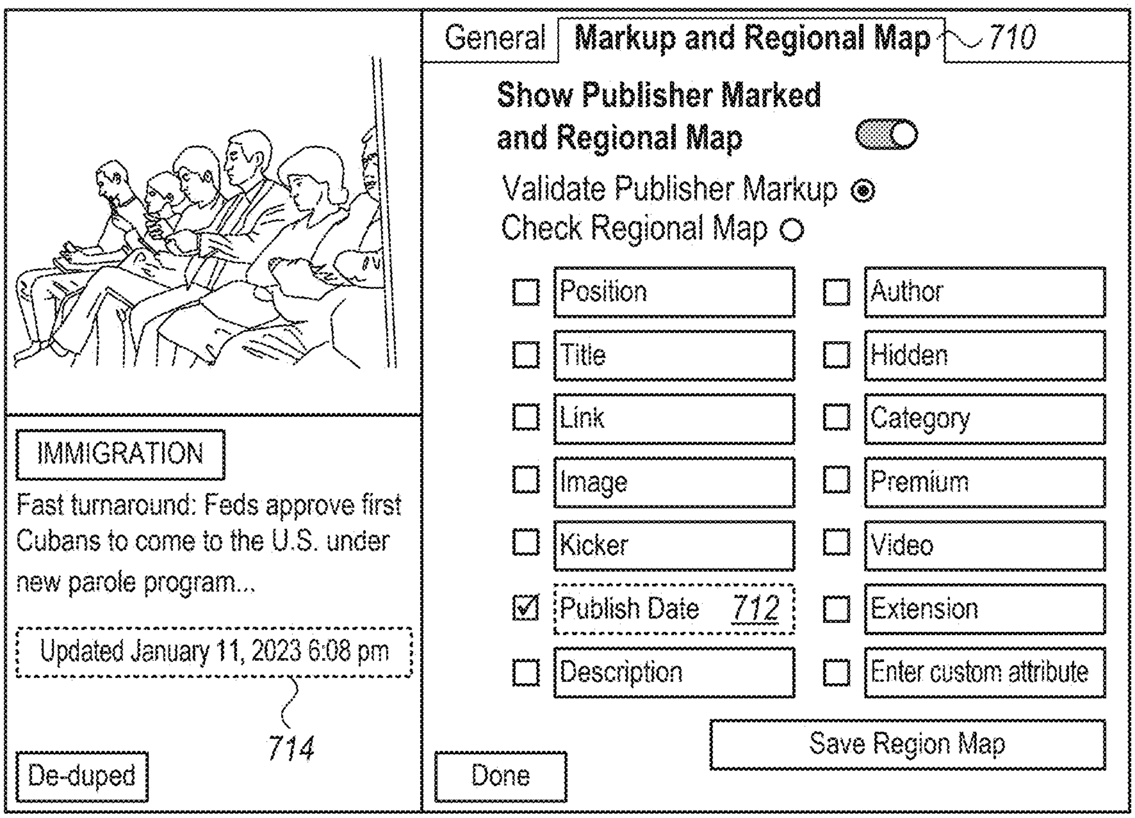
FIGS. 7A-7D show an exemplary a validation tool of the policy editor, in accordance with some exemplary embodiments of the disclosed subject matter.

In some exemplary embodiments, as depicted in FIG. 7A, the policy editor may enable editors to validate, via Layer 710, whether the HTML tags of content items served in the page and/or page elements were tagged correctly, thereby enhancing the accuracy of the customization process. For example, Layer 710 may display to the publisher one or more tags, corresponding to sections of content items such as their Title, Link, Image, Publish Date, Description, Author, Hidden, Category, Premium, Video, Position, Extension, or the like. According to this example, the publisher may be enabled to select one or more tags from the presented options, causing respective sections of content items that are served in page elements of the page and are tagged with the selected tags to be visually marked, highlighted, emphasized, or the like. In some cases, regions and/or slots in the webpage that are tagged with the selected attributes, may be visually marked or highlighted. In some cases, different visual markings may be used for different tags, e.g., using different colors, patterns, or the like, thereby enabling to simultaneously emphasize multiple tagged sections.

In some exemplary embodiments, to ensure the accuracy of the customization process, editors on the publisher side may be enabled to visually perceive whether the content has been correctly tagged according to predefined criteria within the selected template, and to confirm or decline each tagging. In some exemplary embodiments, the visual representation may assist publishers in verifying whether the content was correctly tagged according to the predefined criteria (e.g., the criteria of the "title" tag being that the section constitutes the title section). In some cases, by visually indicating tagged sections of content items, a transparent and easily verifiable representation of the tagged elements may be provided to the publisher, enabling quick verification and identification of errors in the tagging process.

As an example, in FIG. 7A, in response the publisher selecting the "Publishing Date" markup of Layer 710, e.g., Markup 712, to be validated, the items within the page that are tagged as the publishing date may be highlighted. For example, Portion 714 of a content item that is tagged by the publisher as "Publishing Date" may be highlighted in a matching color, shape, pattern, or the like. In some exemplary embodiments, the validation may be performed on the webpage, such as via one or more windows, tabs, overlays, panels, widgets, UI elements, or the like.

Figure 7B:
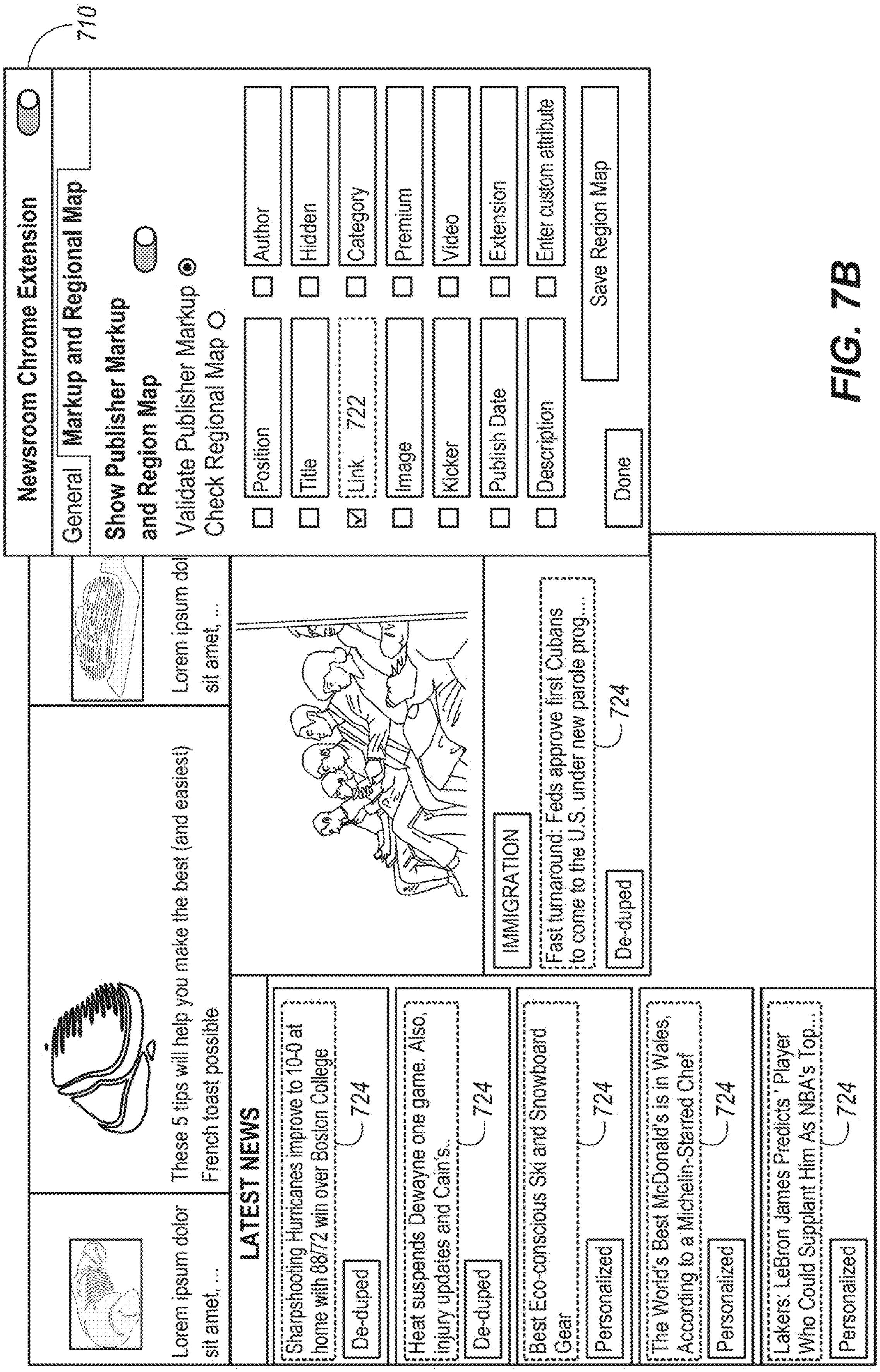

In some exemplary embodiments, as depicted in FIG. 7B, in response the publisher selecting the "Link" markup of Layer 710, e.g., Markup 722, to be validated, all the items within the webpage that are tagged by the CMS platform as "Link" may be highlighted in a matching color, shape, pattern, or the like. In some exemplary embodiments, items that are tagged as links may comprise Portions 724 of a plurality of content items, as depicted in FIG. 7B. For example, items may be configured to be marked as "Link", according to a criterion, in case they constitute a link to a webpage, article, or the like. In some exemplary embodiments, visually emphasizing Portions 724 enables editors to easily perceive and identify any anomalies or errors in the tagging process of links. For example, in case the CMS platform tagged a title of a content item as a link, the anomaly may be easily perceived based on the difference from Portions 724.

Figure 7C:
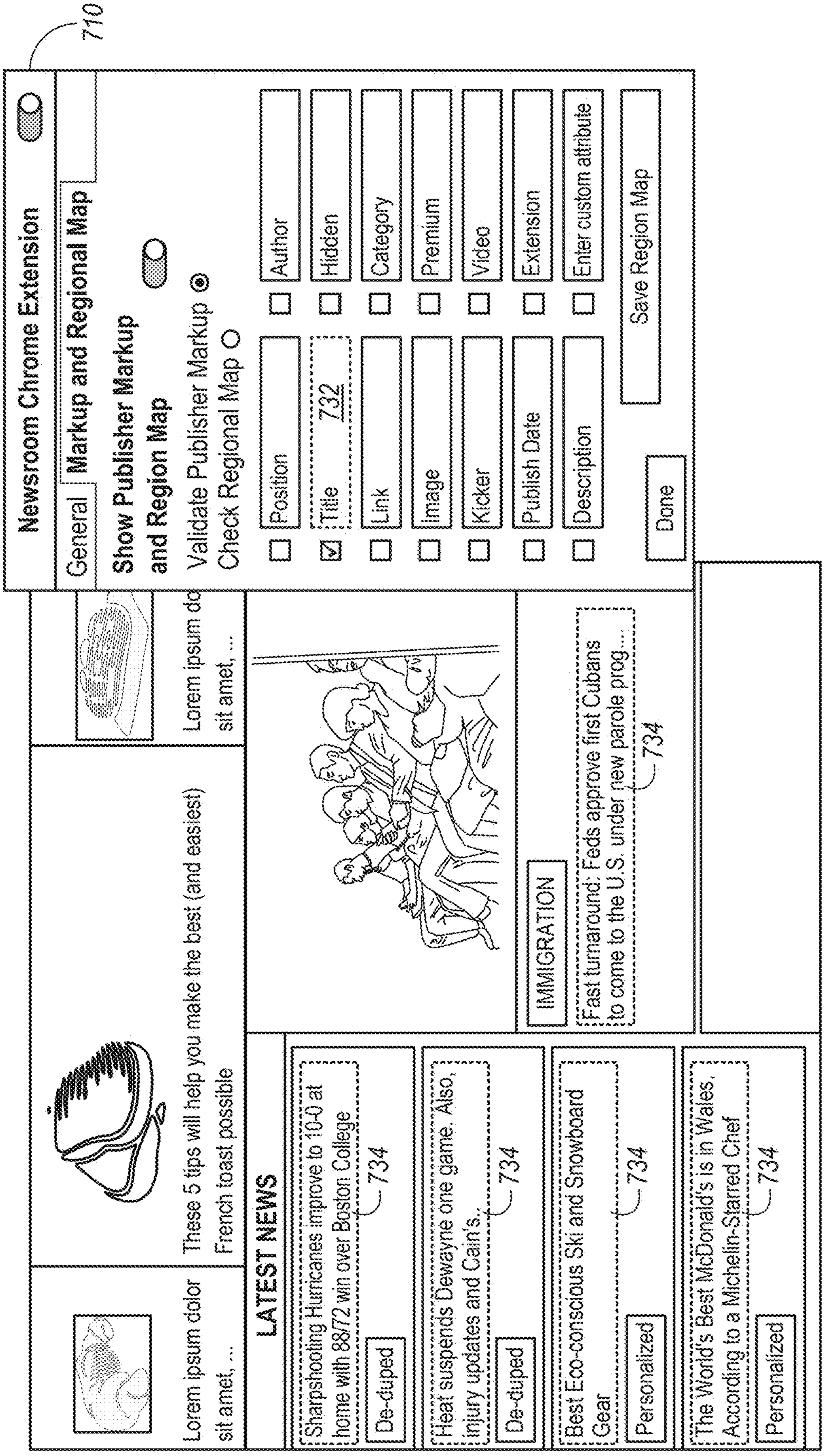

In some exemplary embodiments, as depicted in FIG. 7C, in response the publisher selecting the "Title" markup of Layer 710, e.g., Markup 732, to be validated, all the content item sections within the page that are tagged by the publisher as "Title" may be highlighted in a matching color, shape, pattern, or the like. In some exemplary embodiments, items that are tagged as titles may comprise Portions 734 of a plurality of content items, as depicted in FIG. 7C. In some exemplary embodiments, visually emphasizing Portions 734 enables editors to easily perceive and identify any anomalies or errors in the tagging process of titles.

Figure 7D:
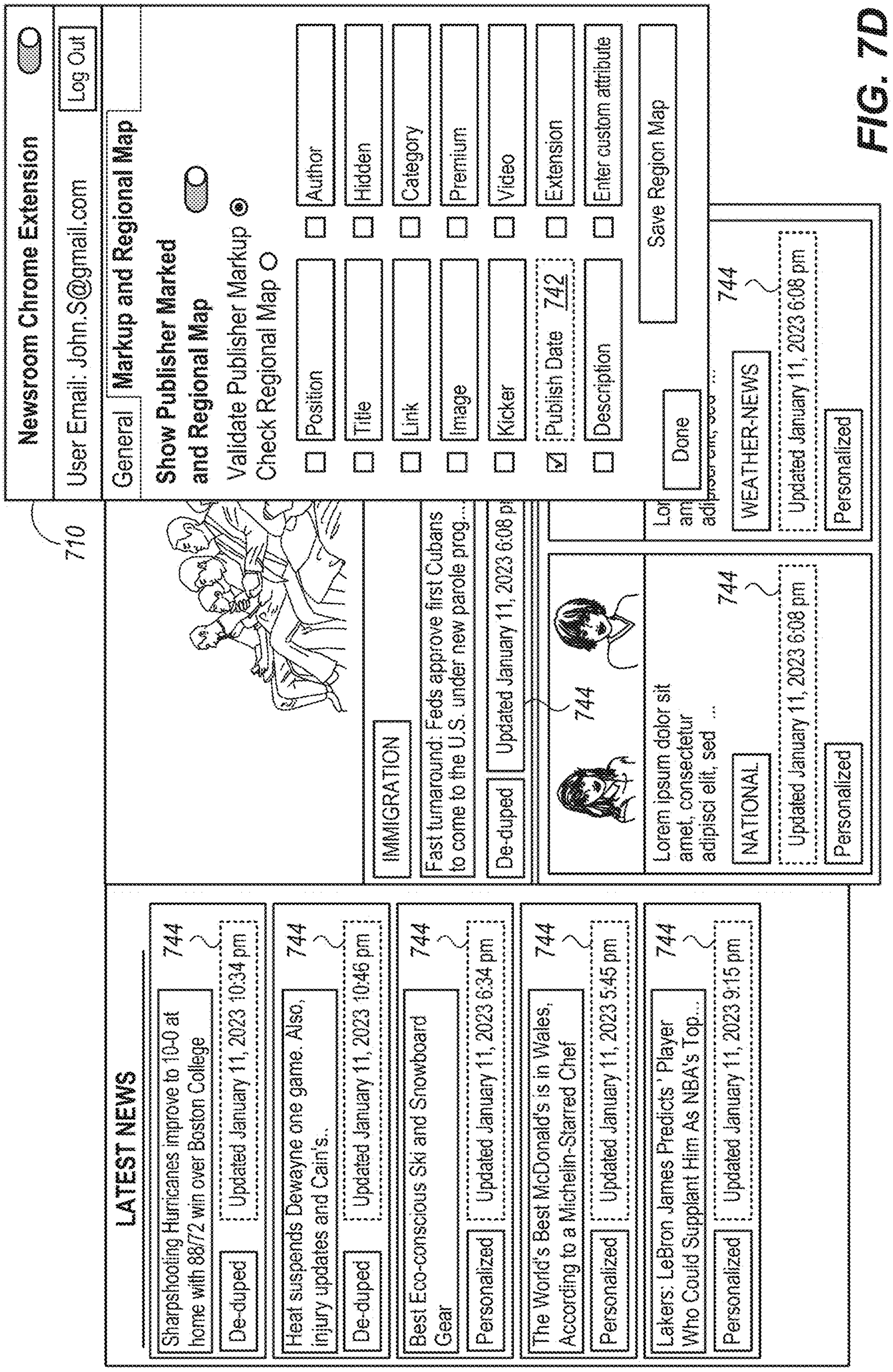

In some exemplary embodiments, as depicted in FIG. 7D, in response the publisher selecting the "Publishing Date" markup of Layer 710, e.g., Markup 742, to be validated, all the content item sections within the page that are tagged by the publisher as "Publishing Date" may be highlighted in a matching color, shape, pattern, or the like. In some exemplary embodiments, items that are tagged as publishing dates may comprise Portions 744 of a plurality of content items, as depicted in FIG. 7D. In some exemplary embodiments, visually emphasizing Portions 744 enables editors to easily perceive and identify any anomalies or errors in the tagging process of publishing dates.

In some exemplary embodiments, the ability to visually validate tags may enhance the overall quality assurance process, ensuring that the content is accurately categorized by the publisher and displayed to end users according to the intended attributes on the dynamically customized webpage.

Figure 8A:
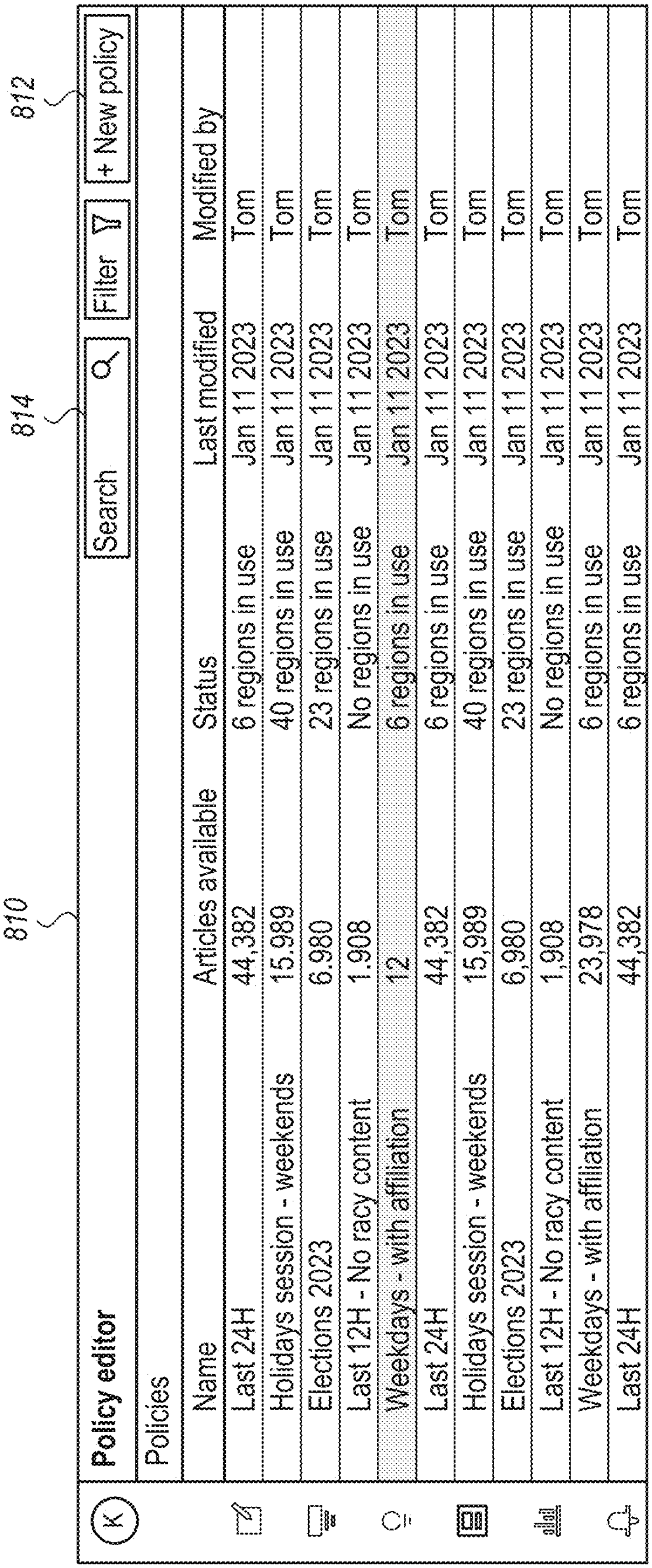
FIG. 8A shows an exemplary list of available webpage policies, in accordance with some exemplary embodiments of the disclosed subject matter.

Referring now to FIG. 8A showing an exemplary list of available webpage policies, in accordance with some exemplary embodiments of the disclosed subject matter.

In some exemplary embodiments, the policy editor may provide one or more management tools, editor pages, policy builder, or the like, to enable editors to customize or select webpage policies. In some exemplary embodiments, webpage policies may be re-usable, in which case they may be referred to as templates. In some exemplary embodiments, the policy editor may enable editors to define, generate, select, or the like, templates of management policies that are applicable to a plurality of webpages. For example, a reusable template may be generated using one or more of the management tools of FIGS. 3-7D.

In some exemplary embodiments, a template may define a management policy in an abstract format that is not related or reliant on a specific webpage. In some exemplary embodiments, after a template is defined, it may be attached, or applied, to a website, a webpage, a zone of a webpage, any other level of granularity, or the like. For example, a template may be defined to allow or restrict certain categories of content (e.g., via the Allowed Categories Section 530 of FIG. 5A), to allow or restrict one or more media types of content items, to allow or restrict one or more sources of content such as content providers, or the like.

In some exemplary embodiments, a template may be generated, manually or automatically, at the CMS platform. For example, templates may be manually curated by the publisher, generated automatically based on frequently applied rules and structures, obtained from a third party, or the like. For example, a policy editor including a policy builder, policy building tools, or the like, may enable the publisher to build a template from scratch, and the generated policy may be applicable to a plurality of webpages. In some exemplary embodiments, after a template is defined or generated, it may be published and made available to users of the CMS platform, e.g., editors thereof. For example, the templates may be agnostic to specific content of webpages, enabling their rules and definitions to be applicable to a plurality of different webpages.

In some exemplary embodiments, a template may be applied by executing or setting the rules of the template over a target zone. In some exemplary embodiments, a template may be defined to be applied based on different factors, such as traffic segmentation of an end device, a type of audience, different times of day, availability of editors, different days in a week, or the like. In some exemplary embodiments, multiple templates may be applied to a single webpage, e.g., based on traffic segmentation, type of audience, different times, availability of editors, or the like. For example, different templates may govern the same webpage at separate times, at separate end devices, or the like.

As an example, the management policy of the template may define to implement certain rules for a first user segment (e.g., to present only sport-related content), and other rules for a second user segment (e.g., to present only environment-related content). For example, the first segment may comprise paid subscribers and the second segment may comprise non-subscribers. As another example, rather than displaying different content to paid users compared to non-paying users, the management policy may simply block access to certain content for non-subscribers. For example, paid users may be served with exclusive articles, premium content, or ad-free material, while non-paying users may be shown previews, promotional offers, or advertisements. According to this example, separating the rules of the management policy that are applied on end devices based on whether or not the end users are subscribed, may ensure that the webpage caters to specific audience types (e.g., paid subscribers or non-subscribers). In some exemplary embodiments, by dynamically adjusting the content based on the user's subscription level, the publisher may incentivize subscription upgrades, improve user engagement, and provide a more personalized browsing experience for both paid and non-paying users.

In some exemplary embodiments, a defined template of a management policy may enable to preserve the defined editorial control levels for zones of the webpage, allowing for dynamic automatic updates of the content within personalized sections, for manual updates of manually curated items, for locking items for a snoozing period, or the like. In some exemplary embodiments, in case a template restricts a content category, and is applied to a personalized region or slot, content items of a compliant type can be swapped and/or updated to present different yet relevant content, maintaining the overall layout and design of the webpage.

For example, as depicted in FIG. 8A, the policy editor may enable editors to select pre-prepared templates (denoted "Policies") for a webpage. For example, the policy editor may provide users with a lobby page, a loading page, or the like, displaying a list of available or existing templates. For example, the available templates may be historic templates that were generated by the publisher, other publishers, or the like.

In some exemplary embodiments, the lobby page of the policy editor may be configured to provide an overview of all or some existing content templates, showing properties thereof such as their names, the number of regions to which the template is currently applied to, the number of slots to which the template is currently applied to, an inventory of items to which the template is applicable, their policy types, a last modified date of the template, a name of a user that made the last modification to the template, or the like. For example, as depicted in FIG. 8A, Layer 810 of the policy editor may present templates titled: "Last 24 H" policy, "Holiday session—weekends" policy, "Election 2023" policy, "Last 12 H—No racy content" policy, "Weekdays—with affiliation" policy, or the like. In some exemplary embodiments, the listed templates may be presented to the publisher along with any other properties, data associated with each template, metadata, additional information, or the like.

In some exemplary embodiments, the policy editor may provide a search function, allowing to search and/or filter policies based on their properties such as their names, inventory size, or the like. For example, Search Control 814 may enable to filter policies based on their properties such as their names, inventory size, or the like. In some exemplary embodiments, the policy editor may provide an A/B testing tool, allowing users to compare properties of different templates.

In some exemplary embodiments, the publisher may be enabled to utilize an available template that is presented by Layer 810, instead of generating a new template from scratch. In some exemplary embodiments, after selecting a template, the publisher may be enabled to use the template as a baseline, e.g., and adjust one or more rules of the template. In other cases, the publisher may be enabled to use the entire configuration of the template without making changes.

In some exemplary embodiments, the policy editor may enable editors to filter the list of templates according to one or more filters, criteria, or the like, and to create a new template in case none of the templates satisfy the publisher's requirements. For example, Layer 810 of the policy editor may enable users to select (e.g., via a voice control, a touchscreen, a mouse, or the like) a control such as Control 812 in order to generate a new policy or template, e.g., as depicted in FIGS. 8B-8F.

Referring now to FIGS. 8B-8F showing an exemplary configuration process of a webpage policy, in accordance with some exemplary embodiments of the disclosed subject matter.

In some exemplary embodiments, a policy editor including a policy builder, policy building tools, or the like, may enable the publisher to build a policy from scratch, e.g., according to FIGS. 8B-8F. In some exemplary embodiments, the policy editor may provide users with a designated user interface comprising one or more detail pages where policies can be customized, created, edited, or the like. In some exemplary embodiments, the policy editor may enable users to create a new policy via the detail pages, or to edit an existing policy, e.g., a policy depicted in FIG. 8A.

Figure 8B:
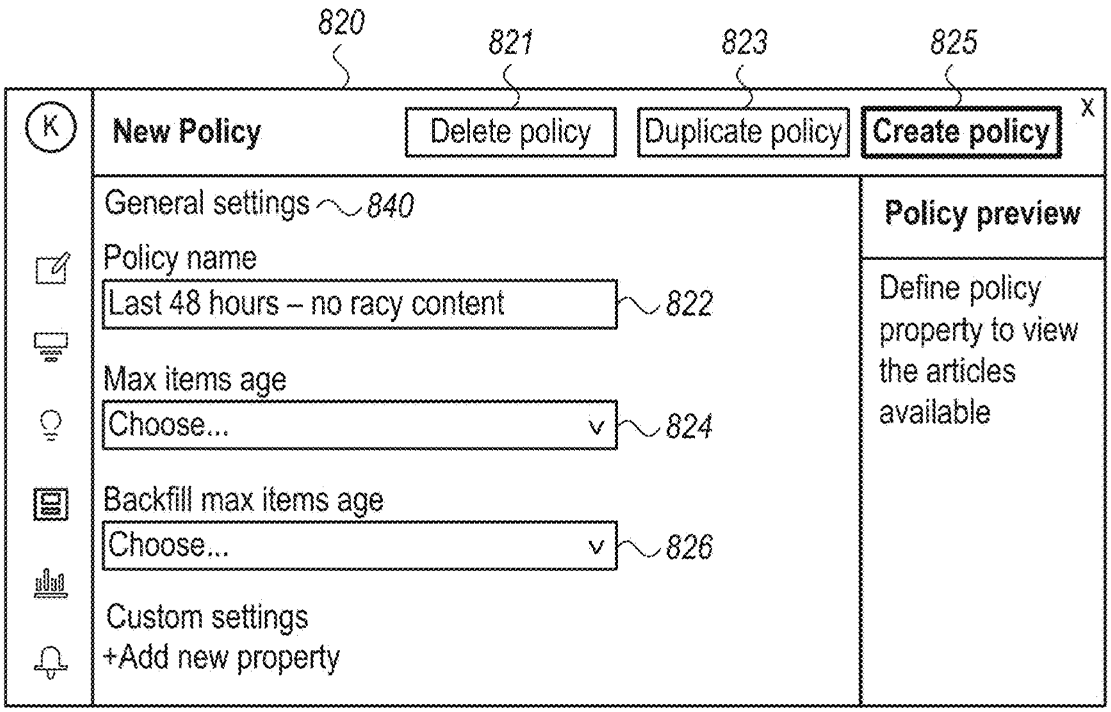
FIGS. 8B-8F show an exemplary configuration process of a webpage policy, in accordance with some exemplary embodiments of the disclosed subject matter.

In some exemplary embodiments, in case the publisher selects to generate a new template, the publisher may be enabled to define a customized template via the detail pages of the policy editor. In some exemplary embodiments, the detail pages may comprise multiple fields, such as policy name, rules for how long recommendable content items should be allowed to be presented, or the like. For example, as illustrated in FIG. 8B, Layer 820 of the policy editor may enable editors to configure General Settings 840 of a template such as by entering a name for the template ("Policy name") via Control 822, setting a maximal age for items ("Maximal items age") via Control 824, and setting a maximal age for backfill items such as personalized sections ("Backfill max items age") via Control 826, or the like. As an example, Control 822 may be an alphanumeric field, limited to 56 characters. In some exemplary embodiments, the policy editor may enable editors to select any other properties of the template such as a media type for content items that are served by each page element, to allow or restrict one or more sources of content such as content providers, additional settings or requirements, special custom values, or the like.

In some exemplary embodiments, Control 824 may enable users to select a maximal age for items, indicating the look-back window for recommendable content. For example, the inputted maximal age may define how long the content must be published and/or updated in order to be eligible, such as 12 hours, 24 Hours, 36 hours, 48 hours, 3 days, 5 days, 7 days, 14 days, 30 days, 90 days, 1 year, or the like. As another example, the inputted maximal age may define a maximal time frame during which the content is allowed to be served.

Figure 8C:
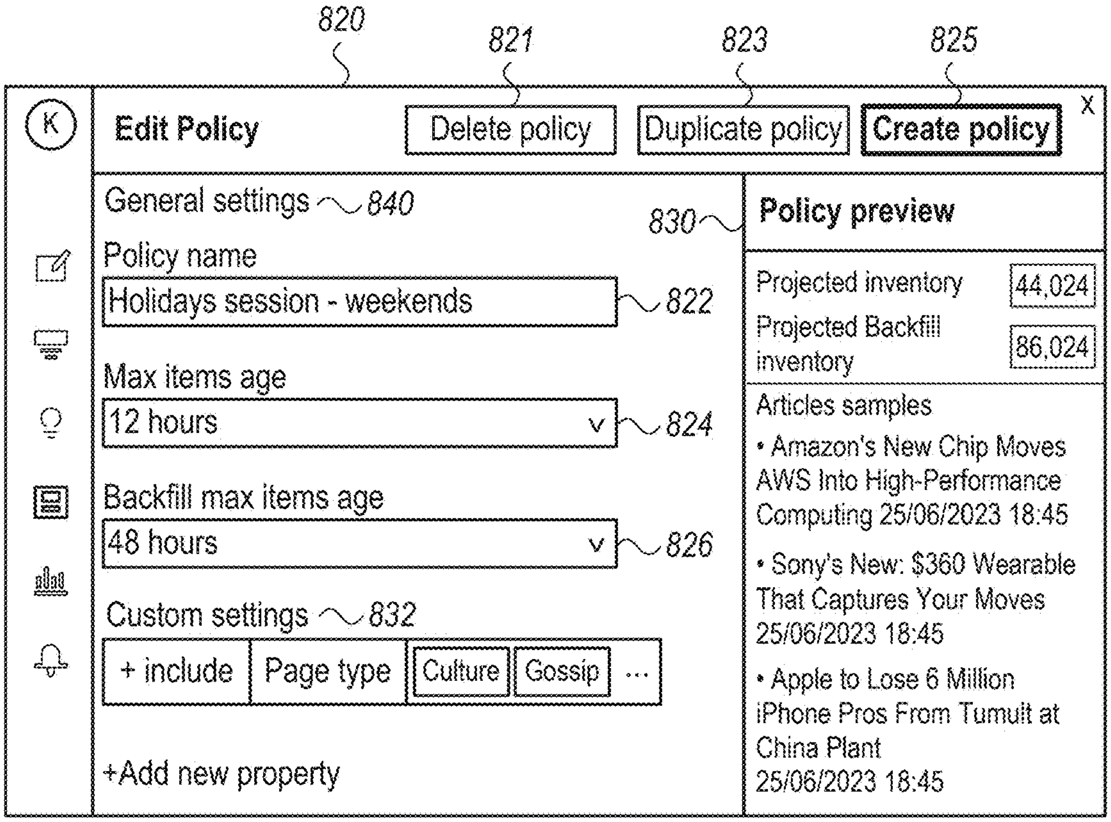
Figure 8D:
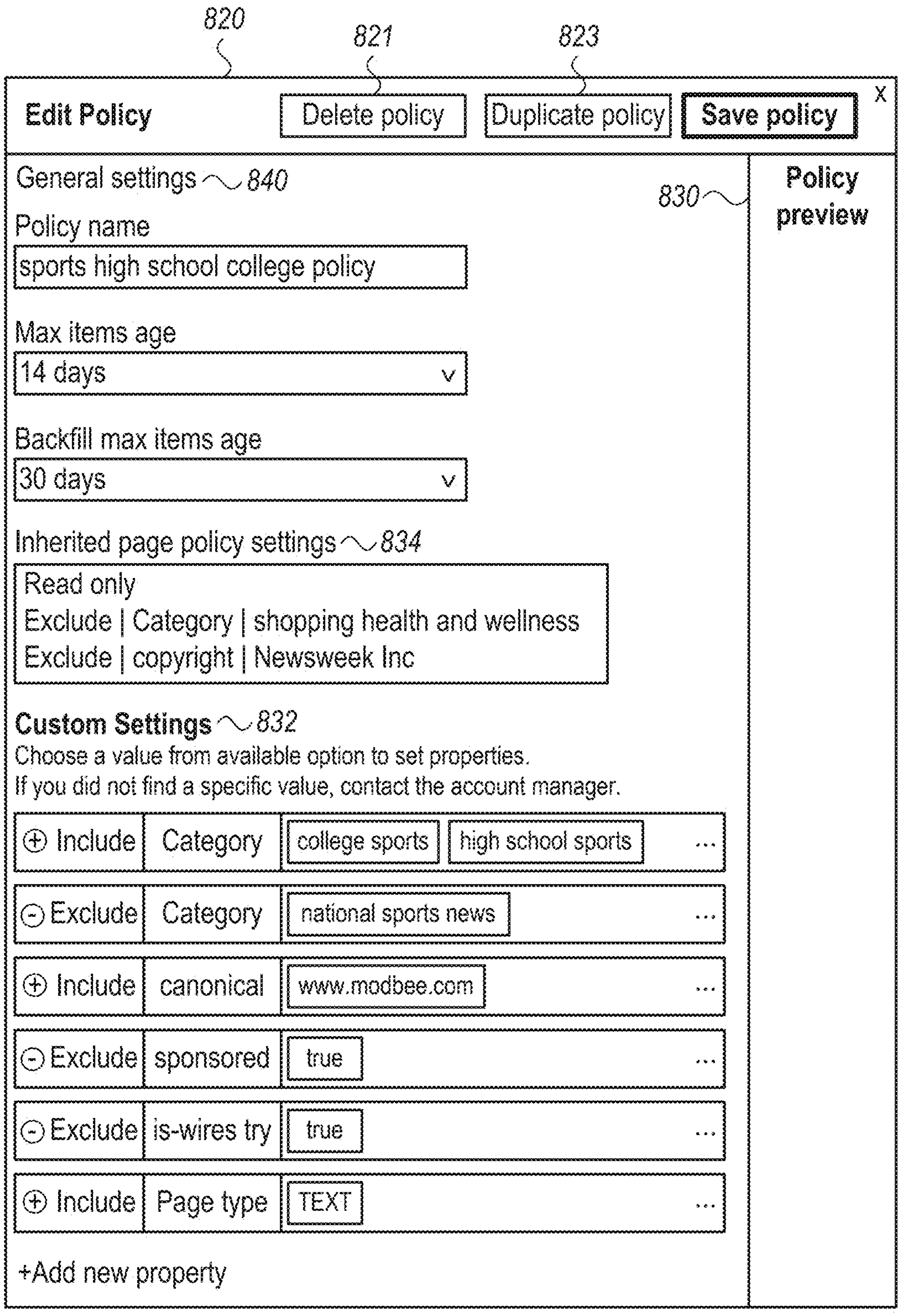

In some exemplary embodiments, the publisher may be enabled to configure or set the template, such as by inputting values to Controls 822, 824, and 826 of General Settings 840. For example, as illustrated in FIG. 8C, a user may name a template: "Holiday session-weekends" via Control 822, indicating that the template may be useful during holidays that take place on weekends. The user may set the maximal age for items to 12 hours via Control 824, and set the maximal age for backfill items to 48 hours via Control 826. As another example, as illustrated in FIG. 8D, a user may name a template: "sport high school college policy" via Control 822, indicating that the template is useful for high school and college segments of end users. The user may set the maximal age for content items to 14 days via Control 824, and set the maximal age for backfill items to 30 days via Control 826.

In some exemplary embodiments, the selected or generated policy may be displayed to the publisher along with a preview thereof such as Preview 830 of FIG. 8C. In some exemplary embodiments, Preview 830 may indicate an impact of the policy on a projected inventory that complies with the policy, a projected backfill inventory that complies with the policy, articles samples that comply with the categories defined by policy, or the like. For example, in case the user adds restrictions to a template, such as by limiting the content to a "Sports" content category, Preview

830 may be adjusted to reflect the number of content items in the inventory that correspond to the selected restriction or category.

In some exemplary embodiments, at any stage, the publisher may be enabled to delete, duplicate, modify, or generate a policy, such as via Controls 821, 823, and 825 or any other controls. For example, users may select a policy presented by the lobby page of FIG. 8A, and edit, delete or duplicate the policy via the detail pages of FIGS. 8B-8F. In some exemplary embodiments, the user may be enabled to import an existing policy, and perform changes thereon, edit the policy, or the like. In some exemplary embodiments, one or more restrictions may be placed on the policy editing process. For example, a "Delete Policy" action via Control 821 may only be applied to policies that are not already applied or attached to a zone. According to this example, an error will be shown if the user attempts this action to a policy actively in use.

In some exemplary embodiments, the user may be enabled to duplicate a policy via Control 823, as part of a "Duplicate Policy" action. For example, selecting Control 823 may cause a copy of the policy to be created and launched in a main editing page of the policy editor, policy builder, or the like. According to this example, the copy of the policy may be pre-populated with that policy's settings, while making one or more default changes to the policy name. For example, by default, the policy's new name may be set to include the original name populated by the user, with an edition of the string "copy". In some exemplary embodiments, duplicated policies may be edited by the publisher, such as by changing their title.

In some exemplary embodiments, the publisher may be enabled to modify the policy in a fine granularity, such as via Custom Settings Section 832 of FIG. 8C. In some exemplary embodiments, the publisher may be enabled to modify the policy by specifying every possible structured property or feature of the content, such as a content category for each page element (news, lifestyle, entertainment, gossip, or the like), sub-category for each page element (sport news, weather, health, or the like), type of media (podcast, video, image, text, or the like), source of the content, editor name, allowed age, or the like.

In some exemplary embodiments, the publisher may be enabled to select negative selections that correspond to positive selections of a policy rule. For example, the publisher may be enabled to set which types of content not to be displayed, such as avoiding presenting content from a certain category, after a time duration, or the like. In some exemplary embodiments, the publisher may be enabled to set which types of content sources not to be used.

For example, as depicted in FIG. 8D, Custom Settings Section 832 may enable the publisher to modify the template to include the content categories "college sports" and "high school sports", to exclude the content category "national sports news", a content provider such as the canonical domain "www.modbee.com", a selection to exclude sponsored content, a selection to include as the type of media only text, or the like. In other cases, any other selections may be made. In some exemplary embodiments, selected properties of the template, such as selections made in Custom Settings Section 832, may apply to the webpage on a page level, to a specific section of the page, to a slot, or in any other level of granularity.

In some exemplary embodiments, some of the property settings of a template may be configured to be inherited or imported from parent policies such as site policies, from existing policies with a similar domain, or the like. For example, in case a publisher defines a policy for a webpage that belongs to a website, the publisher may be enabled to inherit properties of an existing policy, template, or the like, of the website, such as to ensure uniformity and compliance of all webpage of the website, to the website rules. In some exemplary embodiments, the publisher may be enabled to inherit entire policies or subsets thereof.

In some exemplary embodiments, a hierarchy may be defined between inherited rules or selections, between rules of different granularity levels, or the like. In some exemplary embodiments, the hierarchy may be defined by the publisher, by the CMS platform, or set by the policy editor. In some exemplary embodiments, rules may be inherited or imported based on the hierarchy.

In some exemplary embodiments, a template in a lower granularity level may or may not inherit its rules to a template in a higher granularity level. For example, region policy rules may be inherited to the slot policy rules within the region. As another example, rules of a website policy may be inherited to its webpages. For example, inclusion and exclusion rules defined at a website level may be inherited to all of the website's pages, page sections, or the like.

In some exemplary embodiments, inherited rules may or may not be overridden. In some exemplary embodiments, a hierarchy may be used to resolve conflicts between policy rules, such as by determining a hierarchy according to which rules may be overridden. For example, the hierarchy may define that inherited rules cannot be contradicted. As another example, the hierarchy may define that rules of a region overrides rules of a slot therein. As another example, the hierarchy may define that rules applied in a first granularity level override rules that are applied in a second granularity level. As another example, the hierarchy may define that region rules can override page rules. For example, in case a template of the page restricts the presentation of podcast media, a region may override such rule and enable the serving of podcast content items.

In some cases, Custom Settings Section 832 may provide customization options only in case they comply with inherited rules of Inherited Page Policy Settings Section 834, e.g., as a constraint. For example, as depicted in FIG. 8D, Inherited Page Policy Settings Section 834 may inherit properties of an existing policy, such as an exclusion of the content category "shopping health and wellness", and an exclusion of the content provider "newsweek.inc" due to copyright issues. According to this example, Layer 820 of the policy editor may be presented to the publisher with the inherited properties of Inherited Page Policy Settings Section 834, as a constraint that does not allow the publisher to select contradicting rules. For example, the publisher may not be enabled to select, via Custom Settings Section 832 of FIG. 8D, to include content items of the content category "shopping health and wellness", and to include content items from the content provider "newsweek.inc".

In other cases, Custom Settings Section 832 may provide customization options that contradict inherited rules of Inherited Page Policy Settings Section 834.

Figure 8E:
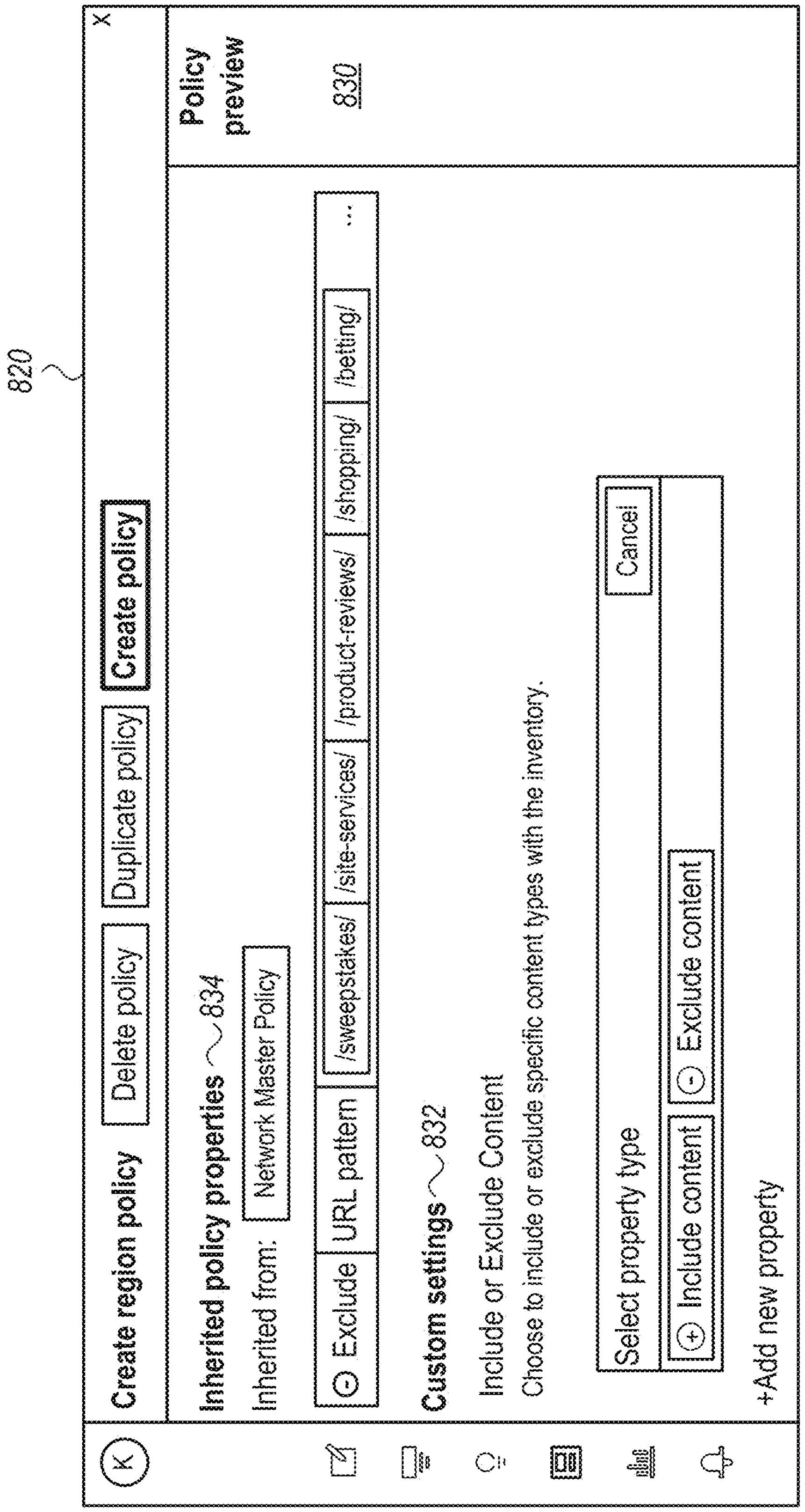

As another example, as depicted in FIG. 8E, the template may inherit properties of a parent template (e.g., a network master policy), such as an exclusion of the URL patterns: /sweepstakes/, /site-services/, /product-reviews/, /shopping/, and /betting/. According to this example, the publisher may or may not be enabled to select, via Custom Settings Section 832 of FIG. 8E, to include content items with any of the listed URL patterns.

In some cases, as depicted in FIG. 8E, Custom Settings Section 832 may allow the publisher to define filtering rules that define which content can be included or excluded. For example, the publisher may select to include or exclude specific content types within the inventory, e.g., based on properties of its content items. For example, the user may be enabled to select a property or properties within a content category that will be included or excluded in any attached page or zone, in any level of granularity. In some cases, the selection may or may not be limited to a selection of content types that comply with the inherited properties.

Figure 8F:
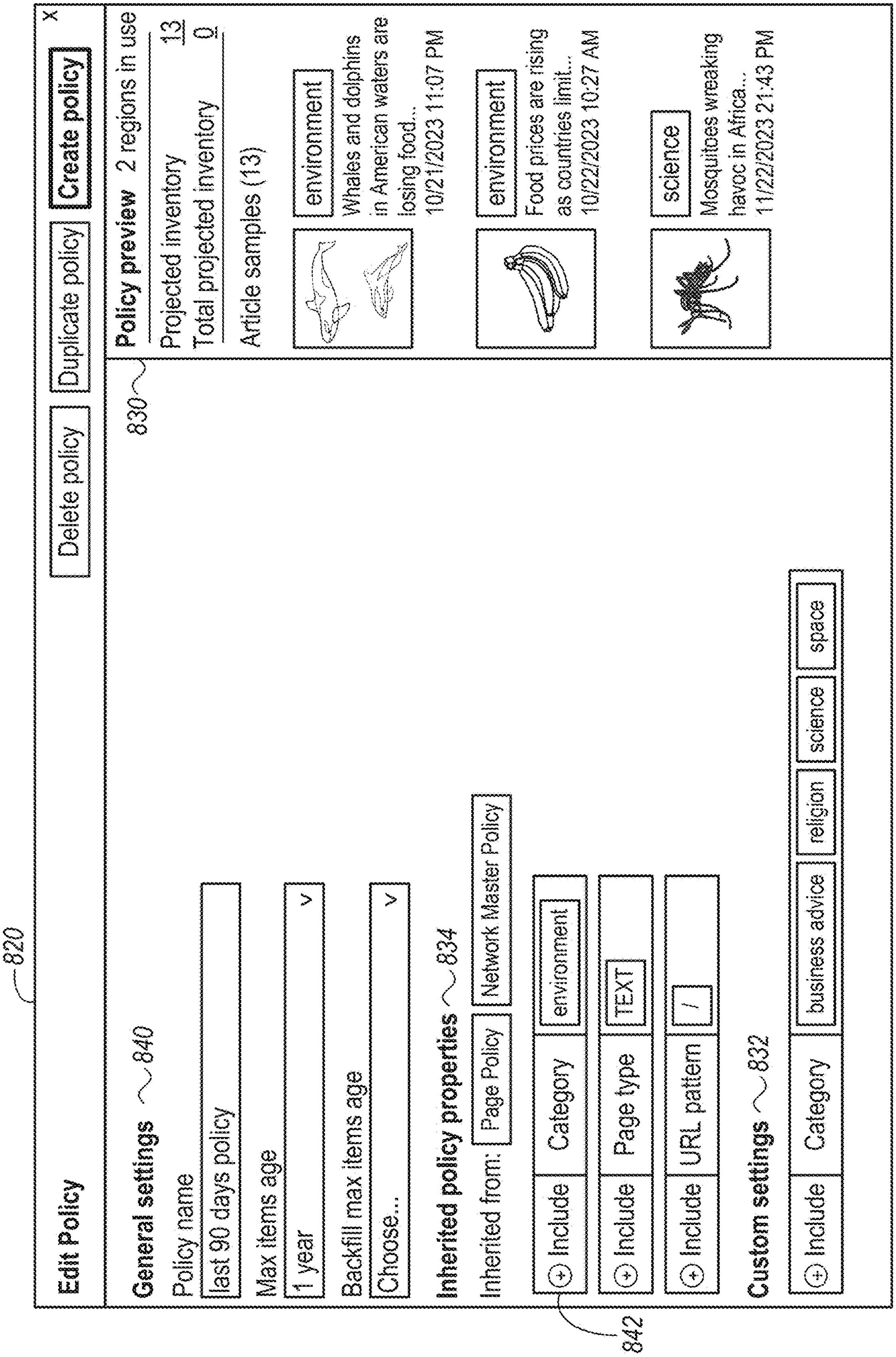

In some cases, the publisher may be enabled to adjust what policy rules are inherited. For example, as depicted in FIG. 8F, the policy editor may enable users to toggle each individual rule that is inherited, on or off. As an example, the publisher may be enabled to select, via fields such as Field 842 in Inherited Page Policy Settings Section 834 of FIG. 8F, to disable the inherited content category of "environment", thereby adjusting Custom Settings Section 832 to allow the user to select to include content items of other content categories besides "environment" articles (e.g., content categories such as business advice, religion, science, space, education).

As another example, the publisher may be enabled to select, via one or more fields in Inherited Page Policy Settings Section 834, to disable the inherited exclusion of the content category "shopping health and wellness", thereby adjusting Custom Settings Section 832 to allow the user to select to include content items of the content category "shopping health and wellness". As another example, a site may be configured, according to the defined hierarchy, to have a higher-level policy that excludes all "Sports Betting" articles. But for a specific region only, the user may override this rule to allow "Sports Betting" articles.

Referring now to FIGS. 9A-9E showing exemplary boosting tools of the policy editor, in accordance with some exemplary embodiments of the disclosed subject matter.

In some exemplary embodiments, the policy editor may provide publishers with a mechanism for content management, giving publishers fine-tuned control over what gets highlighted or downplayed within their platform. In some exemplary embodiments, the mechanism may comprise boosting and de-boosting functions or tools, which may be selected manually by the publisher. For example, the boosting and de-boosting tool may be presented via a policy builder, policy editing tool, or the like, of the policy editor such as via Layer 910. In some exemplary embodiments, the publisher may be enabled to choose whether to boost or de-boost content prominence, influencing its priority within the overall inventory.

Figure 9A:
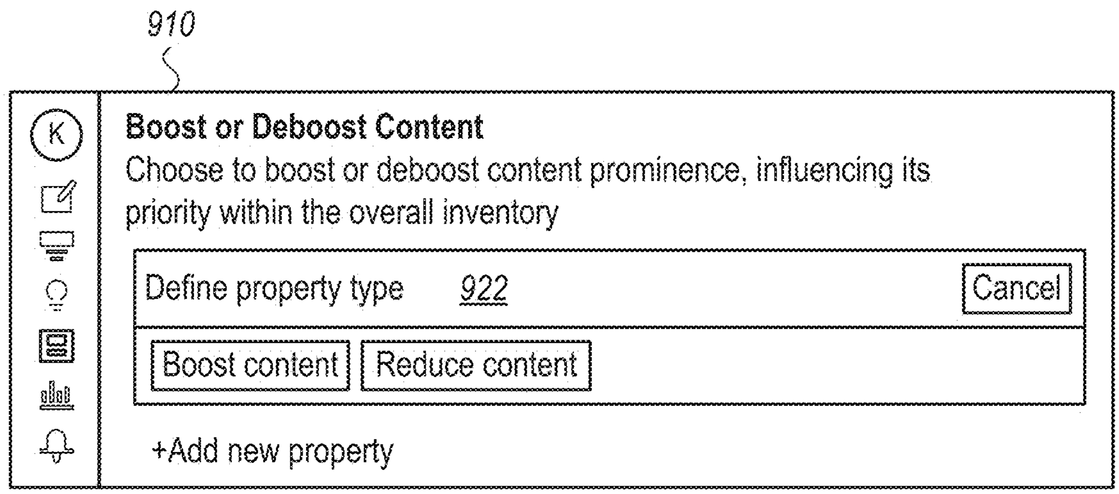
FIGS. 9A-9E show exemplary boosting tools of the policy editor, in accordance with some exemplary embodiments of the disclosed subject matter.

In some exemplary embodiments, as depicted in FIG. 9A, Layer 910 of the policy editor may enable the publisher to select properties of content to be boosted or to de-boosted within each zone, e.g., in any level of granularity. For example, the publisher may be enabled to select a property type of content via Field 922, such as "author name=John", and to select whether to boost or de-boost content items that correspond to the property type. In some exemplary embodiments, boosting certain types of content may refer to prioritizing or amplifying such content within the overall inventory of the content discovery server, to make them more visible or impactful to end users. In some exemplary embodiments, de-boosting certain types of content may refer to reducing the visibility or prominence of specific content within the overall inventory of the content discovery server.

Figure 9B:
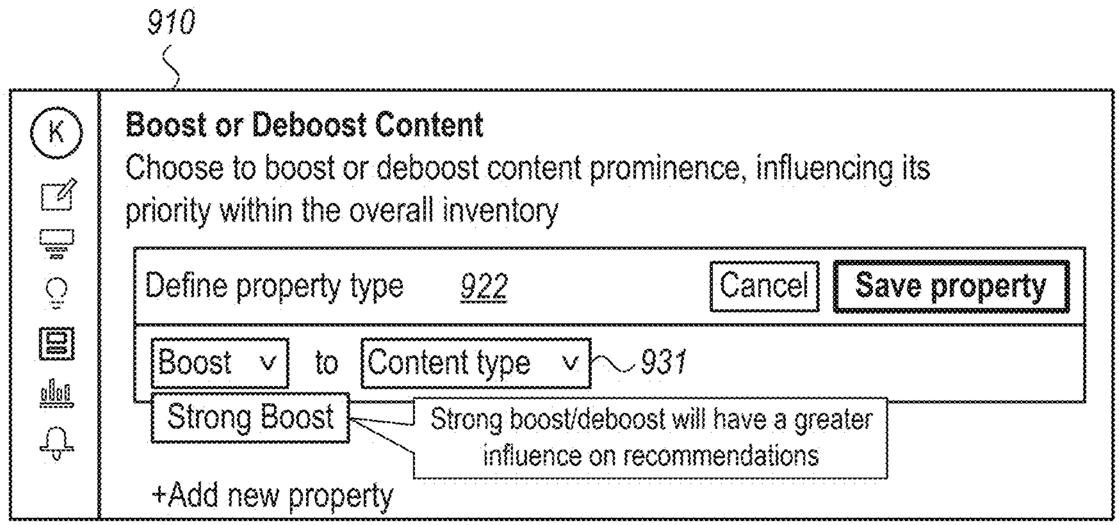

In some exemplary embodiments, as depicted in FIG. 9B, Layer 910 of the policy editor may enable the publisher to select categories of content for which the property type of Field 922 should be applied. For example, the publisher may be enabled to select, via Dropdown 931, a desired category of content. Returning to the above example, in case a boosting rule is defined for an "author" property type via Field 922, a selection of a content category from Dropdown 931 may restrict the application of the boosting rule to the selected content category, e.g., to "Sports" articles.

In some exemplary embodiments, as depicted in FIG. 9B, in addition to selecting whether a boosting rule should cause boosting or de-boosting of corresponding content items, the publisher may be enabled to choose the boost strength, e.g., regular boost, strong boost, weak boost, or the like. For example, Layer 910 of the policy editor may enable the publisher to select different levels of boosting strength, as well as a de-boosting strength. In some exemplary embodiments, a strong boosting or de-boosting may have a greater influence on recommendations of content by the content discovery server, compared to weaker boosting or de-boosting.

Figure 9C:
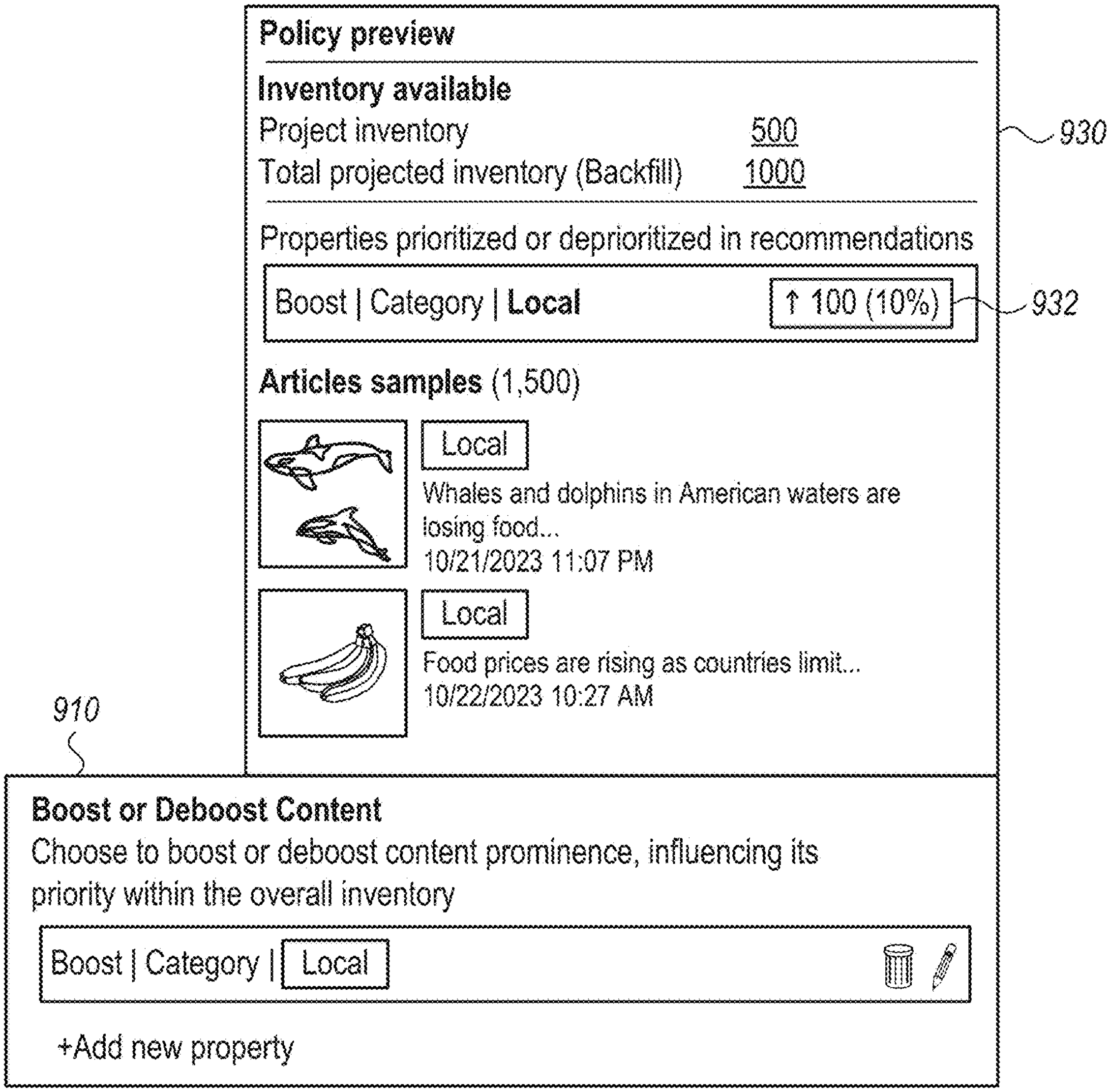

In some exemplary embodiments, as depicted in FIG. 9C, Layer 910 of the policy editor may enable the publisher to select to boost all content from a 'local' content category. In some exemplary embodiments, a preview of the selected boosting settings, such as Preview 930, may be displayed to the publisher. For example, Preview 930 may indicate an impact of the boosting policy on a projected inventory that complies with the boosting policy. For example, Preview 930 may depict Impact 932, showing that 100 content items, constituting 10% of the backfill projected inventory, were promoted based on the chosen content category.

Figure 9D:
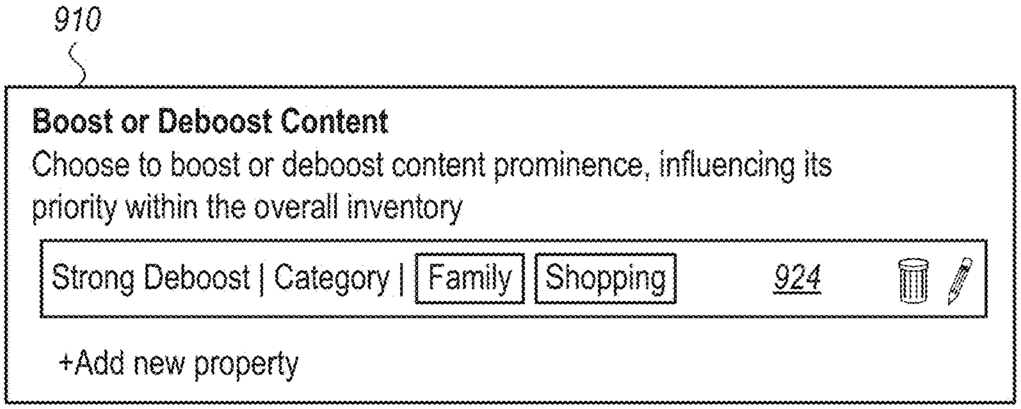

In some exemplary embodiments, as depicted in FIG. 9D, Layer 910 of the policy editor may enable the publisher to select to boost or de-boost (at any level of strength) content of more than one content category. For example, Field 924 may represent a de-boosting rule applicable to content items of both "Family" and "Shopping" content categories, with a "strong" de-boost strength. In other cases, any other number of content categories may be selected.

Figure 9E:
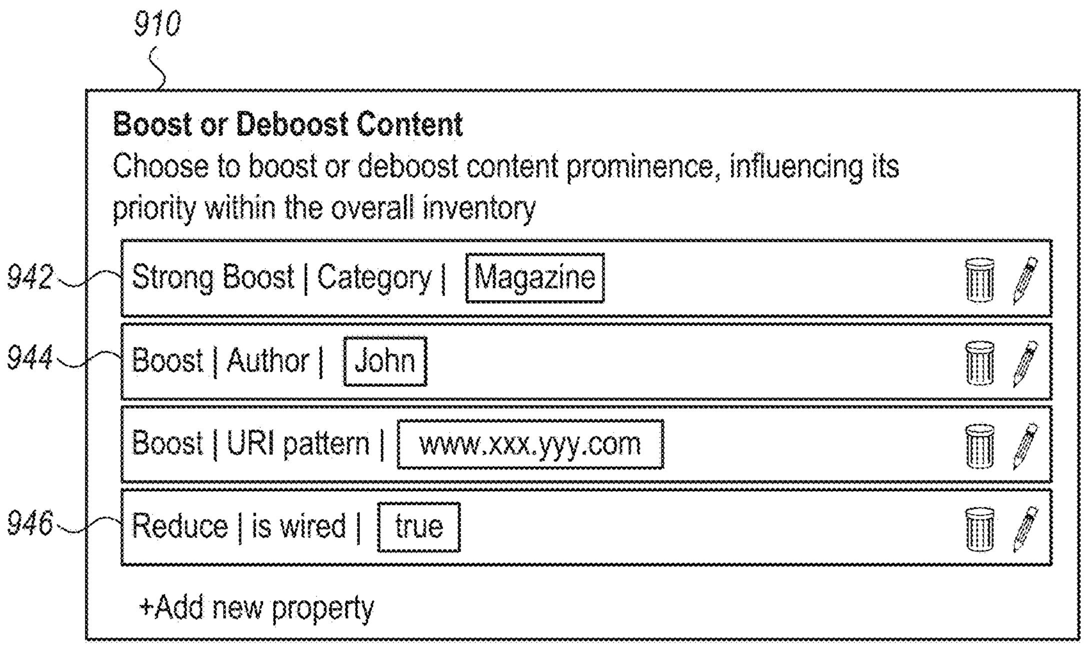

In some exemplary embodiments, as depicted in FIG. 9E, Layer 910 may enable the publisher to define any number of boosting rules, de-boosting rules, or the like, in different levels of strength. For example, the publisher may define Rule 942 to strongly boost content items belonging to the "Magazine" category, Rule 944 to boost content items having an "Author" property with the value "John", and Rule 946 to de-boost content items having an "Wired" property with the value of "true".

Referring now to FIGS. 10A-10D showing exemplary tools for policy attaching, in accordance with some exemplary embodiments of the disclosed subject matter.

In some exemplary embodiments, a template that is selected or created, such as according to FIGS. 8A-9E, may be attached, associated, or applied to any page element. For example, a policy may be attached to a website, webpage, region, slot, or the like. In some exemplary embodiments, the template itself may be generated as an abstract or pre-baked policy that is not tied to any specific page or page element, thereby enabling to apply the template over a plurality of pages and elements. For example, templates and pages may exist independently of one another, e.g., templates may exist without being associated with a page, and pages may exist without being associated with templates.

Figure 10A:
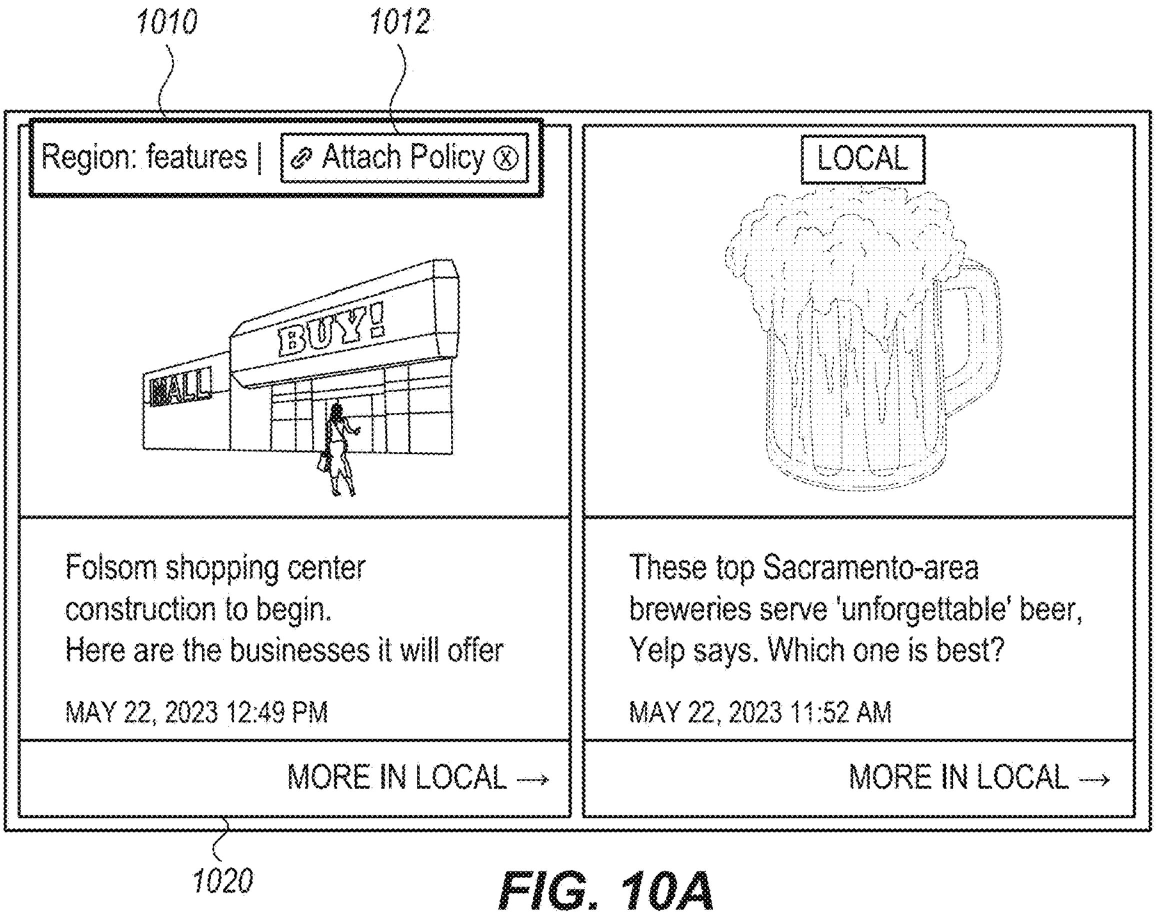

In some exemplary embodiments, the policy editor may provide publishers with a mechanism for template management, giving publishers fine-tuned control over what template is applied or attached to each page element. For example, as depicted in FIG. 10A, a designated widget or overlay of the policy editor such as Layer 1010 may enable to attach templates to a page element such as a region. In some exemplary embodiments, the policy editor may enable the publisher to attach an existing, pre-baked template to a website, a webpage, a region on a webpage, a slot within the region, or the like.

In some exemplary embodiments, as depicted in FIG. 10A, the publisher may be enabled to interact with Layer 1010, such as in order to select a template for the respective page element. For example, the publisher may interact with Attach Policy Control 1012, in order to select a template for Region 1020 or personalized items thereof.

Figure 10D:
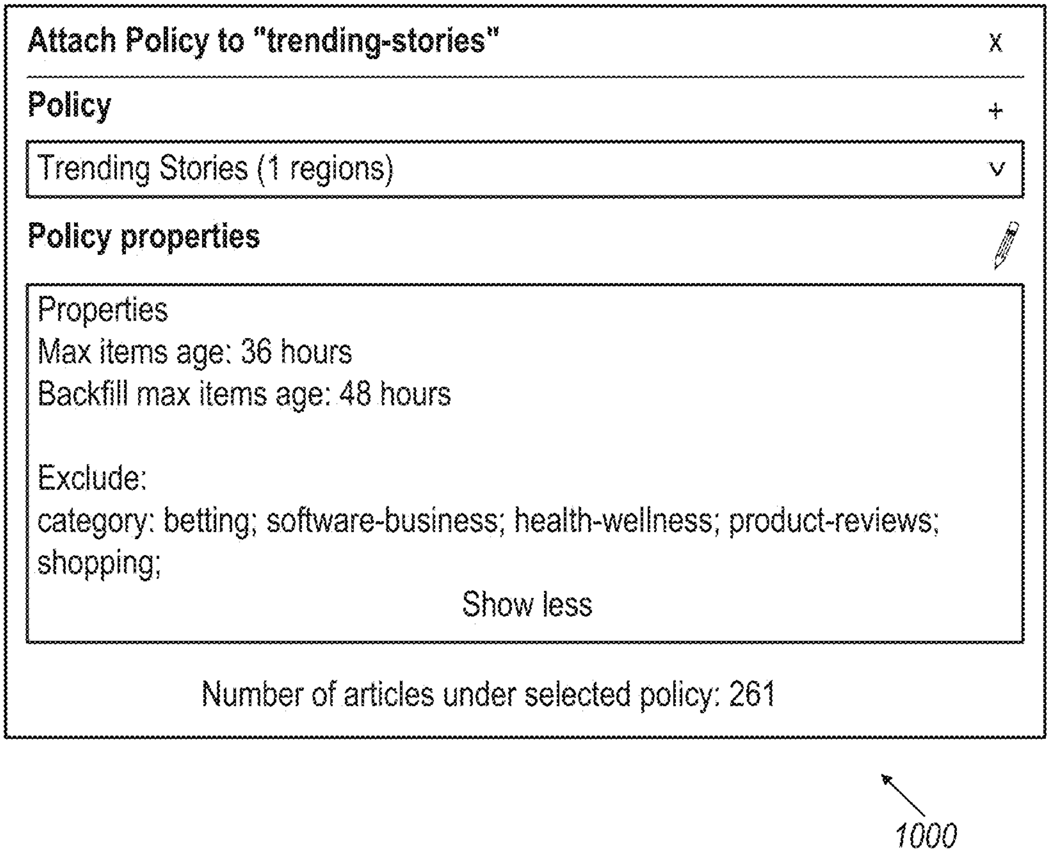

In some exemplary embodiments, a template may be selected from a plurality of available and pre-prepared templates, such as the listed templates in FIG. 8A. For example, as depicted in FIG. 10B, the publisher may be enabled to interact with Layer 1010, such as in order to select an available template such as Policy 1014, representing a policy titled "Last 4 days policies". As another example, as depicted in FIG. 10C, the publisher may navigate to an available template such as Policy 1016, representing a template titled "Business". As another example, as depicted in FIG. 10D, the publisher may navigate to an available template such as Policy 1000, representing a template titled "Trending Stories".

In some exemplary embodiments, available templates may be displayed along with one or more parameters, categories, or properties thereof. For example, Policy 1000 of FIG. 10D may comprise an available policy with defined properties, such as having a maximal items age of 36 hours, having a maximal backfill items age of 48 hours, excluding content categories of betting; software-business; health-wellness; product-reviews; and shopping, or the like. In some cases, a number of available content items for a selected template such as Policy 1000 may be presented. For example, in the scenario of FIG. 10D, the number of available content items may be 261.

In some exemplary embodiments, a template such as Policies 1014, 1016, or 1000, may be applied, or attached, to elements in one or more levels of granularity. In some exemplary embodiments, a template may be attached to a website, a webpage, a region, a slot, or the like. For example, a template applied to a website may be configured to set rules and guidelines for content recommendations across the entire website, e.g., across all pages, regions and slots thereof. As another example, a template may be applied to higher granularity zones such as specific regions of a page or slots thereof, allowing for more granular control over content recommendations in those areas. In some exemplary embodiments, contradicting template rules between different granularity levels may be resolved according to the hierarchy definitions, inheritance of rules, or the like.

In some exemplary embodiments, a default template may be defined for all page elements, such as pages, regions or slots, until the user defines, personalizes, edits or modifies a new template to replace the default template. In some exemplary embodiments, a default hierarchy may be defined unless overridden by a publisher.

Figure 11:
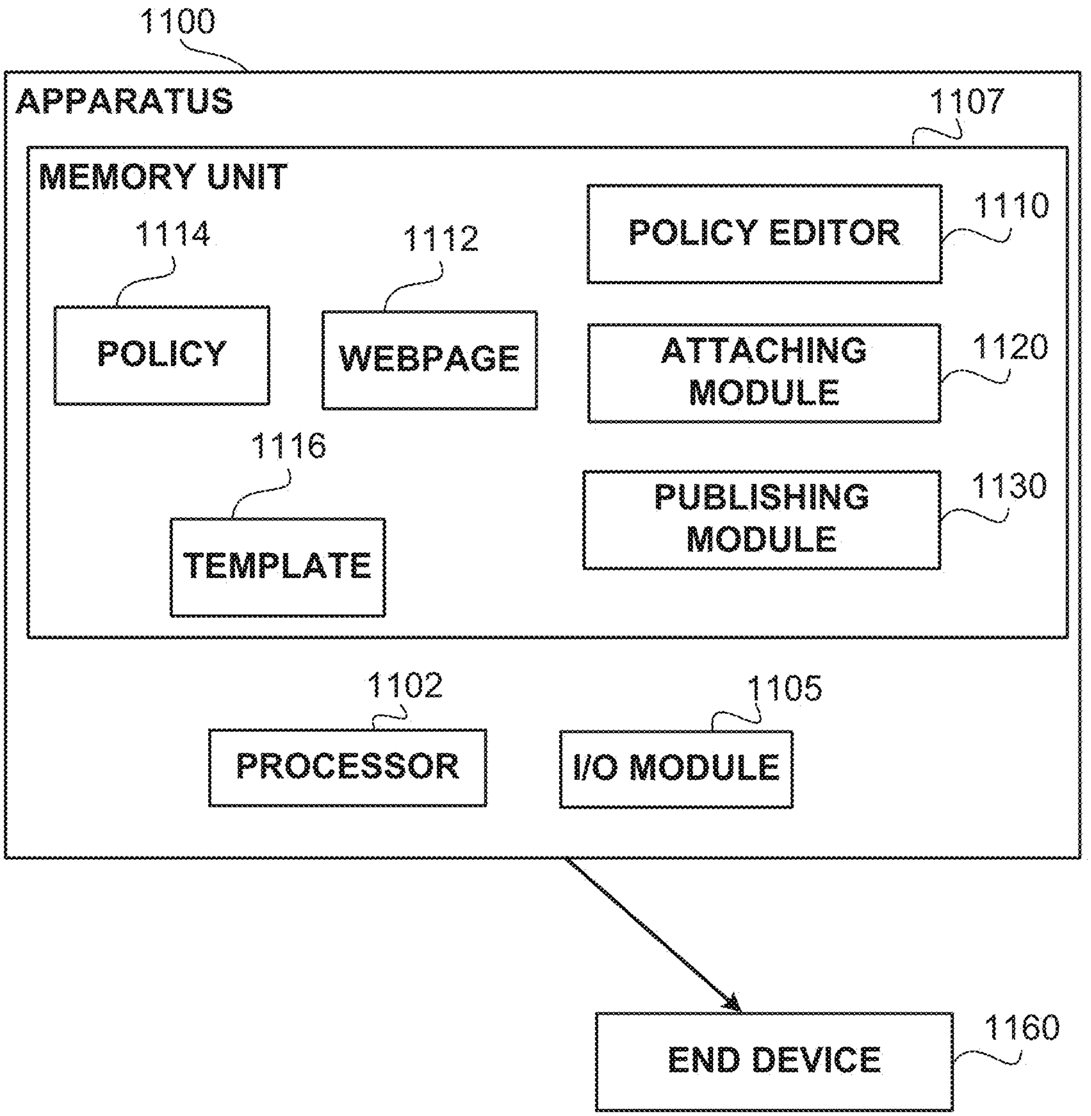
FIG. 11 shows a block diagram of an apparatus, in accordance with some exemplary embodiments of the disclosed subject matter.

Referring now to FIG. 11 showing a block diagram of an apparatus, in accordance with some exemplary embodiments of the disclosed subject matter.

In some exemplary embodiments, an Apparatus 1100 may comprise a Processor 1102. Processor 1102 may be a Central Processing Unit (CPU), a microprocessor, an electronic circuit, an Integrated Circuit (IC) or the like. Processor 1102 may be utilized to perform computations required by Apparatus 1100 or any of its subcomponents. Processor 1102 may be configured to execute computer-programs useful in performing the method of FIG. 1, or the like. For example, Apparatus 1100 may be associated or incorporated within a server.

In some exemplary embodiments of the disclosed subject matter, an Input/Output (I/O) Module 1105 may be utilized to provide an output to and receive input from a user. I/O Module 1105 may be used to transmit and receive information to and from the user or any other apparatus, e.g., a plurality of user devices, in communication therewith.

In some exemplary embodiments, Apparatus 1100 may comprise a Memory Unit 1107. Memory Unit 1107 may be a short-term storage device or long-term storage device. Memory Unit 1107 may be a persistent storage or volatile storage. Memory Unit 1107 may be a disk drive, a Flash disk, a Random Access Memory (RAM), a memory chip, or the like. In some exemplary embodiments, Memory Unit 1107 may retain program code operative to cause Processor 1102 to perform acts associated with any of the subcomponents of Apparatus 1100. In some exemplary embodiments, Memory Unit 1107 may retain program code operative to cause Processor 1102 to perform acts associated with any of the steps in FIG. 1, or the like.

The components detailed below may be implemented as one or more sets of interrelated computer instructions, executed for example by Processor 1102 or by another processor. The components may be arranged as one or more executable files, dynamic libraries, static libraries, methods, functions, services, or the like, programmed in any programming language and under any computing environment.

In some exemplary embodiments, Memory Unit 1107 may comprise a Policy Editor 1110, which may be executed by a publisher. For example, Policy Editor 1110 may comprise a browser extension, add-on, plugin, or the like, executed at the publisher side. In some cases, in addition to Policy Editor 1110, the publisher may or may not execute CMS logic.

In some exemplary embodiments, Policy Editor 1110 may be executed (e.g., by a web browser of the publisher) to allow an editorial team to generate or select a template of a policy, e.g., Template 1116. In some exemplary embodiments, Policy Editor 1110 may display management tools to the publisher that are not available in CMS logic, e.g., tools corresponding to those of Step 120 of FIG. 1. In some exemplary embodiments, Template 1116 may be generated according to the management tools, to comprise a plurality of rules, restrictions, constraints, or the like, that are applicable to any webpage or page element of the publisher. In some cases, Template 1116 may be defined without ties to any specific page or element.

In some exemplary embodiments, Policy Editor 1110 may be executed over a webpage such as Webpage 1112. In some exemplary embodiments, using the management tools of Policy Editor 1110, the publisher may define one or more webpage policies such as Policy 1114. Policy 1114 may be defined specifically for Webpage 1112, for one or more page elements thereof, or the like. For example, Webpage 1112 may be tied to three regions and one slot of Webpage 1112. Webpage 1112 may be obtained via I/O Module 1105 or generated locally by a content creator.

In some exemplary embodiments, Memory Unit 1107 may comprise an Attaching Module 1120, which may be configured to attach templates such as Template 1116 to one or more pages, page elements, websites, or the like. For example, Attaching Module 1120 may attach Template 1116 to the entirety of Webpage 1112, to a website that includes Webpage 1112, or the like. In some cases, the attachment may include incorporating and/or embedding code that represents Template 1116 into the desired page.

In some exemplary embodiments, Memory Unit 1107 may comprise a Publishing Module 1130, which may be configured to publish and distribute Webpage 1112 to end devices such as Device 1160, e.g., with the attached Policy 1114 or Template 1116 embedded therein. For example, Webpage 1112 may be published, enabling distribution thereof to end devices via I/O Module 1105.

At end devices such as Device 1160, Webpage 1112 may be obtained and the attached code of Policy 1114 or Template 1116 may be executed locally, in order to implement the defined rules such as by replacing original content items of Webpage 1112 assigned as personal items with content items that are recommended by a recommendation engine.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

loading a webpage at a Content Management System (CMS) platform, wherein the CMS platform used by one or more editors to edit digital content of the webpage, wherein the webpage comprises a plurality of page elements presenting manually curated content, the plurality of page elements comprising at least a slot for presenting a content item and a region aggregating a plurality of slots;

executing a policy editor over the webpage, the policy editor comprising an executable software that has access to the webpage, wherein the policy editor displays management tools configured for defining a webpage policy applicable to the webpage, the webpage policy defining configurations for managing and customizing a presentation of content by the plurality of page elements of the webpage, wherein the management tools receive, from the one or more editors, assignment of each of the plurality of page elements, an editorial control level selected from at least three editorial control levels, wherein the at least three editorial control levels comprise: a manually curated control level, a manually curated de-duplication control level, and a personalized control level, wherein the manually curated control level is under editorial control but permits duplicated items, the manually curated de-duplication control level is under the editorial control and is configured to enforce a constraint preventing duplication of content, wherein the personalized control level is under control of an automated recommendation engine, wherein a first page element assigned with the manually curated de-duplication control level presents a first manually curated content item, wherein a second page element assigned with the personalized control level is configured to present personalized content items from a third-party content discovery server, and wherein the constraint restricts a presentation of the first manually curated content item by the second page element, whereby preventing repetition of the first manually curated content item within the webpage;

incorporating executable client-side code representing the webpage policy into the webpage, thereby obtaining a modified webpage that incorporates assigned editorial control levels for at least the first and second page elements; and publishing the modified webpage to be available to one or more end devices of end users, the executable client-side code being executable by a web browser of a respective end device upon rendering the modified webpage, execution of the executable client-side code at the respective end device causing the respective end device to invoke a request for a personalized content item for the second page element and to replace a second manually curated content item of the second page element with a personalized content item different from the first manually curated content item of the first page element.

2. The method of claim 1, wherein the constraint restricts the presentation of the first manually curated content item by any page elements of the webpage assigned with the personalized control level.

3. The method of claim 1, wherein the management tools receive from the one or more editors assignment of, for any personalized page elements of the webpage assigned with the personalized control level, a content category, wherein the personalized content items from the third-party content discovery server are served by the personalized page elements when they belong to a respective content category.

4. The method of claim 1, wherein the executable client-side code of the webpage policy is executed on first and second end devices, resulting in invocations of first and second requests to obtain the personalized content item, respectively, wherein, in response to the first request from the first end device, a first personalized content item from the third-party content discovery server is obtained at the first end device, wherein, in response to the second request from the second end device, a second personalized content item from the third-party content discovery server is obtained at the second end device, wherein the first and second personalized content items are different, the first personalized content item is personalized for a first user of the first end device and the second personalized content item is personalized for a second user of the second end device.

5. The method of claim 4 further comprising:

replacing, at the first end device, the second manually curated content item of the second page element with the first personalized content item, wherein said replacing at the first end device is performed before the webpage is displayed to the first user of the first end device; and replacing, at the second end device, the second manually curated content item of the second page element with the second personalized content item, wherein said replacing at the second end device is performed before the webpage is displayed to the second user of the second end device.

6. The method of claim 1, wherein the policy editor comprises one of: a browser extension, a plugin, or an add-on.

7. The method of claim 1, wherein the management tools are displayed as at least one of: an overlay, a widget, a toolbar, a builder tool, a side panel, or a window.

8. The method of claim 1, wherein the webpage is a homepage.

9. The method of claim 1, wherein the executable client-side code of the webpage policy is configured to be executed by web browsers of the one or more end devices.

10. The method of claim 1, wherein the executable client-side code of the webpage policy is executed on an end device of the one or more end devices, resulting in an invocation of a request to obtain the personalized content item for the second page element, wherein, in response to the request failing to obtain the personalized content item from the third-party content discovery server, the second page element serves the second manually curated content item by the second page element.

11. An apparatus comprising a processor and coupled memory, said processor being adapted to perform:

loading a webpage at a Content Management System (CMS) platform, wherein the CMS platform used by one or more editors to edit digital content of the webpage, wherein the webpage comprises a plurality of page elements presenting manually curated content, the plurality of page elements comprising at least a slot for presenting a content item and a region aggregating a plurality of slots;

executing a policy editor over the webpage, the policy editor comprising an executable software that has access to the webpage, wherein the policy editor displays management tools configured for defining a webpage policy applicable to the webpage, the webpage policy defining configurations for managing and customizing a presentation of content by the plurality of page elements of the webpage, wherein the management tools receive, from the one or more editors assignment of, each of the plurality of page elements, an editorial control level selected from at least three editorial control levels, wherein the at least three editorial control levels comprise: a manually curated control level, a manually curated de-duplication control level, and a personalized control level, wherein the manually curated control level is under editorial control but permits duplicated items, the manually curated de-duplication control level is under the editorial control and is configured to enforce a constraint preventing duplication of content, wherein the personalized control level is under control of an automated recommendation engine, wherein a first page element assigned with the manually curated de-duplication control level presents a first manually curated content item, wherein a second page element assigned with the personalized control level is configured present personalized content items from a third-party content discovery server, and wherein the constraint restricts a presentation of the first manually curated content item by the second page element, whereby preventing repetition of the first manually curated content item within the webpage;

incorporating executable client-side code representing the webpage policy into the webpage, thereby obtaining a modified webpage that incorporates assigned editorial control levels for at least the first and second page elements; and publishing the modified webpage to be available to one or more end devices of end users, the executable client-side code being executable by a web browser of a respective end device upon rendering the modified webpage, execution of the executable client-side code at the respective end device causing the respective end device to invoke a request for a personalized content item for the second page element and to replace a second manually curated content item of the second page element with a personalized content item different from the first manually curated content item of the first page element.

12. The apparatus of claim 11, wherein the constraint restricts the presentation of the first manually curated content item by any page elements of the webpage assigned with the personalized control level.

13. The apparatus of claim 11, wherein the management tools receive, from the one or more editors, assignment of, for any personalized page elements of the webpage assigned with the personalized control level, a content category, wherein the personalized content items from the third-party content discovery server served by the personalized page elements when they belong to a respective content category.

14. The apparatus of claim 11, wherein the executable client-side code of the webpage policy is executed on first and second end devices, resulting in invocations of first and second requests to obtain the personalized content item, respectively, wherein, in response to the first request from the first end device, a first personalized content item from the third-party content discovery server is obtained at the first end device, wherein, in response to the second request from the second end device, a second personalized content item from the third-party content discovery server is obtained at the second end device, wherein the first and second personalized content items are different, the first personalized content item is personalized for a first user of the first end device and the second personalized content item is personalized for a second user of the second end device.

15. The apparatus of claim 14, wherein said processor is further adapted to perform:

replacing, at the first end device, the second manually curated content item of the second page element with the first personalized content item, wherein said replacing at the first end device is performed before the webpage is displayed to the first user of the first end device; and replacing, at the second end device, the second manually curated content item of the second page element with the second personalized content item, wherein said replacing at the second end device is performed before the webpage is displayed to the second user of the second end device.

16. The apparatus of claim 14, the policy editor comprises one of: a browser extension, a plugin, or an add-on.

17. A method comprising:

receiving a webpage at an end device, wherein the webpage comprises a plurality of page elements presenting manually curated content, the plurality of page elements comprising at least a slot for presenting a content item and a region aggregating a plurality of slots, the plurality of page elements comprising at least first and second page elements of the plurality of page elements, wherein the first page element presents a first manually curated content item, wherein the second page element presents a second manually curated content item, wherein the webpage incorporates executable client-side code representing a webpage policy, the webpage policy indicates assigned editorial control levels for at least the first and second page elements, wherein the assigned editorial control levels are selected from at least three editorial control levels, wherein the at least three editorial control levels comprise: a manually curated control level, a manually curated de-duplication control level, and a personalized control level, wherein the manually curated control level is under editorial control but permits duplicated items, the manually curated de-duplication control level is under the editorial control and is configured to enforce a constraint preventing duplication of content, wherein the personalized control level is under control of an automated recommendation engine, wherein the first page element is assigned with the manually curated de-duplication control level, and the second page element is assigned with the personalized control level, wherein the second page element is configured present by personalized content items from a third-party content discovery server, wherein the constraint of the first page element restricts a presentation of the first manually curated content item by the second page element, whereby preventing repetition of the first manually curated content item within the webpage;

executing the executable client-side code of the webpage policy upon rendering the webpage on the end device, wherein execution of the executable client-side code at the end device causes the end device to invoke a request for a personalized content item for the second page element and to replace the second manually curated content item of the second page element with a personalized content item different from the first manually curated content item;

fetching the personalized content item from the third-party content discovery server, wherein the personalized content item is selected to be fetched by the end device based on the personalized content item complying with the constraint of the webpage policy and based on recommendations of the automated recommendation engine, wherein the personalized content item complies with the constraint when the personalized content item is not a duplicate of the first manually curated content item; and serving the personalized content item by the second page element.

18. The method of claim 17, wherein the webpage is a homepage.

19. The method of claim 17, wherein the executable client-side code of the webpage policy is configured to be executed by a web browser of the end device.

20. A computer program product comprising a non-transitory computer readable medium retaining program instructions, which program instructions when read by a processor, cause the processor to perform:

receiving a webpage at an end device, wherein the webpage comprises a plurality of page elements presenting manually curated content, the plurality of page elements comprising at least a slot for presenting a content item and a region aggregating a plurality of slots, the plurality of page elements comprising at least first and second page elements of the plurality of page elements, wherein the first page element presents a first manually curated content item, wherein the second page element presents a second manually curated content item, wherein the webpage incorporates executable client-side code representing a webpage policy, the webpage policy indicates assigned editorial control levels for at least the first and second page elements, wherein the assigned editorial control levels are selected from at least three editorial control levels, wherein the at least three editorial control levels comprise: a manually curated control level, a manually curated de-duplication control level, and a personalized control level, wherein the manually curated control level is under editorial control but permits duplicated items, the manually curated de-duplication control level is under the editorial control and is configured to enforce a constraint preventing duplication of content, wherein the personalized control level is under control of an automated recommendation engine, wherein the first page element is assigned with the manually curated de-duplication control level, and the second page element is assigned with the personalized control level, wherein the second page element is configured to present personalized content items from a third-party content discovery server, wherein the constraint of the first page element restricts a presentation of the first manually curated content item by the second page element, whereby preventing repetition of the first manually curated content item within the webpage;

executing the executable client-side code of the webpage policy upon rendering the webpage on the end device, wherein execution of the executable client-side code at the end device causes the end device to invoke a request for a personalized content item for the second page element and to replace the second manually curated content item of the second page element with a personalized content item different from the first manually curated content item;

fetching the personalized content item from the third-party content discovery server, wherein the personalized content item is selected to be fetched by the end device based on the personalized content item complying with the constraint of the webpage policy and based on recommendations of the automated recommendation engine, wherein the personalized content item complies with the constraint when the personalized content item is not a duplicate of the first manually curated content item; and serving the personalized content item by the second page element.

* * * * *